United States Patent
Komoda et al.

(10) Patent No.: US 6,707,061 B2
(45) Date of Patent: Mar. 16, 2004

(54) FIELD EMISSION TYPE ELECTRON SOURCE

(75) Inventors: Takuya Komoda, Sanda (JP); Yoshiaki Honda, Kyoto (JP); Koichi Aizawa, Neyagawa (JP); Tsutomu Ichihara, Hirakata (JP); Yoshifumi Watabe, Tondabayashi (JP); Takashi Hatai, Neyagawa (JP); Toru Baba, Shijonawate (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 10/048,478

(22) PCT Filed: Oct. 26, 2001

(86) PCT No.: PCT/JP01/09423
§ 371 (c)(1),
(2), (4) Date: Jul. 22, 2002

(87) PCT Pub. No.: WO02/35572
PCT Pub. Date: May 2, 2002

(65) Prior Publication Data
US 2003/0020059 A1 Jan. 30, 2003

(30) Foreign Application Priority Data

| Oct. 26, 2000 | (JP) | 2000-326274 |
| Oct. 26, 2000 | (JP) | 2000-326276 |
| Nov. 10, 2000 | (JP) | 2000-344301 |
| May 15, 2001 | (JP) | 2001-145527 |
| May 15, 2001 | (JP) | 2001-145528 |

(51) Int. Cl.[7] .................................................. H01L 29/12
(52) U.S. Cl. .......................... 257/10; 257/213; 257/295; 257/629; 257/798
(58) Field of Search .......................... 257/295, 10, 213, 257/629, 798; 313/497, 309, 310, 311

(56) References Cited

U.S. PATENT DOCUMENTS 3,665,241 A    5/1972   Spindt et al.
6,489,710 B1 * 12/2002  Okita et al. ............. 313/309
6,492,769 B1 * 12/2002  Oda et al. ............... 313/495

FOREIGN PATENT DOCUMENTS

| EP | 798761      | 10/1997 |
| EP | 874384      | 10/1998 |
| EP | 1026727     | 8/2000  |
| EP | 1094485     | 4/2001  |
| JP | 8-250766    | 9/1996  |
| JP | 11329213    | 11/1999 |
| JP | 2000-100316 | 7/2000  |
| JP | 2000-188059 | 7/2000  |

OTHER PUBLICATIONS

English Language Abstract of JP 8–250766.
English Language Abstract of JP 11–329213.
English Language Abstract of JP 2000–100316.
English Language Abstract of JP 2000–188059.

* cited by examiner

*Primary Examiner*—Michael S. Lebentritt
*Assistant Examiner*—Douglas M Menz
(74) *Attorney, Agent, or Firm*—Greenblum & Bernstein, P.L.C.

(57) ABSTRACT

In a field emission-type electron source (10), lower electrodes (8) made of an electroconductive layer, a strong field drift layer (6) including drift portions (6a) made of an oxidized or nitrided porous semiconductor, and surface electrodes (7) made of a metal layer are provided on an upper side of a dielectric substrate (11) made of glass. When voltage is applied to cause the surface electrodes (7) to be anodic with respect to the lower electrodes (8), electrons injected from the lower electrodes (8) to the strong field drift layer (6) are led to drift through the strong field drift layer (6) and are emitted outside through the surface electrodes (7). A pn-junction semiconductor layer composed of an n-layer (21) and a p-layer (22) is provided between the lower electrode (8) and the strong field drift layer (6) to prevent a leakage current from flowing to the surface electrode (7) from the lower electrode (8), thereby reducing amount of power consumption.

31 Claims, 35 Drawing Sheets

FIELD EMISSION TYPE ELECTRON SOURCE

TECHNICAL FIELD

The present invention relates to a field emission-type electron source arranged to emit an electron beam by using a semiconductor material according to field emission.

BACKGROUND ART

Conventionally, as a field emission-type electron source (which hereinbelow may be shortly referred to as an "electron source"), there is known a Spindt-type electrode disclosed in, for example, U.S. Pat. No. 3,665,241. The Spindt-type electrode includes a substrate and gate layers, in which a large number of trigonal-pyramid-shaped emitter chips are arranged on the substrate, and the gate layers are insulated from one-way emitter chips that have emission openings provided to expose end portions of the emitter chips. In the Spindt-type electrode, when a high voltage is applied in a vacuum to cause the emitter chips to be cathodic with respect to the gate layer, electron beams are emitted from the apexes of the emitter chips through the emission openings.

For the Spindt-type electrode, however, a manufacturing process is complicated, and it is difficult to manufacture a large number of the trigonal-pyramid-shaped emitter chips at high precision. As such, a problem arises in that it is difficult to implement area enlargement when the electrode is used for, for example, a flat emitting device and display. Moreover, in the Spindt-type electrode, since fields concentrate at the apex of the emitter chip, when a residual gas exists because the degree of a vacuum around the apex of the emitter chip is low, the residual gas is ionized by emitted electrons to be of anodic ion. Since the anodic ions impinge on the apex of the emitter chip, the apex of the emitter chip suffers damage (such as ion-impact-caused damage). For this reason, defects can easily occur to an extent that electron properties, such as the current density and emission efficiency, become unstable, and hence the service life of the emitter chip is reduced. To prevent the defects, the Spindt-type electrode needs to be used in a high vacuum (in a range of $10^{-5}$ Pa to $10^{-6}$ Pa). This arises problems, however, in that costs are increased, and in addition, handling becomes difficult.

For eliminating the defects described above to implement improvement, an electron source of a MIM (metal insulator metal) type and an electron source of a MOS (metal oxide semiconductor) type have been proposed. The former is a flat electron source that has a (metal)-(insulator film)-(metal) multilayered structure, and the latter is a flat electron source that has a (metal)-(oxide)-(film semiconductor) multilayered structure. To improve the emission efficiency (to cause many electrons to emit) in either of the electron sources of the aforementioned types, the film thickness of the film such as the insulator film or the oxygen film needs to be reduced. However, with the insulator film or the oxygen film of which the thickness is excessively reduced, when voltage is applied between upper and lower electrodes in the multilayered structure, dielectric breakdown can occur. Since the electrical breakdown needs to be prevented, the reduction in the insulating film or the oxygen film is limited. As such, a problem arises in that the electron emission efficiency (induction efficiency) cannot be increased so high.

Recently, as is disclosed in Japanese Unexamined Patent Application Publication No. 8-250766, an electron source (cold electron emission semiconductor device) has been proposed. The electron source is configured such that a monocrystalline semiconductor substrate such as a silicon substrate is used, a surface of the semiconductor substrate is anodic-oxidized, a porous semiconductor layer (porous silicon layer) is thereby formed, and a thin metal film is formed on the porous semiconductor layer. In the electron source, voltage is applied between the semiconductor substrate and the thin metal film to cause electrons to emit.

However, in the electron source proposed in Japanese Unexamined Patent Application Publication No. 8-250766, since the substrate is limited to be of a semiconductor, a problem arises in that it is difficult to implement the area enlargement and the cost reduction. In addition, a so-called popping phenomenon tends to occur in electron emission, and hence nonuniformity tends to occur in light emission. As such, in a state where the electron source is used with, for example, a flat emitting device or display, light-emission nonuniformity can occur.

In view of the above, with Japanese Patent Applications No. 10-272340 and No. 10-272342, the inventors proposed an electron source configured such that, a porous polycrystalline semiconductor layer (such as a porous polycrystalline silicon layer) is interposed between an electroconductive substrate and a thin metal film (surface electrode) by performing, for example, rapid thermal oxidation at 900° C. according to a rapid thermal oxidation (RTO) technique; and thereby, a strong field drift layer (which hereinbelow will be referred to as a "drift layer") in which electrons injected from the electroconductive substrate drift is formed.

As shown in FIG. 43, in an electron source 10' of the aforementioned type, a drift layer 6 is formed on a main surface of an n-type silicon substrate 1, which is an electroconductive substrate, in which the drift layer 6 is formed of an oxidized porous polycrystalline silicon layer. A surface electrode 7 made of a thin metal film is formed on the drift layer 6. An ohmic electrode 2 is formed on a reverse surface of the n-type silicon substrate 1. The thickness of the drift layer 6 is, for example, 1.5 μm.

As shown in FIG. 44, in the electron source 10', the surface electrode 7 is disposed to be exposed to a vacuum. A collector electrode 12 is disposed to oppose the surface electrode 7. In the configuration, a direct-current voltage Vps is applied to cause the surface electrode 7 to be anodic with respect to the n-type silicon substrate 1 (ohmic electrode 2). In addition, a direct-current voltage Vc is applied to cause the collector electrode 12 to be anodic with respect to the surface electrode 7. Thereby, electrons injected from the n-type silicon substrate 1 into the drift layer 6 are caused to drift, and are discharged through the surface electrode 7 (each of single-dotted chain lines in FIG. 44 shows the flow of an electron e⁻ emitted through the surface electrode 7). As such, a material having a small work function is preferably used for the surface electrode 7. A current flowing between the surface electrode 7 and the ohmic electrode 2 is generally called a diode current Ips, and a current flowing between the collector electrode 12 and the surface electrode 7 is generally called an emitted electron current Ie. The greater the emitted electron current Ie with respect to the diode current Ips (Ie/Ips), the higher the electron emission efficiency. In the electron source 10', electrons can be emitted even when the direct-current voltage Vps to be applied between the surface electrode 7 and the ohmic electrode 2 is in a low range of from 10 to 20 V.

The electron source 10' enables electrons to be stably emitted at high electron emission efficiency without causing popping phenomenon since it has a less dependency to the degree of vacuum as an electron emission property.

As shown in FIG. 45, the drift layer 6 includes at least grain 51 (semiconductor crystal) made of columner polycrystalline silicon disposed on the main surface of the n-type silicon substrate 1; a thin silicon oxide film 52 formed on a surface of the grain 51; fine silicon crystal 63 on the order of nanometer that is interposed between items of the grain 51; and a silicon oxide film 64 provided as an insulator film that is formed on a surface of the fine silicon crystal 63 and that has a thickness smaller than a crystal grain diameter of the fine silicon crystal 63. That is, in the drift layer 6, the surface of each item of the grain 51 becomes porous, and a crystal condition is maintained in a central portion of each item of the grain 51. As such, most part of the field applied to the drift layer 6 is exerted on the silicon oxide film 64. Hence, the injected electrons are accelerated by a strong field applied on the silicon oxide film 64, and is caused thereby to drift between items of the grain 51 toward the surface as shown by an arrow A. Thereby, the electron emission efficiency can be improved. Electrons reached the surface of the drift layer 6 are hot electrons that easily pass through the surface electrode 7 and that are emitted in a vacuum. The film thickness of the surface electrode 7 is set in a range of from 10 to 15 nm.

Instead of the semiconductor substrate such as the n-type silicon substrate 1 as the electroconductive substrate, a substrate formed such that a lower electrode made of a conductive layer (such as a thin metal film) is formed on a dielectric substrate such as a glass substrate can be used. Thereby, further electron-source area enlargement and cost reduction can be implemented.

FIG. 46 shows an electron source 10" using an electroconductive substrate formed of a dielectric substrate 11 made of a glass substrate, and a lower electrode 8 formed on a main surface of the dielectric substrate 11. As shown in FIG. 46, in the electron source 10", the lower electrode 8 made of the conductive layer is formed on the main surface of the dielectric substrate 11. A drift layer 6 is formed on the lower electrode 8. A surface electrode 7 made of a thin metal film is formed on the drift layer 6. The drift layer 6 is formed such that, after an undoped polycrystalline silicon layer is overlaid on the lower electrode 8, the polycrystalline silicon layer is processed porous according to an anodic oxidation treatment, and is then oxidized or nitrided according to, for example, a rapid thermal technique performed at 900° C.

As shown in FIG. 47, in substantially the same manner as that in the electron source 10' (refer to FIG. 44), in the electron source 10", a surface electrode 7 is disposed to be exposed to a vacuum, and a collector electrode 12 is disposed to oppose the surface electrode 7. In addition, in substantially the same way as in the electron source 10', direct-current voltages Vps and Vc are applied, electrons injected from the lower electrode 8 into the drift layer 6 are caused to drift in the drift layer 6, and are emitted through the surface electrode 7. Also in the electron source 10", electrons can be emitted even when the direct-current voltage Vps, which is applied between the surface electrode 7 and the lower electrode 8, is in a low range of from 10 to 20 V.

As shown in FIG. 48, the electron source 10" can be used as a display-dedicated electron source. In the display shown in FIG. 48, a glass substrate 14 is disposed to oppose the electron source 10". On a surface of the glass substrate 14, which opposes the electron source 10", a collector electrode 12 and a phosphor layer 15 are provided. The phosphor layer 15 is coated on a surface of the collector electrode 12 to emit visible light according to electrons emitted from the electron source 10". The glass substrate 14 is spaced with a spacer (not shown) from the electron source 10". A hermetic space formed between the glass substrate 14 and the electron source 10" is set to a vacuum state.

The electron source 10" used in the display shown in FIG. 48 includes a dielectric substrate 11 made of a glass substrate; a plurality of lower electrodes 8 arranged on a main surface of the dielectric substrate 11; a drift layer 6 including a plurality of drift portions 6a individually made of an oxidized porous polycrystalline silicon layer in such a manner as to overlap the lower electrodes 8, and a plurality of isolating portions 6b that are formed of a polycrystalline silicon layer and that individually fill up spaces between the drift portions 6a; and a plurality of surface electrodes 7 arranged on the drift layer 6 in such a manner as to cross the drift portions 6a and the isolating portions 6b in the direction intersecting with the lower electrodes 8.

In the electron source 10", the drift portions 6a of the drift layer 6 are sandwiched between the plurality of lower electrodes 8 and the plurality of surface electrodes 7. As such, when an associated set of the surface electrode 7 and the lower electrode 8 is desirably selected, and voltage is applied into the selected couple, a strong field is applied to the drift portion 6a in the position corresponding to the intersection of the selected surface electrode 7 and lower electrode 8, and electrons are thereby emitted. Specifically, as in a case where electron sources are individually disposed at intersections in a check pattern formed of the surface electrodes 7 and the lower electrodes 8, an associated set of the surface electrode 7 and the lower electrode 8 is selected, and thereby, electrons can be emitted from a desired intersection. The voltage to be applied between the surface electrode 7 and the lower electrode 8 is set to a range of from 10 to 20 V.

In the electron source 10" used in the display shown in FIG. 48, an undoped polycrystalline silicon layer is made porous in depth up to a portion reaching the lower electrode 8.

However, as shown in FIG. 49, the polycrystalline silicon layer may be made porous in depth up to a portion not reaching the lower electrode 8. In this case, an undoped polycrystalline silicon layer 3 is interposed between the lower electrode 8 and the drift portion 6a.

The electron source 10" used in the display shown in FIG. 48 has a so-called a passive matrix structure in which the surface electrodes 7 and the lower electrodes 8 mutually opposes in a matrix so as to sandwich the drift layer 6.

As shown in FIG. 50, the drift portions 6a are assumed to be resistors R. In this case, among the plurality of surface electrodes 7, those selected are assumed to be set to an H level, and those unselected are assumed to be set to an L level. On the other hand, among the plurality of lower electrodes 8, those selected are assumed to be set to an L level, and those unselected are assumed to be set to an H level. In this case, as shown by a single-dotted chain line in FIG. 50, a current I1 is led to flow through a passageway (surface electrode 7 at the H level)-(resistor R)-(lower electrode 8 at the L level). However, in the electron source in which the drift portions 6a are made of resistors R, many passageways exist that pass leakage current flowing reversely to the lower electrodes 8 at the H level to the surface electrodes 7 at the L level. As such, the current flows even to the unselected intersections in the check pattern, thereby increasing the power consumption.

However, resistors are not used for the drift portions 6a in the electron source 10" shown in FIG. 48, which has the passive matrix structure. In the electron source 10", the overlapped portions of the surface electrodes 7 and the drift portions 6a are individually used as electron sources. Suppose the direction along which current flows from the surface electrode 7 to the lower electrode 8 in each of the electron sources is a forward direction. In this case, a current-voltage property is of a nonlinear type between the surface electrode 7 and the lower electrode 8 in each of the electron sources. Accordingly, leakage current is reduced less than that in the case where the drift portion 6a is assumed to be the resistor R. However, to implement the area enlargement of the electron source 10", the total amount of leakage current cannot be neglected. Thus, problems arise in that reduction in power consumption and improvement in electron emission efficiency are hindered.

As shown in FIG. 51, the above-described leakage-current flow can be prevented if the configuration is made such that a diode D having the anode on the side of the surface electrode 7 and the cathode on the side of the lower electrode 8 is formed between each of the surface electrodes 7 and lower electrodes 8. However, the diode D is not formed between the surface electrode 7 and the lower electrode 8 in each of the electron sources of the electron source 10" shown in FIG. 48. This arises problems in that, as shown by a double-dotted chain line in FIG. 51, leakage current flows from the lower electrode 8 at the H level to the surface electrode 7 at the L level, thereby making it difficult to reduce the power consumption and to improve the electron emission efficiency.

FIG. 56 is a graph representing the relationship between voltage and current in cases where a forward voltage and a backward voltage are applied. As shown in FIG. 56, even in the conventional electron source, a rectification property can be obtained to a certain extent in the forward current and the backward current. However, with the rectification property at the illustrated levels, it is still difficult to sufficiently minimize the leakage current.

As a means to solve these problems, it can be considered that the electron source is configured as shown in FIG. 52. Specifically, an n-type polycrystalline silicon region 41 is formed on the side of a surface of an undoped polycrystalline silicon layer 3 to be spaced away from a drift portion 6a. In addition, a p-type polycrystalline silicon region 42 is formed on the side of a surface in the n-type polycrystalline silicon region 41. A surface electrode 7 is formed in such a manner as to cross the drift portion 6a and a part of the n-type polycrystalline silicon region 41. In addition, a dummy surface electrode 17 is provided on the p-type polycrystalline silicon region 42 to add a rectification property to the current-voltage property in a portion between the dummy surface electrode 17 and the lower electrode 8.

In the electron source shown in FIG. 52, however, the n-type polycrystalline silicon region 41 and the p-type polycrystalline silicon region 42 need to be provided to be spaced away from the drift portion 6a; and in addition, the dummy surface electrode 17 needs to be provided to be spaced away from the surface electrode 7. There arise problems in that a per-unit-area electron emitting area is reduced with a passive matrix structure being employed.

In addition, in the electron source 10" shown in FIG. 48, in which patterning is performed for the drift portions 6a are patterned, the field intensity of a portion of the drift portion 6a in the vicinity of a boundary to the isolating portion 6b is higher than the field intensity of a central portion of the drift portion 6a. Accordingly, the per-unit-area electron emission amount in the aforementioned vicinity of the boundary is greater than the per-unit-area electron emission amount in the central portion of the drift portion 6a. This arises a problem in that electrons are excessively emitted through the aforementioned vicinity of the boundary.

Moreover, since the field intensity in the aforementioned vicinity of the boundary high, a case can occur in which dielectric breakdown occurs in the drift portion 6a (the drift portion 6a deteriorates) in the aforementioned vicinity of the boundary, and hence excessive current locally flows between the lower electrode 8 and the surface electrode 7. Because of the flow of excessive current, problems are caused in that local heating occurs in the surface electrode 7, which is formed of the electroconductive thin film, and/or the lower electrode 8 (conductive layer); and hence the level of deterioration in, for example, the surface electrode 7 and the drift portion 6a is increased. The field intensity in the aforementioned vicinity of the boundary becomes higher than the field intensity in the central portion of the drift portion 6a for the reason that the porosity or the extent of oxidation or nitrization is different in the central portion and the aforementioned of the drift layer 6.

In the electron source 10' or 10" shown in FIG. 43 or 46, electron emission properties thereof include a less dependency to the degree of vacuum, no popping phenomenon occurs in electron emission, and electrons can be stably emitted at high electron emission efficiency. Nevertheless, however, in the electron source 10' or 10", the diode current Ips gradually varies as time passes as shown by a graph P in FIG. 53, and the emitted electron current Ie gradually varies as time passes as shown by a graph Q in the same figure. Specifically, since the diode current Ips gradually increases, and the emitted electron current Ie gradually decreases, the electron emission efficiency gradually decreases. In this case, efforts can be exerted to inhibit the gradual reduction; however, it involves the problem of increasing the power consumption.

These problems are considered to occur for the following reasons. In the electron source 10' or 10", since the drift layer 6 is formed according to the oxidation of the porous polycrystalline silicon layer, it is difficult to form the silicon oxide films 52 and 64 (refer to FIG. 45) uniformed in quality and thicknesses for the entirety of the drift layer 6. In addition, in the drift layer 6, in comparison between the total film thickness of the silicon oxide films 64 in the region where the fine silicon crystal 63 is formed and the thickness of the silicon oxide film 52 in a portion where the grain 51 remains, the silicon oxide film 52 tends to be thinner. As such, when a driving voltage (direct-current voltage Vps) is applied to the electron source 10' or 10", and the diode current Ips is thereby applied to flow therethrough, dielectric breakdown gradually occurs in, for example, portions where the film thicknesses are insufficient, defective portions, and portions including a large amount of impurity in the silicon oxide film 52 or the silicon oxide film 64 or both the silicon oxide film 52 and silicon oxide film 64. In a portion where dielectric breakdown has occurred, the resistance values of the silicon oxide films 52 and 64 are reduced, whereas the diode current Ips gradually increases. On the other hand, current contributing to electron emission decreases, and the emitted electron current Ie gradually decreases.

For the above reasons, when the electron source 10' or 10" is used with, for example, a display, because of dielectric breakdown occurring in the silicon oxide films 52 and 64, problems are caused in that the power consumption and the heating value are gradually increase, thereby causing the luminance to gradually decrease.

The electron source 10" shown in FIG. 46 or 49 can be used as a display-dedicated electron source shown in FIG.

54. The electron source 10" shown in FIG. 54 includes a dielectric substrate 11 made of a glass substrate; a plurality of wirings 8a (lower electrodes 8) arranged on a main surface of the dielectric substrate 11; a drift layer 6 including a plurality of drift portions 6a formed of an oxidized porous polycrystalline silicon layer in such a manner as to overlap the wirings 8a, and isolating portions 6b that are formed of a polycrystalline silicon layer and that individually fill up spaces between the drift portions 6a; a plurality of surface electrodes 7 that individually oppose the wirings 8a via the drift portions 6a; and a plurality of bus electrodes 25 commonly coupling the plurality of surface electrode 7, which are arranged in the direction intersecting with the wirings 8a, in units of each row on the drift layer 6. The bus electrodes 25 are arranged in such a manner as to cross the drift portions 6a and the isolating portions 6b in the direction intersecting with the wirings 8a.

In substantially the same manner as that in the electron source 10" shown in FIG. 48, in the electron source 10", when an associated set of the bus electrode 25 and the wiring 8a is selected, electrons can be emitted from a desired intersection. The wiring 8a is formed as a stripe having two end portions in a longitudinal direction on which pads 27 are individually formed. The bus electrode 25 is connected to pads 28 through the individual pads 27.

However, in the electron source 10" shown in FIG. 54, when an overcurrent flows between the bus electrode 25 and the surface electrode 7, for example, cases can occur in which electrons excessively are emitted from the drift portion 6a corresponding to the selected intersection, and dielectric breakdown occurs with the intersection corresponding to the selected intersection, thereby causing a short-circuit current to flow between the wiring 8a and the surface electrode 7. This arises problems in that the temperature increases in the drift portion 6a, and the surface electrode 7, and the wiring 8a; and the deterioration continues for the overall electron source, thereby reducing the reliability thereof. That is, problems occur in that deterioration is introduced not only to the drift portion 6a, the surface electrode 7, and/or the wiring 8a that correspond to the selected intersection, but also to the drift portion 6a, the surface electrode 7, and/or the wiring 8a that correspond to an unselected intersection. In addition, since excessive electrons are emitted from the drift portion 6a that caused the dielectric breakdown, when the electron source is used with a display, the luminance of a specific pixel abnormally increases, intrascreen nonuniformity in luminance increases.

The electron source 10" or the display, which is shown in FIG. 54, includes a faceplate that is made of a glass substrate and that is disposed opposite to the electron source 10".

As shown in FIG. 55, pixels 31 are provided in units of the individual surface electrodes 7 of the electron source 10". Three phosphor cells 32a, 32b, and 32c corresponding to the three primitive colors of R, G, and B are coated and formed in each of the pixels 31. The individual pixels 31 and the phosphor cells 32a, 32b, and 32c in each of the pixels 31 are individually isolated by isolating layers 33 formed of a black pattern called a black stripe.

In substantially the same manner as that in the electron source 10" shown in FIG. 48, in the electron source 10" shown in FIG. 54, the per-unit-area electron emission amount in the vicinity of a boundary to the isolating portion 6b is greater than the per-unit-area electron emission amount in a central portion of the drift portion 6a in the direction along which the wiring 8a extends; hence electrons are excessively emitted through the aforementioned vicinity of the boundary. As such, when the configuration is made such that the distance between the pixels 31 is reduced, and the size (area) of the pixel 31 is reduced, bleeding occurs in the individual pixels 31. This makes it difficult to implement high precision display.

DISCLOSURE OF INVENTION

The present invention is made to solve the above-described problems, and an object thereof is to provide an electron source (field emission-type electron source) that enables a power-consumption reduction to be implemented without reducing a per-unit-area field emission area in comparison to the conventional cases. Another object is to provide an electron source that enables the prevention of emission of excessive electrons Still another object is to provide an electron source that has a high ageing stability as an electron emission property. Yet another object is to provide a high-reliability electron source that can be used as an electron source in a high-precision display.

An electron source (field emission-type electron source) is characterized by including a substrate, an electroconductive layer formed on a surface of the substrate, a semiconductor layer formed on the electroconductive layer, a strong field drift layer including a drift portion that is made of an oxidized or nitrided porous semiconductor layer and that is formed on the side of the surface of the semiconductor layer, and a surface electrode formed on the strong field drift layer, wherein when voltage is applied to cause the surface electrode to be anodic with respect to the electroconductive layer, electrons injected from the electroconductive layer to the strong field drift layer drift through the strong field drift layer, and are emitted through the surface electrodes; wherein a current restraining member for restraining a current that does not contribute for emission of a current flowing through the drift portion is provided in at least one of the electroconductive layer, the surface electrode, a portion between the electroconductive layer and the drift portions, and a portion between the surface electrode and the drift portion.

According to a first aspect of the present invention, the current restraining member is a leakage-current preventing member for preventing a current from leaking into the surface electrode from the electroconductive layer, thereby reducing the amount of power consumption. In this case, a leakage-current flow can be prevented, and a reduction in power consumption can be implemented without reducing the per-unit-area field emission area in comparison to the conventional cases.

In the electron source, the leakage-current preventing member is preferably a semiconductor layer including a pn junction. In this case, the pn junction is used to enable the leakage-current flow to be prevented.

The leakage-current preventing member may be a semiconductor layer including an n-layer on the side of the electroconductive layer and a p-layer on the side of the surface electrode. In this case, a rectification property of a pn junction of the semiconductor layer including the n-layer and the p-layer to enable the leakage-current flow to be prevented.

In a case where the leakage-current preventing member is the semiconductor layer including the n-layer on the side of the electroconductive layer and the p-layer on the side of the surface electrode, a low-concentration semiconductor layer may be formed between the p-layer and the drift portion. In this case, a rectification property of a pn junction of the semiconductor layer including the n-layer and the p-layer to enable the leakage-current flow to be prevented. In addition, according to the low-concentration semiconductor layer, the semiconductor layer including the n-layer and the p-layer and drift portion can be spatially isolated, and the drift portion can be formed without being influenced by the semiconductor layer.

In the electron source, in a case where the substrate is a semiconductor substrate, the electroconductive layer preferably includes an n-layer on the side of the substrate and a p-layer on the side of the surface electrode. In this case, since the electroconductive layer can formed using an ordinary silicon process, and the patter precision of the electroconductive layer can be improved, the display precision can be easily improved.

An i-layer may be provided between the p-layer and the n-layer. In this case, in comparison to the case where the rectification property of the pn junction is used to prevent the leakage-current flow, improvement in resistance can be implemented.

In the electron source, the surface electrode is preferably formed of a material that is to be coupled with a Schottky junction to the drift portion. In this case, a rectification property of the Schottky junction is used to enable the leakage-current flow to be prevented. Moreover, since junctions such as a pn junction and a pin junction need not be additionally provided, the structure of the electron source is simplified.

In the electron source, in a case where a low-concentration semiconductor layer is provided between the electroconductive layer and the drift portion, the electroconductive layer is preferably formed of a material that is to be coupled with a Schottky junction to the low-concentration semiconductor layer. Also in this case, a rectification property of the Schottky junction is used to enable the leakage-current flow to be prevented. Moreover, since junctions such as a pn junction and a pin junction need not be additionally provided, the structure of the electron source is simplified.

According to a second aspect of the present invention, an isolating portion for isolating the drift portions arranged adjacent to each other is provided. In addition, the current restraining member is a field moderating member for reducing the field intensity in a vicinity of a boundary to the isolating portion in the drift portion to be lower than the field intensity in a central portion of the drift portion to thereby reduce power consumption. In this case, since the field intensity in the vicinity of the boundary becomes lower than the field intensity in the central portion, and most of electrons drifting through the drift portion are led pass through the central portion, excessive electrons can be prevented from being emitted. Moreover, since the field intensity in the vicinity of the boundary becomes lower than the field intensity in the central portion, dielectric breakdown in the vicinity of the boundary can be prevented, and an overcurrent can be prevented from locally flowing between the electroconductive layer and the surface electrode.

In the electron source, the field moderating member may be an insulator film interposed between the drift portion and the surface electrode in a position corresponding to the vicinity of the boundary. In this case, when a matrix structure is employed in which a plurality of the surface electrodes and a plurality of the electroconductive layers are arranged in directions intersecting with each other, portions between individual pairs of the adjacent surface electrodes can be insulated by the insulator films.

The field moderating member may be an insulator film disposed on the electroconductive layer in a position corresponding to the vicinity of the boundary. In this case, when a matrix structure is employed in which a plurality of the surface electrodes and a plurality of the electroconductive layers are arranged in directions intersecting with each other, occurrence of crosstalk can be prevented.

The field moderating member may be formed of a high resistance layer in a position corresponding to the vicinity of the boundary, and a low resistance layer interposed between the drift portion and the electroconductive layer in a position corresponding to a central portion of the drift portion. In this case, pattern restrictions can be eliminated for the surface electrode and the electroconductive layer.

The field moderating member may be a cutout portion formed in the surface electrode in a position corresponding to the vicinity of the boundary. In this case, excessive electrons can be prevented from being emitted only by changing the pattern of the surface electrode.

The field moderating member may be a cutout portion formed in the electroconductive layer in a position corresponding to the vicinity of the boundary. In this case, excessive electrons can be prevented from being emitted only by changing the pattern of the electroconductive layer.

According to a third aspect of the present invention, the current restraining member is a field moderating layer that is disposed between the drift layer and the surface electrode and that reduces the field intensity of the strong field drift layer to thereby reduce power consumption. In this case, the field intensity in a portion of the drift layer in which dielectric breakdown tends to occur can be reduced, and hence dielectric breakdown in that portion can be prevented. Consequently, the ageing stability in the electron emission properties such as electron emission efficiency can be improved; and when the above is applied to, for example, a display, a gradual reduction in the screen luminance can be prevented. With the field moderating member being provided, the field intensity to be applied between the surface electrode and the electroconductive substrate is reduced. As such, when voltage to be applied between the surface electrode and the electroconductive substrate is controlled to be the same as that in the conventional electron source not including the field moderating layer, an emitted electron current is reduced smaller than that in the case where the field moderating layer is not provided. However, by increasing the voltage, the level of the emitted electron current can be increased to become equivalent to that in the conventional case.

In the electron source, the field moderating member may be one of a silicon nitride film and a multilayer film including a silicon nitride film. In this case, since the resistivity of the silicon nitride film is high, the film thickness of the field moderating member can be reduced. In addition, since electrons drifted through the drift layer are not easily diffused in the silicon nitride film, reduction in electron emission efficiency because of the field moderating member being provided can be inhibited.

The field moderating member may be formed of a silicon nitride film and an silicon oxide film disposed on the silicon nitride film. In this case, since the resistivities of the silicon nitride film and the silicon oxide film are high, the film thickness of the field moderating member can be reduced. In addition, since electrons drifted through the drift layer are not easily diffused in the silicon nitride film, reduction in electron emission efficiency because of the field moderating member being provided can be inhibited. Moreover, in comparison to a case where the surface electrode is formed on the silicon nitride film, since the surface electrode is formed on the silicon oxide film, the electron movement to the surface electrode easily occurs, thereby enabling the electron emission efficiency to increase.

The field moderating member may be formed of a silicon oxide film, a silicon nitride film disposed on the silicon oxide film, and another silicon oxide film formed on the silicon nitride film. In this case, since the resistivities of the silicon nitride film and the silicon oxide film are high, the film thickness of the field moderating member can be reduced. In addition, since electrons drifted through the drift layer are not easily diffused in the silicon nitride film, reduction in electron emission efficiency because of the field moderating member being provided can be inhibited. Moreover, in comparison to a case where the surface electrode is formed on the silicon nitride film, since the surface electrode is formed on the other silicon oxide film, the electron movement to the surface electrode easily occurs, thereby enabling the electron emission efficiency to increase.

The field moderating member is preferably formed of a material having a high property of adhesion to the surface electrode. In this case, ageing deterioration and ageing variations in electron emission property that can occur because of separation of the surface electrode can be inhibited.

For the material having the high property of adhesion, a chrome oxide film may be used. Since the chrome oxide film has a high transmittance property, reduction in electron emission efficiency because of the field moderating member being provided can be inhibited.

A resistance value of the field moderating member is preferably on the same order of a resistance value of the strong field drift layer. In this case, in comparison to is a case where the field moderating member is not provided, the field intensity of the drift layer can be moderated without greatly increasing the voltage to be applied between the surface electrode and the electroconductive substrate.

According to a fourth aspect of the present invention, a bus electrode commonly coupling a plurality of the surface electrodes is provided. Moreover, the current restraining member is an overcurrent protection element for limiting a current flowing between the surface electrode and the bus electrode to thereby reduce power consumption. In this case, when an associated set of the bus electrode and a wiring is appropriately selected, and voltage is applied to the selected set, a strong field is applied only to the drift portion positioned below the surface electrode that is proximate to a portion corresponding to an intersection with the wiring in the selected bus electrode, and electrons are thereby emitted. As such, the electron source can be used as an electron source for a display. Moreover, an overcurrent can be prevented from continually flowing to the surface electrode, drift portion, or the wiring, increase in the temperature thereof can be inhibited. Consequently, a deterioration range can be prevented from being increased, and the reliability can be improved.

The overcurrent protection element may be a member that causes disconnection when an overcurrent flows between the surface electrode and the bus electrode. In this case, when an overcurrent flows to a specific one of the surface electrodes, disconnection is caused between the surface electrode and the bus electrode. As such, an overcurrent can be prevented from continually flowing to the specific one of the surface electrodes. Consequently, a deterioration range can be prevented from being increased because of heat generation, and the reliability can be improved.

The overcurrent protection element may be a high resistance layer disposed between the surface electrode and the bus electrode. As such, an overcurrent can be prevented from flowing to the surface electrode. Consequently, a deterioration range can be prevented from being increased because of heat generation, and the reliability can be improved.

The overcurrent protection element may be a thermo-sensitive layer that is disposed between the surface electrode and the bus electrode and that has a positive resistance temperature coefficient. When an overcurrent flows to a specific one of the surface electrodes, and the temperature increases, the resistance of the thermo-sensitive layer increases to thereby limit a current flowing to the surface electrode, a deterioration range can be prevented from being increased because of heat generation, and the reliability can be improved.

According to fifth aspect of the present invention, the current restraining member is an electron-emission restraining member for restraining electron emission from a peripheral portion of the drift portion to thereby reduce power consumption. In this case, since electron emission from a peripheral portion of the drift portion, when the electron source is adapted in a display, occurrence of bleeding can be prevented, and a high-precision display can be implemented.

The current restraining member may be a metal layer. In this case, when the thickness of the metal layer is set larger than the mean free path of electrons, electrons can be prevented from being emitted through a position positioned below the metal layer in a peripheral portion of the drift portion.

The metal layer is preferably disposed around the drift portion. In this case, when the thickness of the metal layer is set larger than the mean free path of electrons, electrons can be prevented from being emitted through the overall peripheral portion of the drift portion, and a higher-precision display can be implemented.

In a case where the electron source includes a bus electrode commonly connecting a plurality of the surface electrode, a portion of the bus electrode may be concurrently used as the metal layer. In this case, when the thickness of the bus electrode is set larger than the mean free path of electrons, with the bus electrodes, electrons can be prevented from being emitted through a peripheral portion of the drift portion. In this case, when the electron source is adapted in a display, occurrence of bleeding can be prevented, and a high-precision display can be implemented.

In a case where the electron source includes a bus electrode commonly connecting a plurality of the surface electrode, the bus electrode is preferably disposed on two sides of a pixel. In this case, when the electron source is adapted in a display, occurrence of bleeding can be prevented, and a high-precision display can be implemented.

BRIEF DESCRIPTION OF THE DRAWINGS

The present invention will become more fully understood from a detailed description given below and the accompanied drawings. In the accompanying drawings, like reference symbols indicate common configuration elements.

BEST MODE FOR CARRYING OUT THE INVENTION

Figure 1:
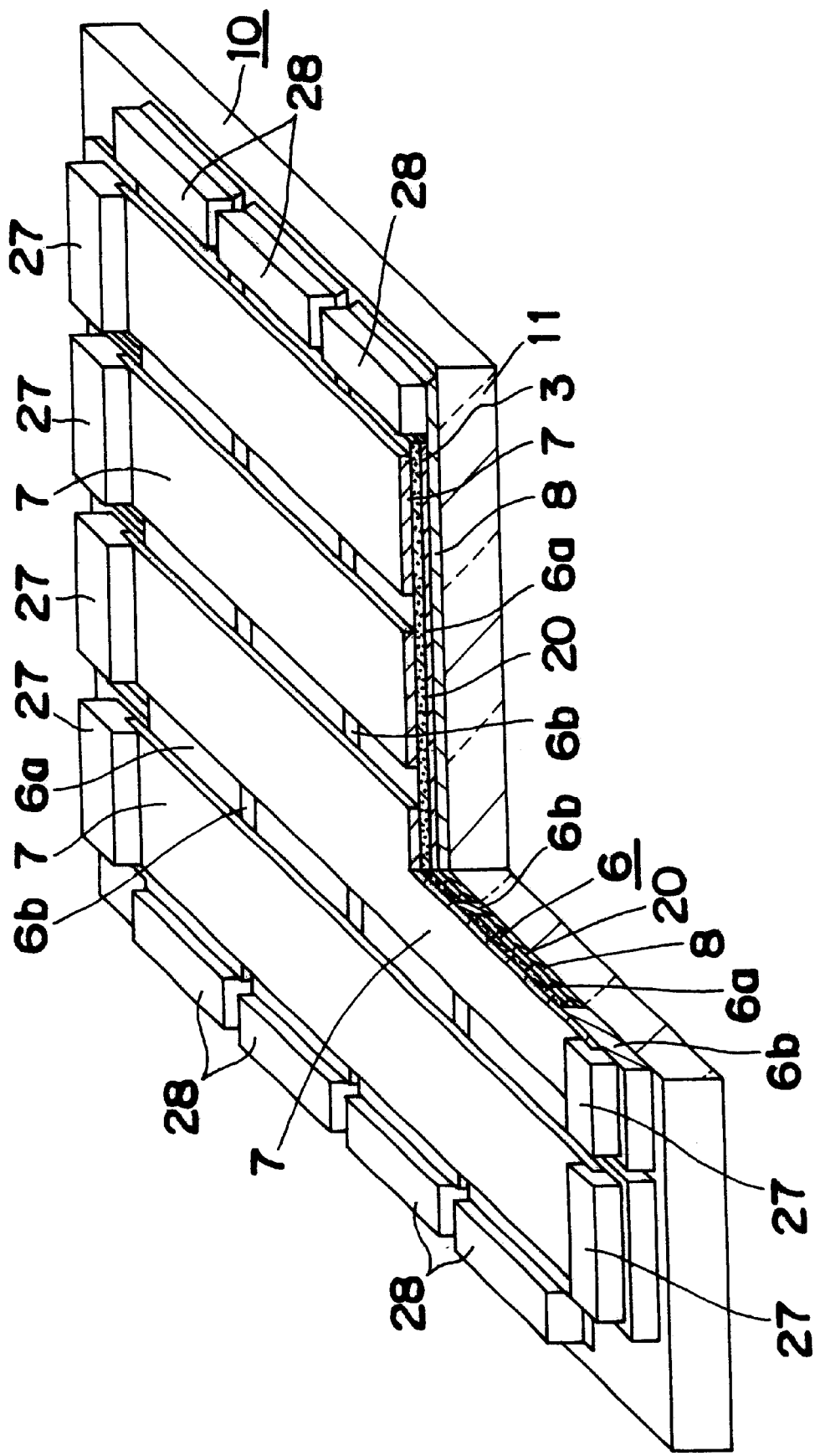
FIG. 1 is a partially-cutaway schematic perspective view of an electron source (field emission-type electron source) according to Embodiment 1 of the present invention.

This application is based on Japanese Patent Applications No. 2000-344301, No. 2000-326274, No. 2000-326276, No. 2001-145527, and 2001-145528 submitted in Japan; and all the contents thereof are incorporated herein.

Hereinbelow, a number of embodiments of the present invention will be described in detail. For the individual embodiments, like reference numerals/symbols are assigned for common members, i.e., members having substantially the same configurations and functions; and duplicated descriptions thereof are omitted.

Embodiment 1

First, Embodiment 1 of the present invention will be described.

As shown in FIG. 1, an electron source 10 (field-emission electron source) of Embodiment 1 includes a dielectric substrate 11 made of a glass substrate; a plurality of lower electrodes 8 arranged on a main surface of the dielectric substrate 11; semiconductor layers 20 individually formed in such a manner as to overlap lower electrodes 8; an undoped polycrystalline silicon layer 3 individually formed on the semiconductor layers 20 in such a manner as to overlap the lower electrodes 8 (refer to FIG. 2E) on a plan view; a drift layer 6 (strong field drift layer) including a plurality of drift portions 6a individually formed of an oxidized porous polycrystalline silicon layers on the polycrystalline silicon layer 3 in such a manner as to overlap the lower electrodes 8 on a plan view, and a plurality of isolating portions 6b that are individually formed of a polycrystalline silicon layers and that each fills up spaces between the drift portions 6a; and a plurality of surface electrodes 7 arranged on the drift layer 6 in such a manner as to cross the drift portions 6a and the isolating portions 6b in the direction intersecting (perpendicular to) with the lower electrodes 8.

The lower electrode 8 is formed of an electroconductive thin film made of a thin aluminum film. The surface electrode 7 is formed of an electroconductive thin film made of a thin metal film (such as a gold film) The film thickness of the surface electrode 7 is set to 15 nm, but the film thickness is not limited thereto. The thickness of the drift layer 6 also is set to 1.5 µm, but the thickness is not limited thereto. The dielectric substrate 11 forms the substrate.

Figure 2A:
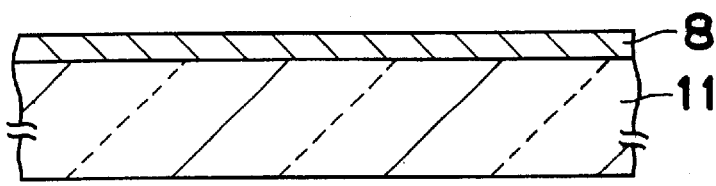
FIGS. 2A to 2E are schematic cross-sectional views showing an electron source according to Embodiment 1 of the present invention or intermediate products during the manufacture thereof, and a manufacturing method for the electron source.
Figure 2B:
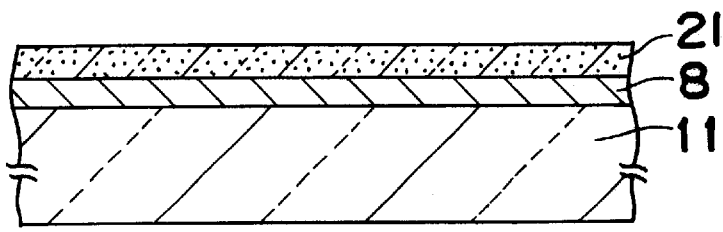
Figure 2C:
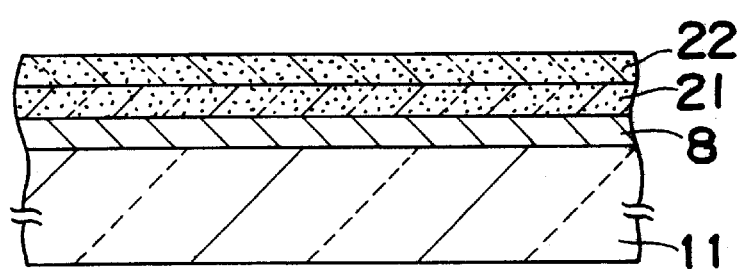
Figure 2D:
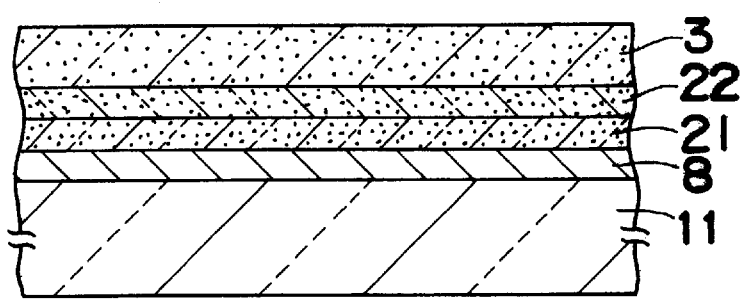
Figure 2E:
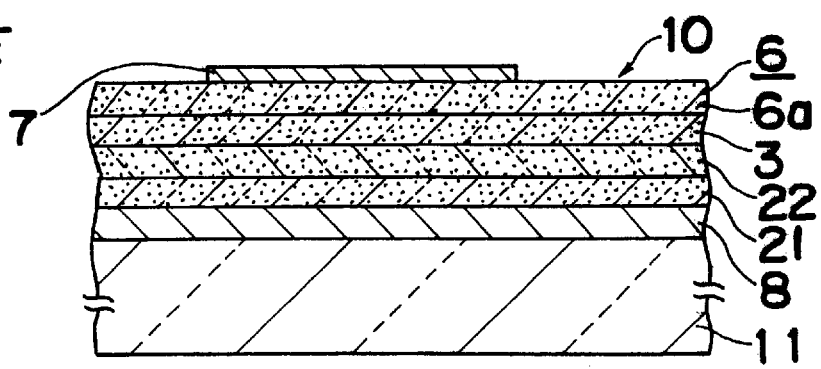
Figure 48:
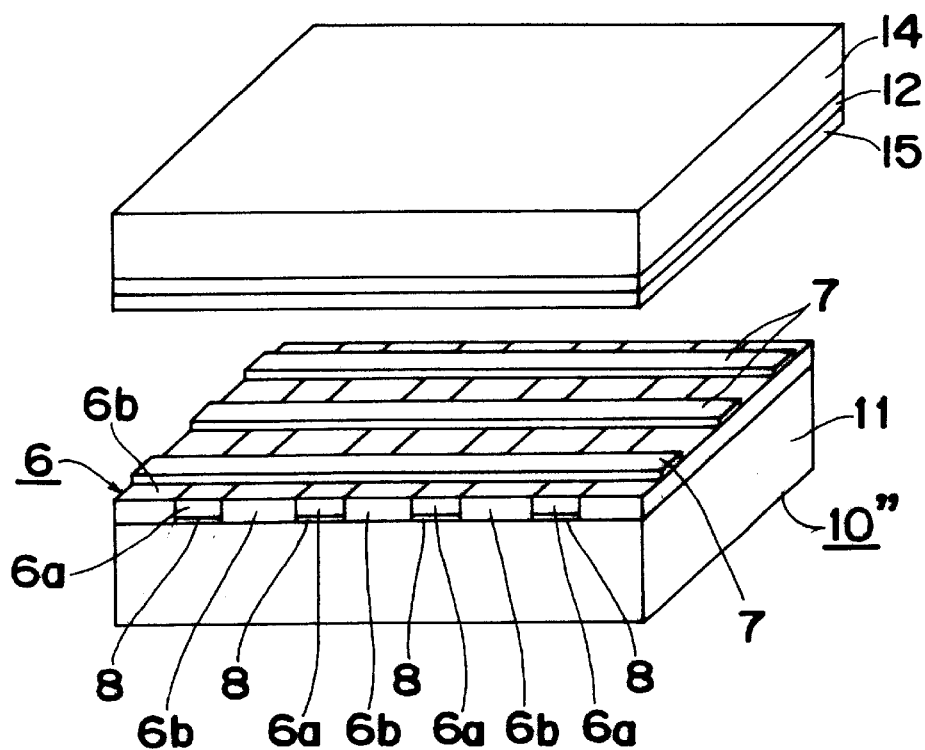
FIG. 48 is a perspective view of a display using the conventional electron source shown in FIG. 46.
Figure 49:
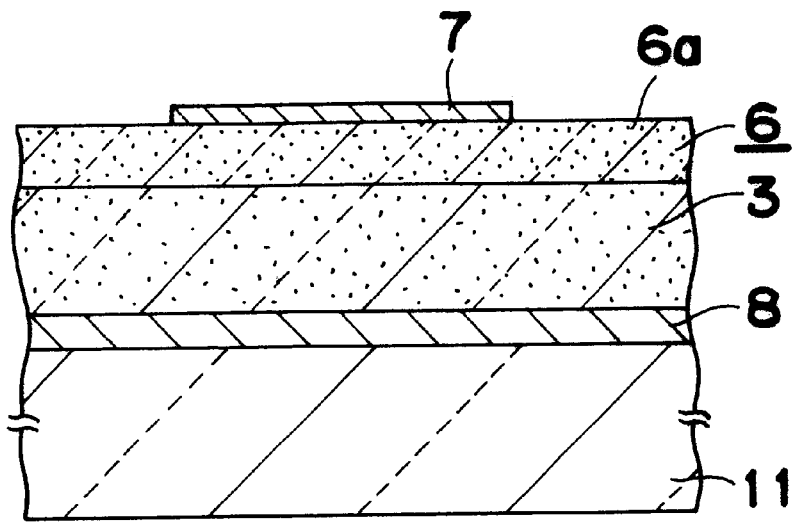
FIG. 49 is a schematic cross-sectional view of still another conventional electron source.
Figure 50:
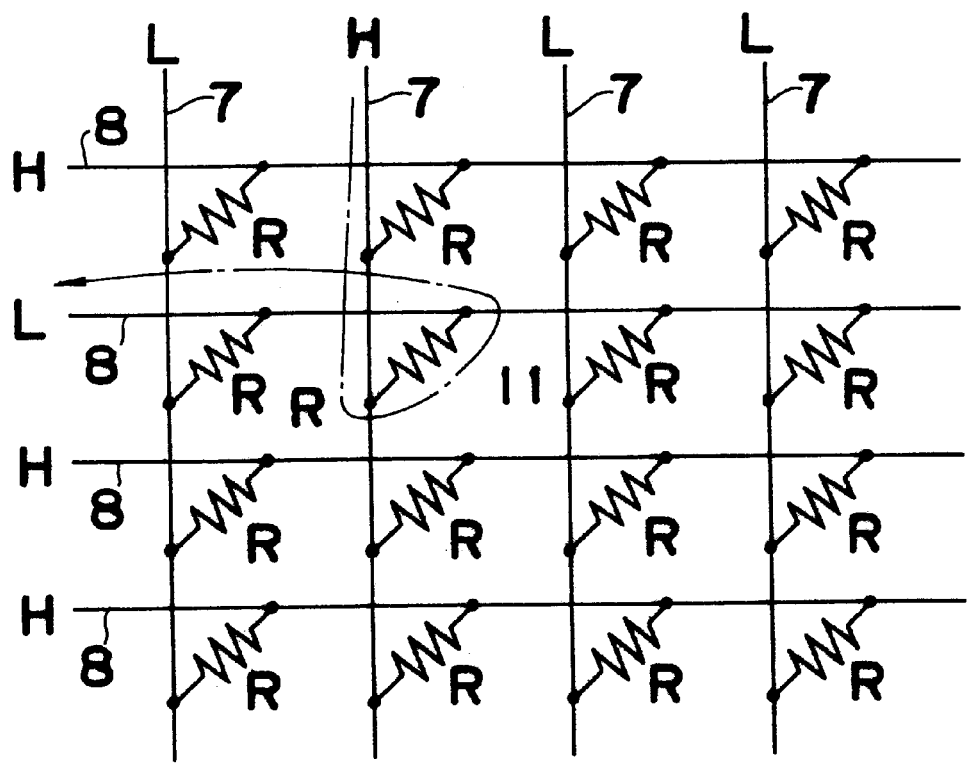
FIG. 50 is a schematic circuit diagram for explaining operation of a display employing a passive matrix structure.
Figure 51:
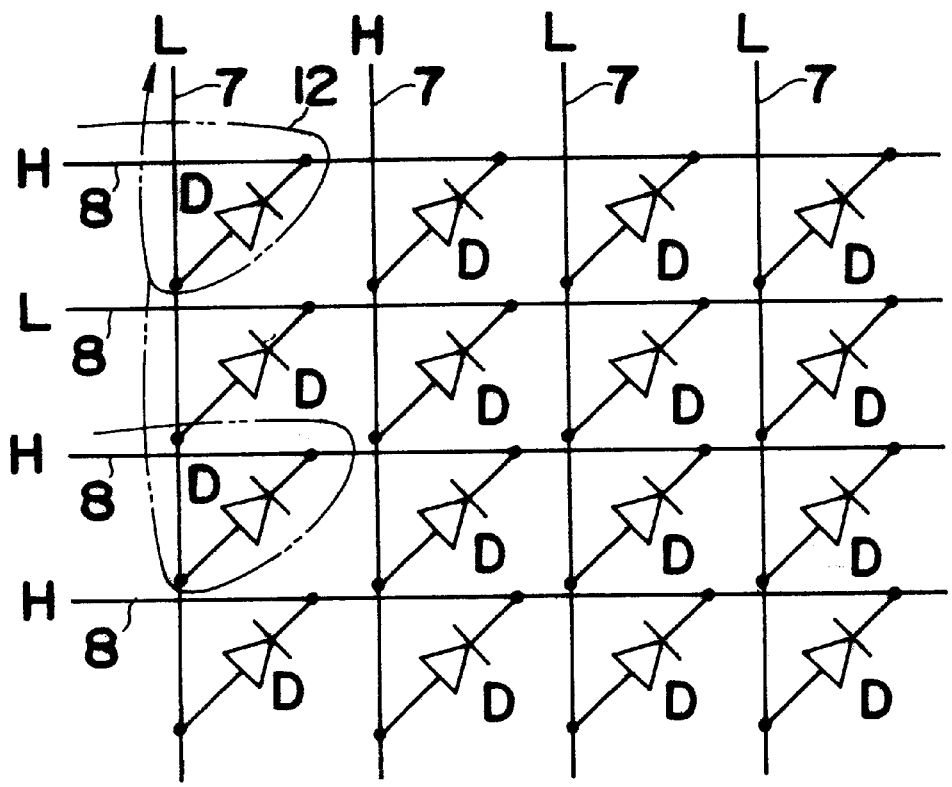
FIG. 51 is a schematic circuit diagram for explaining operation of another display employing a passive matrix structure.
Figure 52:
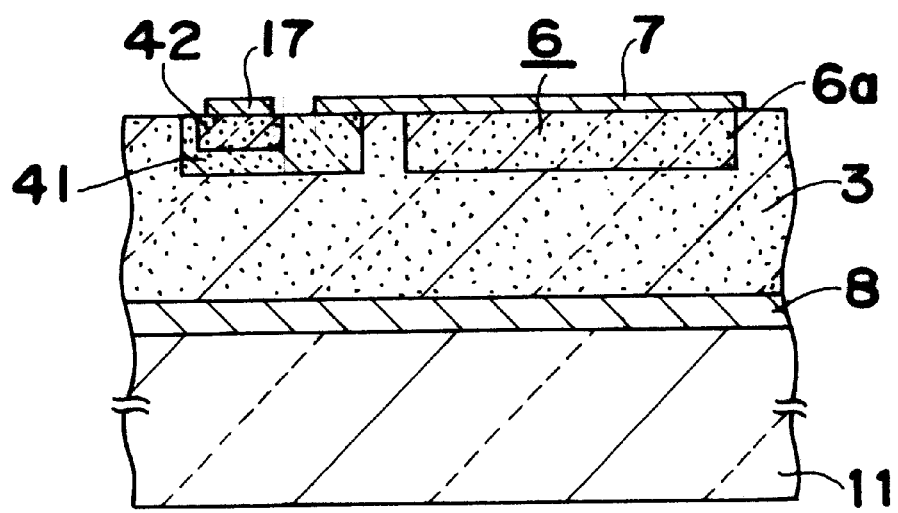
FIG. 52 is a schematic cross-sectional view of still another conventional electron source.
Figure 53:
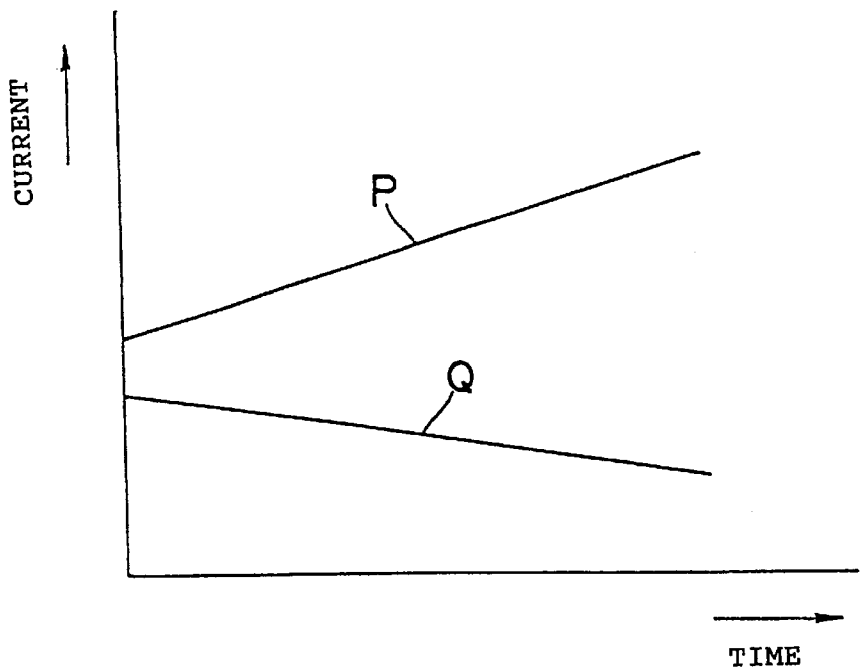
FIG. 53 is a graph showing ageing variations of a diode current and an emitted electron current in the conventional electron source.
Figure 55:
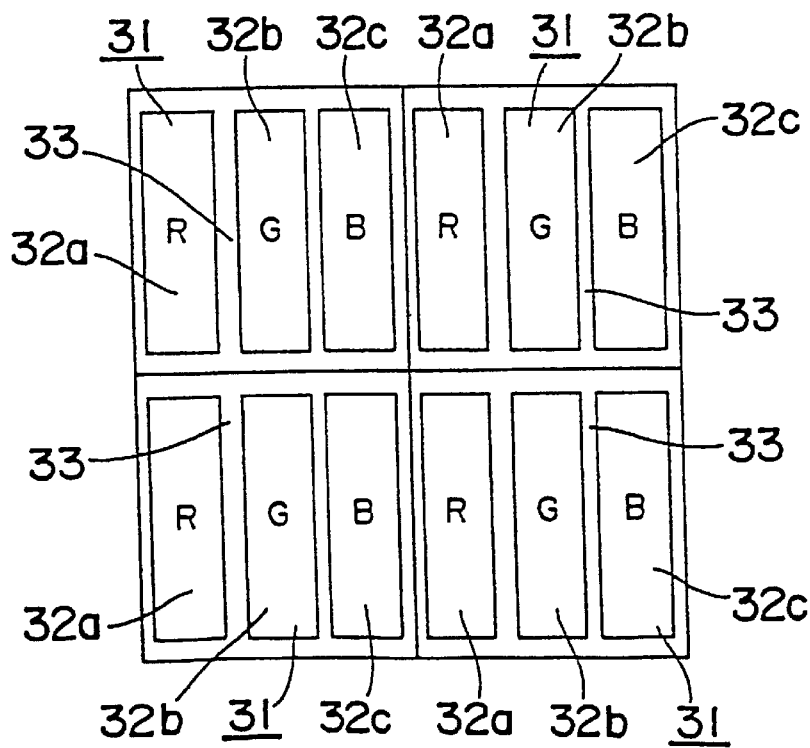
FIG. 55 is a schematic view of pixels provided on a faceplate of a display using the electron source.

While the electron source 10 has a passive matrix structure that is similar to that of the conventional electron source 10" shown in FIG. 48, it is different in that the semiconductor layer 20 includes a pn junction that prevents leakage current from flowing to the surface electrode 7 from the lower electrode 8. Specifically, as shown in FIG. 2E, the semiconductor layer 20 includes an n-layer 21 formed on the lower electrode 8, and a p-layer 22 formed on the n-layer 21, thereby forming the pn junction. The semiconductor layer 20 is provided between the surface electrode 7 and the lower electrode 8 with the drift layer 6 added. Thus, the semiconductor layer 20 forms a leakage-current preventing member (reverse-current preventing means) that prevents leakage current from flowing to the surface electrode 7 from the lower electrode 8. The undoped polycrystalline silicon layer 3 provided between the semiconductor layer 20 and the drift portion 6a forms a low-concentration semiconductor layer. As above, since the polycrystalline silicon layer 3, which is the low-concentration semiconductor layer, is formed between the p-layer 22 and the drift portion 6a, the semiconductor layer 20 and the drift portion 6a are spatially isolated from each other. Consequently, the drift portion 6a can be formed without being influenced by the semiconductor layer 20.

In substantially the same manner as that in the conventional electron source 10" shown in FIG. 48, in the electron source 10, the drift portions 6a of the drift layer 6 are sandwiched between the plurality of lower electrodes 8 and the plurality of surface electrodes 7. As such, when an associated set of the surface electrode 7 and the lower electrode 8 is appropriately selected, and voltage is applied into the selected set, the strong field is applied to the drift portion 6a in the position corresponding to the intersection of the selected surface electrode 7 and lower electrode 8, and electrons are thereby emitted. Specifically, as in a case where electron sources are individually disposed at intersections in a check pattern formed of the surface electrodes 7 and the lower electrodes 8, when an associated set of the surface electrode 7 and the lower electrode 8 is selected, electrons can be emitted from a desired intersection. The voltage to be applied between the surface electrode 7 and the lower electrode 8 is set to a range of from 10 to 20 V. Each of the surface electrodes 7 is formed as a stripe having two end portions in a longitudinal direction on which pads 27 are individually formed. Similarly, each of the lower electrodes 8 is formed as a stripe having two end portions in a longitudinal direction on which pads 28 are individually formed.

Figure 45:
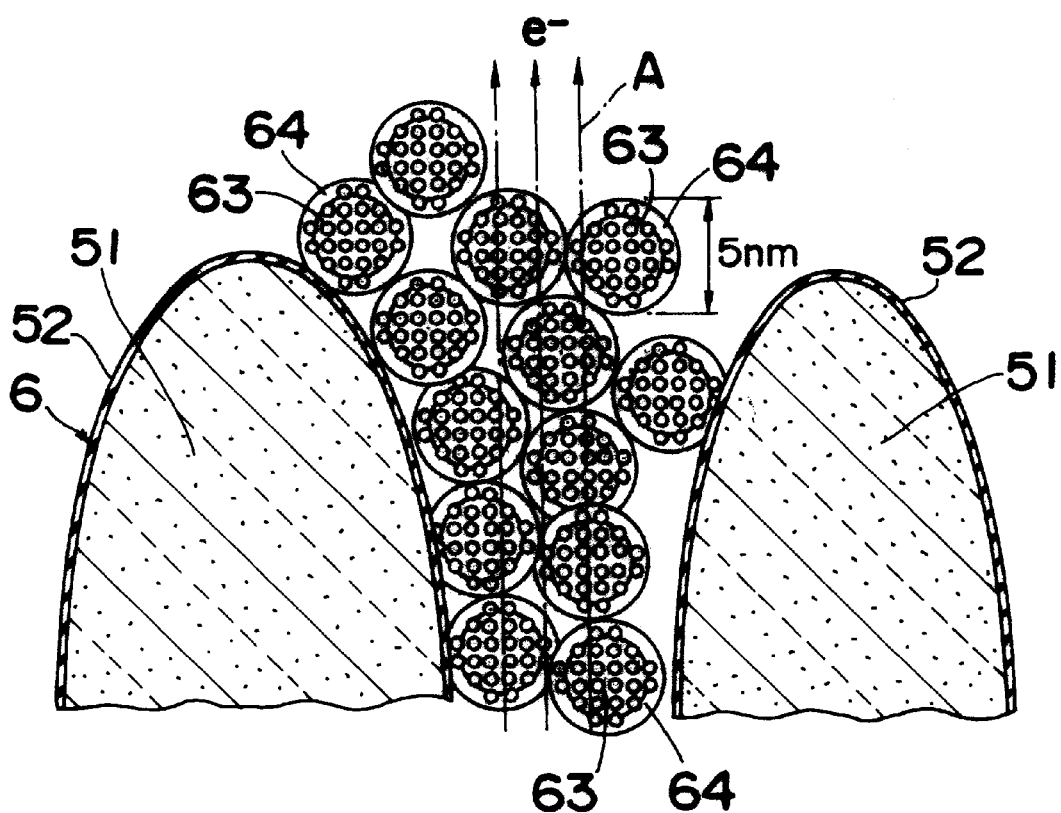
FIG. 45 is an enlarged schematic cross-sectional view showing an essential portion of the conventional electron source, and an electron-emitting operation in the electron source.

As in the drift layer 6 shown in FIG. 45, the drift layer 6 includes at least grain 51 (semiconductor crystal) made of columner polycrystalline silicon disposed on one surface of the dielectric substrate 11; a thin silicon oxide film 52 formed on a surface of the grain 51; fine silicon crystal 63 that is fine semiconductor crystal on the order of nanometer and that is interposed between items of the grain 51; and a silicon oxide film 64 provided as an insulator film that is formed on a surface of the fine silicon crystal 63 and that has a thickness smaller than a crystal grain diameter of the fine silicon crystal 63.

As described above, in the electron source 10, in addition to the drift layer 6, since the leakage-current preventing member for preventing leakage current from flowing to the surface electrode 7 from the lower electrode 8 is provided between the surface electrode 7 and the lower electrode 8, leakage current can be prevented from flowing, and a reduction in power consumption can be implemented without reducing the per-unit-area field emission area in comparison to the conventional cases. The leakage-current preventing member is formed of the semiconductor layer 20 that includes the pn junction between the drift portion 6a and the lower electrode 8. That is, only by interposing the semiconductor layer 20 that includes the pn junction between the drift portion 6a and the lower electrode 8, a rectification property of the pn junction is used to enable leakage current from flowing. In the electron source 10, electrons injected from the lower electrode 8 do not impinge on the fine silicon crystal 63, they are further accelerated by a field applied to the silicon oxide film 64, and they drift therein. In this case, heat generated in the drift layer 6 is discharged through the columner 51. As such, electrons can be emitted at high efficiency without popping phenomenon being caused.

In Embodiment 1, the drift portion 6a of the drift layer 6 is formed of the oxidized porous polycrystalline silicon layer. However, the isolating portion 6b may be formed of a nitrided porous polycrystalline silicon layer. Alternatively, the drift portion 6a may be formed of an oxidized or nitrided material instead of a porous polycrystalline silicon layer. When the drift portion 6a is formed of a nitrided porous polycrystalline silicon layer, a silicon nitride film is formed for either the silicon oxide film 52 or 64 in the FIG. 45.

In the electron source 10, while the gold film is used as the electroconductive thin film that forms the surface electrodes 7, the material of the surface electrode 7 is not limited to the gold material. Instead of the material, for example, another material having a small work function, such as an aluminum, chrome, tungsten, nickel, or platinum material, may be used. The work function of gold is 5.10 eV, the work function of aluminum is 4.28 eV, the work function of chrome is 4.50 eV, the work function of tungsten is 4.55 eV, the work function of nickel is 5.15 eV, and the work function of platinum is 5.65 eV. Alternatively, the surface electrode 7 may be formed of an electroconductive thin film formed of a plurality of thin-film electrode layers laminated in the thickness direction. In this case, a material that has a high oxidation resistance and a small work function is preferably used for the top thin-film electrode layer; and a material that has a small work function and a high adhesion property with respect to the drift layer 6 is preferably used for the bottom thin-film electrode layer. The material of the bottom thin-film electrode layer preferably has a property of not easily diffusing into the drift layer 6 in comparison to the top thin-film electrode layer (that is, the diffusion coefficient in the material of the drift layer 6 is small).

By using the surface electrode 7 that has a small work function and a high adhesion property with respect to the drift layer 6, the surface electrode 7 can be prevented from being isolated from the drift layer 6. Thereby, disconnection of the surface electrode 7 can be prevented, and the ageing stability thereof can be improved. Furthermore, the manufacturing yield can be improved, and cost reduction can be implemented.

For example, gold is preferably be used for the material of the top thin-film electrode layer, and chrome is preferably used for the material of the bottom thin-film electrode layer. However, for the material of the bottom thin-film electrode layer, any one of nickel, platinum, titanium, zilconium, rhodium, and hafnium, or an oxide thereof may be used instead of chrome. In addition, by using any one of nickel, platinum, titanium, zilconium, rhodium, and hafnium, or an oxide thereof for the material of the bottom thin-film electrode layer, raw-material costs for the bottom thin-film electrode layer can be reduced relatively low.

In the electron source 10, a thin aluminum film is used for the electroconductive layer that forms the lower electrodes 8. However, the material of the lower electrode 8 is not limited to the aluminum material, and an electroconductive material other than the aluminum material may be used therefor.

Hereinbelow, referring to FIGS. 2A to 2E, a manufacturing method for the electron source 10 of the present invention will be described. A cross section of only an essential portion is shown in each of FIGS. 2A to 2E.

The electroconductive layer, which is formed of a thin aluminum film having a predetermined film thickness, is deposited (overlaid) on the entirety of one face (the upper surface in FIG. 2A) of the dielectric substrate 11 according to a sputtering method. Subsequently, a resist layer that has been patterned corresponding to a pattern of the lower electrode 8 is formed on the electroconductive layer. Then, unnecessary portions of the electroconductive layer are etched using the resist layer as a mask. Thereby, the lower electrode 8 made of a patterned electroconductive layer is formed on the aforementioned surface of the dielectric substrate 11. Thereafter, the resist layer is removed. Thereby, an intermediate product having a structure shown in FIG. 2A is obtained.

Subsequently, the n-layer 21, which is formed of an n-type polycrystalline silicon layer containing phosphorus added as an n-type impurity, is deposited (overlaid) on the entire portion on the side of the aforementioned surface of the dielectric substrate 11 according to a plasma CVD method. Thereby, an intermediate product having a structure shown in FIG. 2B is obtained. Since the n-layer 21 is deposited according to the plasma CVD method, the layer can be deposited by a low-temperature process at a temperature of 600° C. or lower (100° C. to 600° C.). In addition, since the n-layer 21 is doped with an impurity at the layering time according to the plasma CVD method, it can easily be formed.

Thereafter, the p-layer 22, which is formed of a p-type polycrystalline silicon layer containing boron added as a p-type impurity, is deposited by using, for example, a plasma CVD method. Thereby, an intermediate product having a structure shown in FIG. 2C is obtained. Since the p-layer 22 is overlaid according to the plasma CVD method, it can be deposited by a low-temperature process at a temperature of 600° C. or lower (100° C. to 600° C.). In addition, the p-layer 22 is doped with an impurity at the layering time according to the plasma CVD method, it can easily be formed.

Subsequently, in each of the n-layer 21 and p-layer 22, oxygen ions are injected to insulate a portion nonoverlapping with the lower electrode 8 from a portion overlapping with the lower electrode 8. Thereafter, an undoped polycrystalline silicon layer 3 having a predetermined film thickness (for example, 1.5 μm) is formed on the entire portion on the side of the aforementioned surface of the dielectric substrate 11 by using, for example, a plasma CVD method. Thereby, an intermediate product having a structure shown in FIG. 2D is obtained. Since the undoped polycrystalline silicon layer 3 is overlaid according to the plasma CVD method, it can be deposited by a low-temperature process at a temperature of 600° C. or lower (100° C. to 600°

C.). The forming method of the undoped polycrystalline silicon layer 3 is not limited to the plasma CVD method. The undoped polycrystalline silicon layer 3 may be deposited using, for example, a catalytic CVD method, according to a low-temperature process at 600° C. or lower.

Figure 3A:
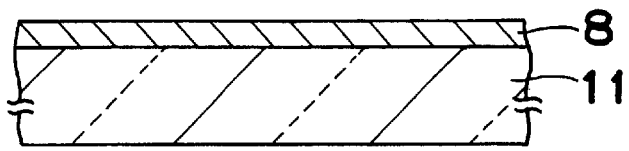
FIGS. 3A to 3G are schematic cross-sectional views showing an electron source of Embodiment 2 of the present invention or intermediate products during the manufacture thereof, and a manufacturing method for the electron source.
Figure 3B:
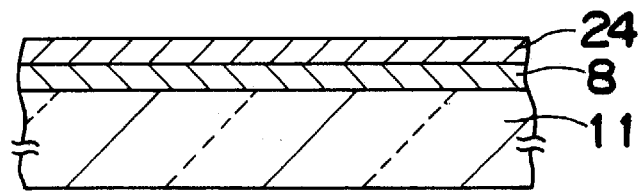
Figure 3C:
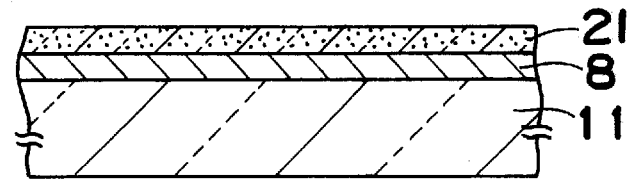
Figure 3D:
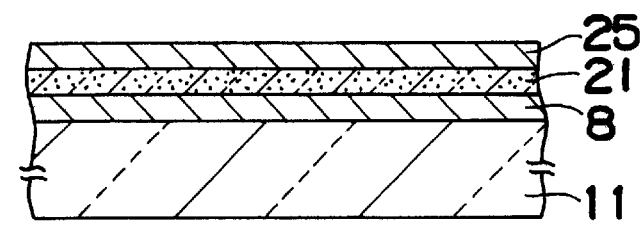
Figure 3E:
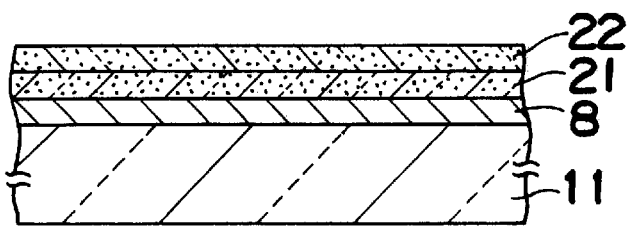

After the undoped polycrystalline silicon layer 3 has been formed, an anodic oxidation treatment is performed at predetermined conditions. In the treatment, an anodic oxidation process tank that contains an electrolytic solution composed of a mixed liquid in which a 55-wt % hydrogen fluoride aqueous solution and ethanol are mixed at a ratio of about 1:1 is used, and light is emitted onto the undoped polycrystalline silicon layer 3 with a platinum electrode (not shown) being set to be cathodic and the lower electrode 8 being set to be anodic. Thereby, a porous polycrystalline silicon layer is formed in a portion of the polycrystalline silicon layer 3, which overlaps with the lower electrode 8. Thereafter, the electrolytic solution is removed from the anodic oxidation process tank; and acid (for example, approximately-10% dilute nitric acid, approximately-10% dilute sulfuric acid, and aqua regia) is newly poured into the anodic oxidation process tank. Subsequently, the porous polycrystalline silicon layer is oxidized in a way that the anodic oxidation process tank containing the aforementioned acid, the platinum electrode (not shown) is set to be cathodic, and the lower electrode 8 is set to be anodic. Thereby, the drift portion 6a, which is made of the oxidized porous polycrystalline silicon layer, is formed on the portion overlapping with the lower electrode 8. Subsequently, the surface electrode 7, which is made of a gold film having a predetermined film thickness (for example, 15 nm), is formed on the drift layer 6 according to, for example, a vapor deposition method, using a metal mask. Thereafter, the pads 27 and 28 shown in FIG. 1 are formed, and the electron source 10 shown in FIG. 3E is thereby obtained. In this configuration, the isolating portion 6b is formed with the polycrystalline silicon layer 3 existing in the drift portions 6a and the portions into which the oxygen ions have been injected.

During the anodic oxidation treatment in Embodiment 1, the power of the light emitted onto the surface of the undoped polycrystalline silicon layer 3 is set at a predetermined level, and the current density also is set at a predetermined level. However, these conditions may be optionally changed (for example, the current density may be set variable). In addition, although the electroconductive thin film used as the surface electrode 7 is formed according to a vapor deposition method, the method of forming the electroconductive thin film is not thereby limited, and, for example, a sputtering method may be employed.

According to the above-described manufacturing method, since the n-layer 21 and the p-layer 22 are formed with an impurity being doped at the layering time, the n-layer 21 and the p-layer 22 can easily be formed. Moreover, the n-layer 21 and the p-layer 22 can continually be deposited using the same film-depositing apparatus (for example, a plasma CVD apparatus). Manufacture can be easily performed for the electron source 10 that enables the prevention of a leakage-current flow and the implementation of a power-consumption reduction without reducing the per-unit-area field emission area in comparison to the conventional cases. Furthermore, the semiconductor layers 20, the low-concentration semiconductor layers, and the like are made of polycrystalline silicon. In this case, since an ordinary silicon process, a manufacturing process for a liquid-crystal display apparatus, and the like can be used, a cost reduction can be implemented.

Embodiment 2

Hereinbelow, Embodiment 2 of the present invention will be described. However, an electron source according to Embodiment 2 has the same configuration as the electron source 10 of the Embodiment 1, and only a manufacturing method therefor is different. As such, hereinbelow, only the manufacturing method therefor will be described with reference to FIGS. 3A to 3G. FIGS. 3A to 3G each show only a cross section of an essential portion.

The electroconductive layer, which is formed of a thin aluminum film having a predetermined film thickness, is deposited (overlaid) on the entirety of one face (the upper surface in FIG. 3A) of the dielectric substrate 11 according to a sputtering method. Subsequently, a resist layer that has been patterned corresponding to a pattern of the lower electrode 8 is formed on the electroconductive layer. Then, unnecessary portions of the electroconductive layer are etched using the resist layer as a mask. Thereby, the lower electrode 8 made of a patterned electroconductive layer is formed on the aforementioned surface of the dielectric substrate 11. Thereafter, the resist layer is removed. Thereby, an intermediate product having a structure shown in FIG. 3A is obtained.

Subsequently, an undoped polycrystalline silicon layer 24 is deposited on the entire portion on the side of the aforementioned surface of the dielectric substrate 11 according to, for example, a plasma CVD method. Thereby, an intermediate product having a structure shown in FIG. 3B is obtained. Since the undoped polycrystalline silicon layer 24 is overlaid according to the plasma CVD method, the layer can be deposited by a low-temperature process at a temperature of 600° C. or lower (100° C. to 600° C.)

In addition, the n-layer 21 is formed while performing doping with an n-type impurity (such as phosphorus) according to an ion-injecting method or an impurity-diffusing method on a portion overlapping with the lower electrode 8 in the undoped polycrystalline silicon layer 24. Thereby, an intermediate product having a structure shown in FIG. 3C is obtained. Subsequently, an undoped polycrystalline silicon layer 25 is formed on the entirety portion on the side of the aforementioned surface of the dielectric substrate 11 by using, for example, a plasma CVD method. Thereby, an intermediate product shown in FIG. 3D is obtained. Since the undoped polycrystalline silicon layer 25 is overlaid according to the plasma CVD method, it can be deposited by a low-temperature process at a temperature of 600° C. or lower (100° C. to 600° C.).

Thereafter, the p-layer 22 is formed while performing doping with an p-type impurity (such as boron) according to an ion-injecting method or an impurity-diffusing method on a portion overlapping with the lower electrode 8 in the undoped polycrystalline silicon layer 25. Thereby, an intermediate product having a structure shown in FIG. 3E is obtained.

Figure 3F:
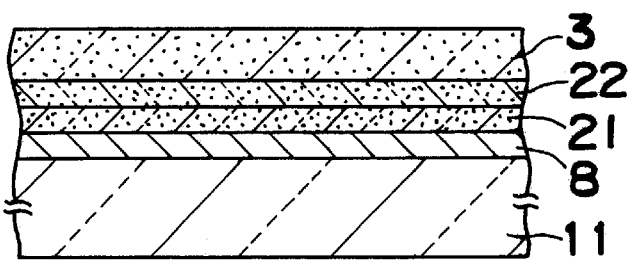

Subsequently, the undoped polycrystalline silicon layer 3 having a predetermined film thickness (for example, 1.5 μm) is formed on the entirety portion on the side of the aforementioned surface of the dielectric substrate 11 by using, for example, a plasma CVD method. Thereby, an intermediate product shown in FIG. 3F is obtained. Since the undoped polycrystalline silicon layer 3 is overlaid according to the plasma CVD method, it can be deposited by a low-temperature process at a temperature of 600° C. or lower (100° C. to 600° C.). The forming method of the undoped polycrystalline silicon layer 3 is not limited to the plasma CVD method. The undoped polycrystalline silicon layer 3 may be deposited using a different method, such as a catalytic CVD method, according to a low-temperature process at 600° C. or lower.

Figure 3G:
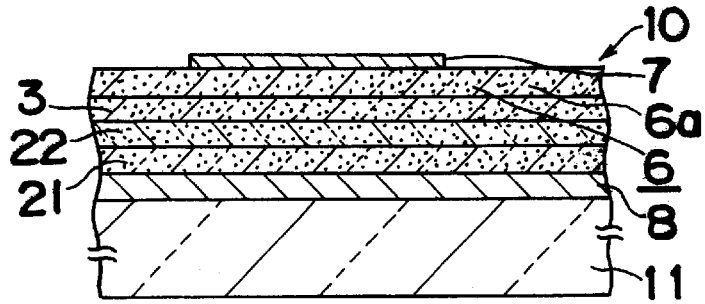

After the undoped polycrystalline silicon layer 3 has been formed, an anodic oxidation treatment is performed at predetermined conditions. In the treatment, an anodic oxidation process tank that contains an electrolytic solution composed of a mixed liquid in which a 55-wt % hydrogen fluoride aqueous solution and ethanol are mixed at a ratio of about 1:1 is used, and light is emitted onto the undoped polycrystalline silicon layer 3 with a platinum electrode (not shown) being set to be cathodic and the lower electrode 8 being set to be anodic. Thereby, a porous polycrystalline silicon layer is formed in a portion of the polycrystalline silicon layer 3, which overlaps with the lower electrode 8. Thereafter, the electrolytic solution is removed from the anodic oxidation process tank; and acid (for example, approximately-10% dilute nitric acid, approximately-10% dilute sulfuric acid, and aqua regia) is newly poured into the anodic oxidation process tank. Subsequently, the porous polycrystalline silicon layer is oxidized in a way that the anodic oxidation process tank containing the aforementioned acid, the platinum electrode (not shown) is set to be cathodic, and the lower electrode 8 is set to be anodic. Thereby, the drift portion 6a, which is formed of the oxidized porous polycrystalline silicon layer, is formed on the portion overlapping with the lower electrode 8. Subsequently, the surface electrode 7, which is made of a gold film having a predetermined film thickness (for example, 15 nm), is formed on the drift layer 6 according to, for example, a vapor deposition method, using a metal mask. Thereafter, the pads 27 and 28 shown in FIG. 1 are formed, and the electron source 10 shown in FIG. 3G is thereby obtained. In this configuration, the isolating portion 6b is formed with the polycrystalline silicon layer 3 existing in the drift portions 6a, the undoped polycrystalline silicon layer 24, and the undoped polycrystalline silicon layer 25 existing in the p-layer 22.

In the above-described manner, in the Embodiment 2, the respective n-layer 21 and p-layer 22 are formed while performing doping with an impurity according to the ion-injecting method or the impurity-diffusing method after formation of the polycrystalline silicon layers 24 and 25, which are undoped semiconductor layers. As such, without depending on a film-depositing apparatus, the impurity concentration in the n-layer 21 and the p-layer 22 can be controlled at a high controllability.

Embodiment 3

Figure 4:
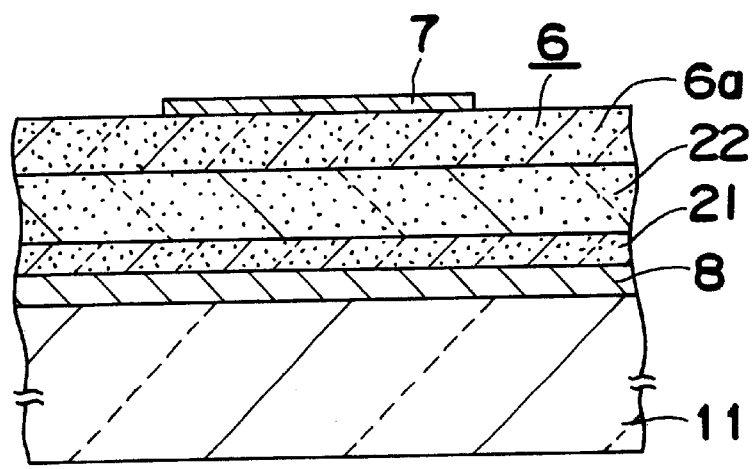
FIG. 4 is a schematic cross-sectional view of an electron source according to Embodiment 3 of the present invention.

Hereinbelow, Embodiment 3 of the present invention will be described. The basic configuration of an is electron source according to Embodiment 3 is substantially the same as that of the electron source 10 according to Embodiment 1 shown in FIG. 1. As shown in FIG. 4, however, the configuration is different in that the drift portion 6a is formed on the p-layer 22. In Embodiment 3, the semiconductor layers made of the p-layer 22 and the n-layer 21 form a leakage-current preventing member (reverse-current preventing means).

Thus, in Embodiment 3, as in Embodiment 1, in addition to the drift layer 6, the leakage-current preventing member is provided to prevent leakage current from flowing from the lower electrode 8 to the surface electrode 7. Consequently, without reducing the per-unit-area field emission area in comparison to the conventional cases, a leakage-current flow can be prevented, and a reduction in power consumption can be implemented. Furthermore, the configuration is be simplified in comparison to that of Embodiment 1 since the undoped polycrystalline silicon layer 3 used in Embodiment 1 is not provided between the semiconductor layer, which forms the leakage-current preventing member, and the drift portion 6a.

In comparison to the manufacturing method according to Embodiment 1 or Embodiment 2, a manufacturing method for the electron source 10 of Embodiment 3 is different only in that the entire portion overlapping with the lower electrode 8 is formed porous according to the anodic oxidation treatment.

Embodiment 4

Figure 5:
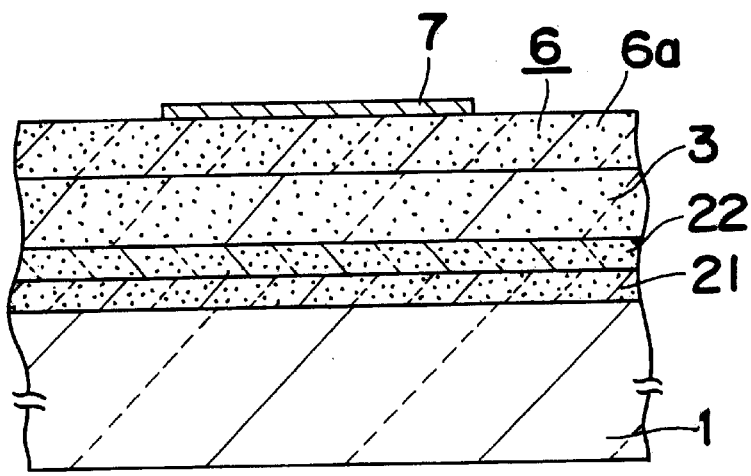
FIG. 5 is a schematic cross-sectional view of an electron source according to Embodiment 4 of the present invention.

Hereinbelow, Embodiment 4 of the present invention will be described. The basic configuration of an electron source according to Embodiment 4 is substantially the same as that of the electron source 10 according to Embodiment 1 shown in FIG. 1. As shown in FIG. 5, however, the configuration is different in that a silicon substrate 1, which is a semiconductor substrate, is used for the substrate; and the lower electrode 8 in Embodiment 1 is formed of the n-layer 21, which is formed of an n-type silicon region having a relatively high concentration, the p-layer 22, which is formed of a p-type silicon region having a relatively high concentration. In Embodiment 4, the lower electrode formed of the p-layer 22 and the n-layer 21 forms a leakage-current preventing member that prevents a leakage current from flowing to the surface electrode 7 from the lower electrode.

Thus, in Embodiment 4, as in Embodiment 1, in addition to the drift layer 6, the leakage-current preventing member is provided to prevent leakage current from flowing to the surface electrode 7 from the lower electrode. Consequently, without reducing the per-unit-area field emission area in comparison to the conventional cases, a leakage-current flow can be prevented, and a reduction in power consumption can be implemented.

In the electron source 10 according to Embodiment 4, since the silicon substrate 1 is used for the substrate, an ordinary silicon process, such as an ion-injecting method or an impurity-diffusing method, can be used to form the n-layer 21 and the p-layer 22 that form the lower electrode. Because of the configuration, the pattern precision of the lower electrode can be improved, and furthermore, no nonuniform portions irregular portion, which can be formed with the formation of the lower electrode, are formed on the aforementioned surface of the substrate. Consequently, discontinuation in the surface electrode 7 can be prevented, and the display precision can be easily improved.

Embodiment 5

Figure 6:
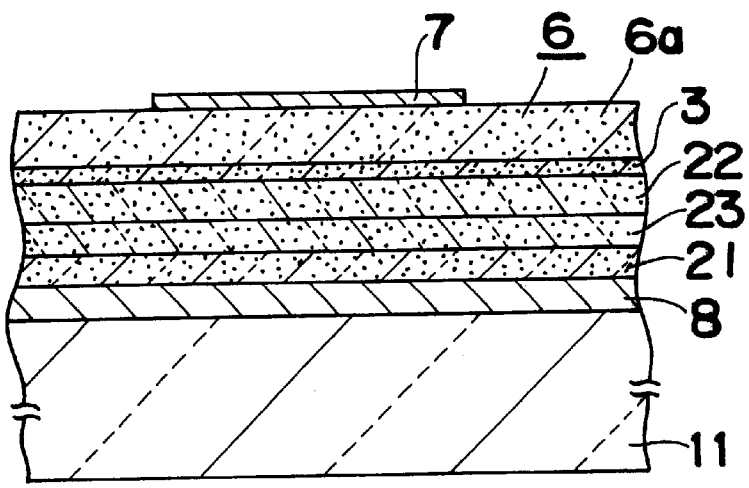
FIG. 6 is a schematic cross-sectional view of an electron source according to Embodiment 5 of the present invention.

Hereinbelow, Embodiment 5 of the present invention will be described. The basic configuration of an electron source according to Embodiment 5 is substantially the same as that of the electron source 10 according to Embodiment 1 shown in FIG. 1. As shown in FIG. 6, however, the configuration is different in that an i-layer 23 formed a low-concentration polycrystalline silicon layer is interposed between the p-layer 22 and the n-layer 21. That is, in Embodiment 5, the semiconductor layer formed of the p-layer 22, the i-layer 23, and the n-layer 21 form a leakage-current preventing member that prevents a leakage current from flowing to the surface electrode 7 from the lower electrode 8.

Thus, in Embodiment 5, as in Embodiment 1, in addition to the drift layer 6, the leakage-current preventing member is provided to prevent leakage current from flowing to the surface electrode 7 from the lower electrode 8. Consequently, without reducing the per-unit-area field emission area in comparison to the conventional cases, a leakage-current flow can be prevented, and a reduction in power consumption can be implemented. In addition, the semiconductor layer that forms the leakage-current preventing member has a pin junction. As such, compared to Embodiment 1 having the pn junctions, the pressure resistance of the leakage-current preventing member can be improved. The i-layer 23 may be provided between the p-layer 22 and the n-layer 21 of each of the other embodiments.

A manufacturing method for the electron source 10 of Embodiment 5 is substantially the same as that in either Embodiment 1 or Embodiment 2. The manufacturing method is different only in that a step of forming the i-layer 23 is added; therefore, detailed description thereof is omitted herefrom.

Embodiment 6

Figure 7:
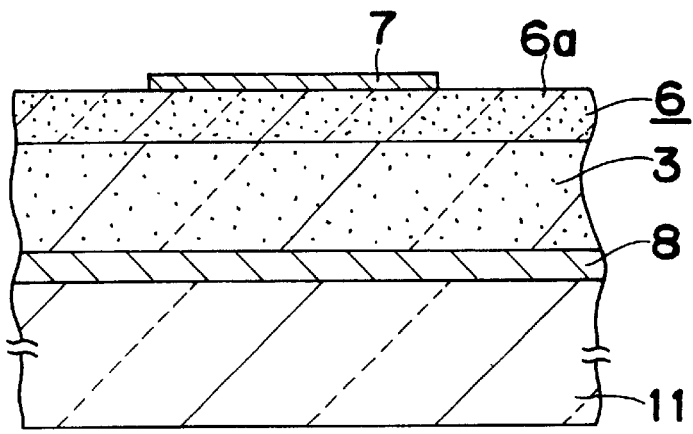
FIG. 7 is a schematic cross-sectional view of an electron source according to Embodiment 6 or 7 of the present invention.

Hereinbelow, Embodiment 6 of the present invention will be described. The basic configuration of an electron source according to Embodiment 6 is substantially the same as that of the electron source 10 according to Embodiment 1 shown in FIG. 1. As shown in FIG. 7, however, the configuration is made to be different such that, instead of providing the semiconductor layer 20, a material for forming a Schottky junction in a portion interfacing with the drift portion 6a is used as a material of the surface electrode 7, and a leakage-current preventing member is configured of the surface electrode 7 and the drift portion 6a. For the material of the surface electrode 7, for example, Cu, Pd, Ag, Al, Ti, Mn, Pb, Bi, Ni, Cr, Fe, Mg, Pt, Be, Sn, Ba, In, Co, Sb, IrSi, PtSi, $Pt_2Si$, MnSi, $Pb_2Si$, $Co_2Si$, NiSi, $Ni_2Si$, or WSi may be used.

Thus, in Embodiment 6, in addition to the drift layer 6, the leakage-current preventing member is provided between the surface electrode 7 and the lower electrode 8 to prevent leakage current from flowing to the surface electrode 7 from the lower electrode 8. Consequently, without reducing the per-unit-area field emission area in comparison to the conventional cases, a leakage-current flow can be prevented, and a reduction in power consumption can be implemented. In addition, in comparison to Embodiments 1 to 5, the configuration can be simplified since a rectification property of the Schottky junction between the surface electrode 7 and the drift layer 6 can be used to prevent a leakage-current flow, avoiding the needs for additionally providing a junction such as the pn junction or the pin junction.

Embodiment 7

Hereinbelow, Embodiment 7 of the present invention will be described. The basic configuration of an electron source 10 according to Embodiment 7 is substantially the same as that of the electron source 10 according to Embodiment 6 shown in FIG. 7. However, the configuration is made to be different such that a material for forming a Schottky junction in a portion interfacing with the undoped polycrystalline silicon layer 3 is used as a material of the lower electrode 8, and a leakage-current preventing member is configured of the lower electrode 8 and the undoped polycrystalline silicon layer 3. For the material of the lower electrode 8, for example, Cu, Pd, Ag, Al, Ti, Mn, Pb, Bi, Ni, Cr, Fe, Mg, Pt, Be, Sn, Ba, In, Co, Sb, IrSi, PtSi, $Pt_2Si$, MnSi, $Pb_2Si$, $Co_2Si$, NiSi, $Ni_2Si$, or WSi may be used.

Thus, in Embodiment 7, in addition to the drift layer 6, the leakage-current preventing member is provided between the surface electrode 7 and the lower electrode 8 to prevent leakage current from flowing to the surface electrode 7 from the lower electrode 8. Consequently, without reducing the per-unit-area field emission area in comparison to the conventional cases, a leakage-current flow can be prevented, and a reduction in power consumption can be implemented. In addition, in comparison to Embodiments 1 to 5, the configuration can be simplified since a rectification property of the Schottky junction between the lower electrode 8 and the undoped polycrystalline silicon layer 3 can be used to prevent a leakage-current flow, avoiding needs for additionally providing a junction such as a pn junction or a pin junction.

Embodiment 8

Hereinbelow, Embodiment 8 of the present invention will be described. The basic configuration of an electron source 10 according to Embodiment 8 is substantially the same as that of the conventional electron source 10" shown in FIG. 46. However, the following aspects are different.

Figure 8:
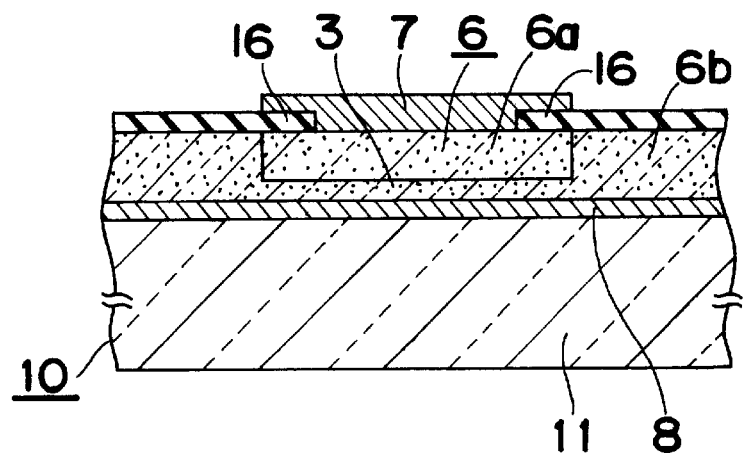
FIG. 8 is a schematic cross-sectional view of an electron source according to Embodiment 8 of the present invention.

In specific, as shown in FIG. 8, an electroconductive layer 8 (lower electrode) made of a thin metal film (such as a thin tungsten film) is formed on one surface of a dielectric substrate 11, and a drift layer 6 is formed on the electroconductive layer 8, in which the drift layer 6 includes a drift portion 6a formed of an oxidized porous polycrystalline silicon layer, and isolating portion 6b that is formed of a polycrystalline silicon layer and that is formed around the drift portions 6a. A surface electrode 7 made of a thin metal film (such as a gold film) is formed on the drift layer 6. The drift layer 6 is formed such that after an undoped polycrystalline silicon layer is overlaid on the entire portion on the side of the surface of the dielectric substrate 11 on which the lower electrode 8 is formed, a portion of the polycrystalline silicon layer which corresponds to the drift portion 6a is formed porous according to an anodic oxidation treatment to thereby form a porous polycrystalline silicon layer; and the porous polycrystalline silicon layer is oxidized by using, for example, a rapid thermal technique. The thickness of the electroconductive layer 8 is set to 200 nm, the thickness of the drift layer 6 is set to 1.5 μm, the thickness of the drift portion 6a is set to 1.0 μm, and the film thickness of the surface electrode 7 is set to 15 nm. However, these numerical values are examples; that is, the thicknesses are not limited thereto. In Embodiment 8, the dielectric substrate 11 forms the substrate.

In the drift layer 6 of the electron source 10 according to Embodiment 8, when forming the drift portion 6a, the undoped polycrystalline silicon layer is made porous from the side of the surface in the depth direction, and the porous formation is terminated on a way so that the porous portion does not reach the electroconductive layer 8. As such, a semiconductor layer 3 formed of a portion of the polycrystalline silicon layer is interposed between the drift portion 6a and the electroconductive layer 8. However, the undoped polycrystalline silicon layer may be formed porous from the side of the surface thereof in the depth direction up to a portion reaching the electroconductive layer 8, and the drift portion 6a may be formed on the electroconductive layer 8 without the semiconductor layer 3 being interposed.

Figure 46:
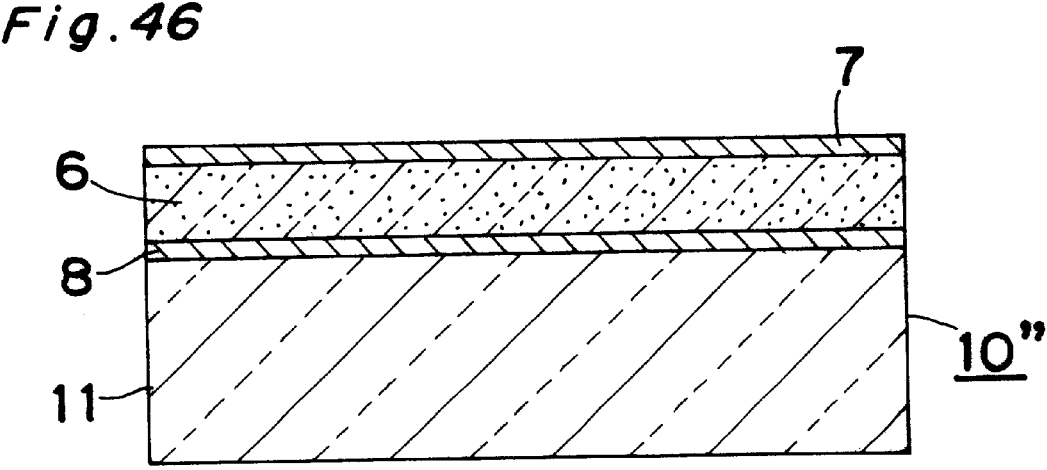
FIG. 46 is a schematic cross-sectional view of another conventional electron source.
Figure 47:
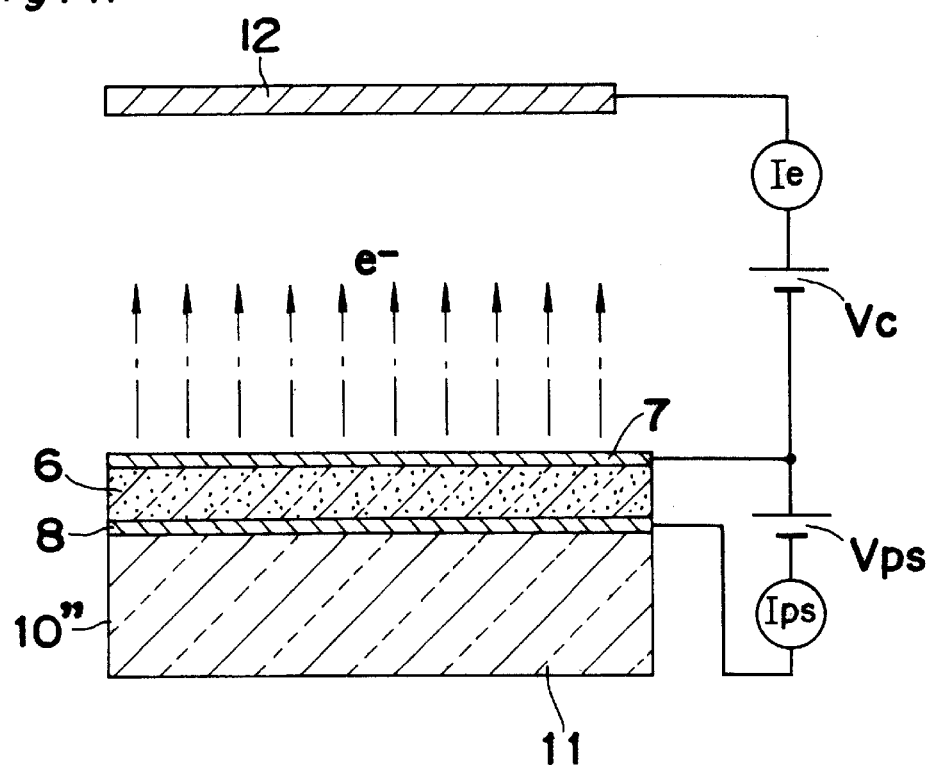
FIG. 47 is a view for explaining the principles of an electron emission mechanism in the conventional electron source shown in FIG. 46.

The basic performance of the electron source 10 according to Embodiment 8 is substantially the same as that of the conventional electron source 10" shown in FIGS. 46 and 47; hence, a detailed description thereof is omitted herefrom. In addition, the electron emission process is substantially the same as in the cases of the conventional electron sources 10' and 10" (refer to FIG. 45); hence, a detailed description thereof is omitted herefrom.

In Embodiment 8, the drift portion 6a is formed of the oxidized porous polycrystalline silicon layer. However, the drift portion 6a may be formed of a nitrided porous polycrystalline silicon layer. Alternatively, the drift portion 6a may be formed of an oxidized or nitrided porous semiconductor layer, which is different from the porous polycrystalline silicon layer. When the drift portion 6a is formed of a nitrided porous polycrystalline silicon layer, a silicon nitride film is formed for either the silicon oxide film 52 or 64 shown in the FIG. 45.

The electron source 10 of Embodiment 8 is characterized in that insulator films 16 are each interposed between a vicinity of a boundary to the isolating portion 6b in the drift portion 6a and the surface electrode 7. Specifically, in the drift portion 6a, while the surface electrode 7 is overlaid in a central portion, the insulator films 16 each formed in the vicinity of the boundary to the isolating portion 6b. In this particular case, the insulator films 16 are formed of a silicon oxide film. However, the material of the insulator film 16 is not limited to the silicon oxide film. For example, the insulator film 16 may be formed of a silicon nitride film.

As above, in the electron source 10 of Embodiment 8, since the insulator film 16 is interposed between the vicinity of the boundary to the isolating portion 6b in the drift portion 6a and the surface electrode 7, the field intensity in the aforementioned vicinity of the boundary becomes sufficiently lower than the field intensity in the central portion of the drift portion 6a. As such, most electrons drifting in the drift portion 6a are led to pass through the central portion of the drift portion 6a, thereby enabling excessive electrons to be prevented from being emitted through the aforementioned vicinity of the boundary. Moreover, since the field intensity in the aforementioned vicinity of the boundary becomes lower than the field intensity in the central portion, dielectric breakdown that can occur in the aforementioned vicinity of the boundary can be prevented, and an overcurrent can be prevented from locally flowing between the electroconductive layer 8 and the surface electrode 7. Furthermore, in the electron source 10 of Embodiment 8, as in the conventional electron source 10' shown in FIG. 43, the dependency to the degree of vacuum as an electron emission property is reduced. Concurrently, a popping phenomenon does not occur during electron emission, and electrons can stably be emitted at high electron emission efficiency.

In Embodiment 8, the insulator film 16 forms a field-moderating member (field-moderating means) that reduces the field intensity in the vicinity of the boundary to the isolating portion 6b to be lower than the field intensity in the central portion of the drift portion 6a. Specifically, the field-moderating member is formed of the insulator film 16 interposed between the aforementioned vicinity of the boundary and the surface electrode 7. As such, when a matrix structure is employed in which a plurality of the surface electrodes 7 and a plurality of the electroconductive layers 8 are arranged in directions intersecting with each other, portions between individual pairs of the adjacent surface electrodes 7 can be insulated by the insulator films 16.

Embodiment 9

Hereinbelow, Embodiment 9 of the present invention will be described. The basic configuration of an electron source 10 according to Embodiment 9 is substantially the same as that of the conventional electron source 10" shown in FIG. 46. However, the following aspects are different.

Figure 9:
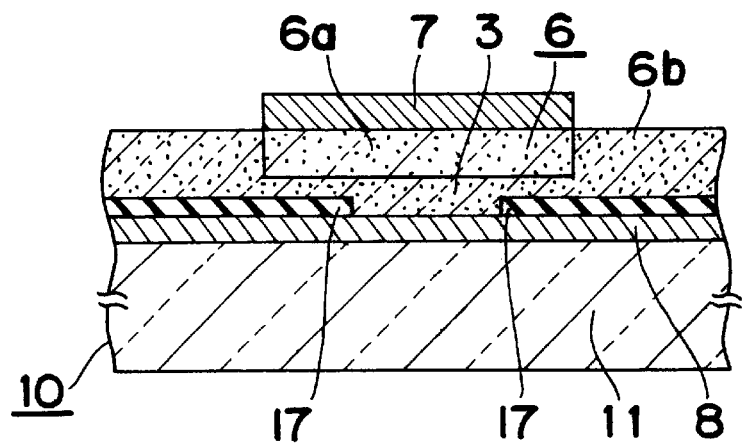
FIG. 9 is a schematic cross-sectional view of an electron source according to Embodiment 9 of the present invention.

In specific, as shown in FIG. 9, an electroconductive layer 8 made of a thin metal film (such as a thin tungsten film) is formed on one surface of a dielectric substrate 11, and insulator films 17 each made of a silicon oxide film patterned to have a predetermined shape are formed on the electroconductive layer 8. A drift layer 6 is formed on the side of the surface of the dielectric substrate 11 on which the electroconductive layer 8 and the insulator films 17 are formed, in which the drift layer 6 includes a drift portion 6a formed of an oxidized porous polycrystalline silicon layer, and isolating portion 6b that is formed of a polycrystalline silicon layer and that is formed around the drift portions 6a. A surface electrode 7 made of a thin metal film (such as a gold film) is formed on the drift layer 6. The drift layer 6 is formed such that after an undoped polycrystalline silicon layer is overlaid on the entire portion on the side of the surface of the dielectric substrate 11 on which the lower electrode 8 and the insulator films 17 are formed, a portion of the polycrystalline silicon layer which corresponds to the drift portion 6a is formed porous according to an anodic oxidation treatment to thereby form a porous polycrystalline silicon layer; and the porous polycrystalline silicon layer is oxidized by using, for example, a rapid thermal technique. The thickness of the electroconductive layer 8 is set to 200 nm, the thickness of thickness of the drift layer 6 is set to 1.5 μm, the thickness of the drift portion 6a is set to 1.0 μm; and the film thickness of the surface electrode 7 is set to 15 nm. However, these numerical values are examples; that is, the thicknesses are not limited thereto. In Embodiment 9, the dielectric substrate 11 forms the substrate.

In the drift layer 6 of the electron source 10 according to Embodiment 9, when forming the drift portion 6a, the undoped polycrystalline silicon layer is made porous from the side of the surface in the depth direction, and the porous formation is terminated on a way so that the porous portion does not reach the electroconductive layer 8. As such, a semiconductor layer 3 formed of a portion of the polycrystalline silicon layer is interposed between the drift portion 6a and the electroconductive layer 8. However, the undoped polycrystalline silicon layer may be formed porous from the side of the surface thereof in the depth direction up to a portion reaching the electroconductive layer 8, and the drift portion 6a may be formed on the electroconductive layer 8 without the semiconductor layer 3 being interposed.

The basic performance of the electron source 10 according to Embodiment 9 is substantially the same as that of the conventional electron source 10" shown in FIGS. 46 and 47; hence, a detailed description thereof is omitted herefrom. In addition, the electron emission process is substantially the same as in the cases of the conventional electron sources 10' and 10" (refer to FIG. 45); hence, a detailed description thereof is omitted herefrom.

In Embodiment 9, the drift portion 6a is formed of the oxidized porous polycrystalline silicon layer. However, the drift portion 6a may be formed of a nitrided porous polycrystalline silicon layer. Alternatively, the drift portion 6a may be formed of an oxidized or nitrided porous semiconductor layer, which is different from the porous polycrystalline silicon layer. When the drift portion 6a is formed of a nitrided porous polycrystalline silicon layer, a silicon nitride film is formed for either the silicon oxide film 52 or 64 shown in the FIG. 45.

The electron source 10 of Embodiment 9 is characterized in that the insulator films 17 are each interposed between a vicinity of the boundary to the isolating portion 6b in the drift portion 6a and the electroconductive layer 8. Specifically, in the drift portion 6a, while only the semiconductor layer 3 is interposed between portions interfacing with the electroconductive layer 8 in a central portion thereof, the semiconductor layer 3 and the insulator films 17 are interposed in the vicinity of the boundary. In Embodiment 9, the insulator films 17 are formed of a silicon oxide film. However, the material of the insulator film 17 is not limited to the silicon oxide film. For example, the insulator film 17 may be formed of a silicon nitride film.

As above, in the electron source 10 of Embodiment 9, since the insulator film 17 is each interposed between the vicinity of the boundary to the isolating portion 6b in the drift portion 6a and the electroconductive layer 8, the field intensity in the aforementioned vicinity of the boundary becomes sufficiently lower than the field intensity in the central portion of the drift portion 6a. As such, most electrons drifting in the drift portion 6a are led to pass through the central portion of the drift portion 6a. Consequently, excessive electrons can be prevented from being emitted through the aforementioned vicinity of the boundary. Moreover, since the field intensity in the aforementioned vicinity of the boundary becomes lower than the field intensity in the central portion, dielectric breakdown that can occur in the aforementioned vicinity of the boundary can be prevented, and an overcurrent can be prevented from locally flowing between the electroconductive layer 8 and the surface electrode 7. Furthermore, in the electron source 10 of Embodiment 9, as in the conventional electron source 10' shown in FIG. 43, the dependency to the degree of vacuum as an electron emission property is reduced. Concurrently, a popping phenomenon does not occur during electron emission, and electrons can stably be emitted at high electron emission efficiency.

In Embodiment 9, the insulator film 17 forms a field-moderating member (field-moderating means) that reduces the field intensity in the vicinity of the boundary to the isolating portion 6b to be lower than the field intensity in the central portion of the drift portion 6a. Specifically, the field-moderating member is formed of the insulator film 17 interposed between the aforementioned vicinity of the boundary and the surface electrode 7. As such, when a matrix structure is employed in which a plurality of the surface electrodes 7 and a plurality of the electroconductive layers 8 are arranged in directions intersecting with each other, occurrence of crosstalk can be prevented.

Embodiment 10

Hereinbelow, Embodiment 10 of the present invention will be described. The basic configuration of an electron source 10 according to Embodiment 10 is substantially the same as that of the conventional electron source 10" shown in FIG. 46. However, the following aspects are different.

Figure 10:
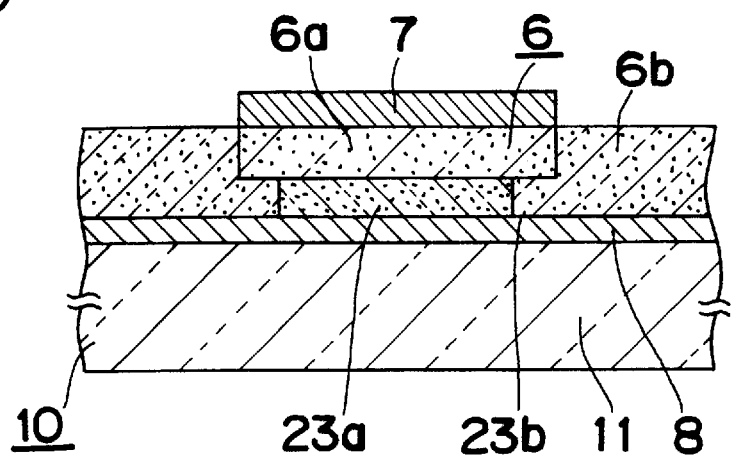
FIG. 10 is a schematic cross-sectional view of an electron source according to Embodiment 10 of the present invention.

In specific, as shown in FIG. 10, an electroconductive layer 8 made of a thin metal film (such as a thin tungsten film) is formed on one surface of a dielectric substrate 11, and a drift layer 6 is formed on the electroconductive layer 8, in which the drift layer 6 includes a drift portion 6a formed of an oxidized porous polycrystalline silicon layer, and isolating portion 6b that is formed of a polycrystalline silicon layer and that is formed around the drift portions 6a. A surface electrode 7 made of a thin metal film (such as a gold film) is formed on the drift layer 6. The drift layer 6 is formed such that after an undoped polycrystalline silicon layer is overlaid on the side of the surface of the dielectric substrate 11, a portion of the polycrystalline silicon layer which corresponds to the drift portion 6a is formed porous according to an anodic oxidation treatment to thereby form a porous polycrystalline silicon layer; and the porous polycrystalline silicon layer is oxidized by using, for example, a rapid thermal technique. The thickness of the electroconductive layer 8 is set to 200 nm, the thickness of the drift layer 6 is set to 1.5 μm, the thickness of the drift portion 6a is set to 1.0 μm, and the film thickness of the surface electrode 7 is set to 15 nm. However, these numerical values are examples; that is, the thicknesses are not limited thereto. In Embodiment 10, the dielectric substrate 11 forms the substrate.

The basic performance of the electron source 10 according to Embodiment 10 is substantially the same as that of the conventional electron source 10" shown in FIGS. 46 and 47; hence, a detailed description thereof is omitted herefrom. In addition, the electron emission process is substantially the same as in the cases of the conventional electron sources 10' and 10" (refer to FIG. 45); hence, a detailed description thereof is omitted herefrom.

In Embodiment 10, the drift portion 6a is formed of the oxidized porous polycrystalline silicon layer. However, the drift portion 6a may be formed of a nitrided porous polycrystalline silicon layer. Alternatively, the drift portion 6a may be formed of an oxidized or nitrided porous semiconductor layer, which is different from the porous polycrystalline silicon layer. When the drift portion 6a is formed of a nitrided porous polycrystalline silicon layer, a silicon nitride film is formed for either the silicon oxide film 52 or 64 shown in the FIG. 45.

The electron source 10 of Embodiment 10 is characterized in that a high-resistance first semiconductor layer 23b is interposed between a vicinity of the boundary to the isolating portion 6b in the drift portion 6a and the electroconductive layer 8, and a low-resistance second semiconductor layer 23a is interposed between the central portion in the drift portion 6a and the electroconductive layer 8. The second semiconductor layer 23a is doped with an impurity to cause the resistance thereof to be sufficiently lower in comparison to that of the first semiconductor layer 23b. For performing doping with the impurity, for example, an ion implantation technique or a diffusion technique may be used.

As above, in the electron source 10 of Embodiment 10, the first semiconductor layer 23b is interposed between the vicinity of the boundary to the isolating portion 6b in the drift portion 6a and the electroconductive layer 8, and the second semiconductor layer 23a having a resistance sufficiently lower than that of the first semiconductor layer 23b is interposed between the central portion of the drift portion 6a and the electroconductive layer 8. Accordingly, the field intensity in the aforementioned vicinity of the boundary becomes sufficiently lower than the field intensity in the central portion of the drift portion 6a. Because of this arrangement, most electrons drifting in the drift portion 6a are led to pass through the central portion of the drift portion 6a. Consequently, excessive electrons can be prevented from being emitted through the aforementioned vicinity of the boundary. Moreover, since the field intensity in the aforementioned vicinity of the boundary becomes lower than the field intensity in the central portion, dielectric breakdown that can occur in the aforementioned vicinity of the boundary can be prevented, and an overcurrent can be prevented from locally flowing between the electroconductive layer 8 and the surface electrode 7. In the electron source 10 of Embodiment 10, as in the conventional electron source 10' shown in FIG. 43, the dependency to the degree of vacuum as an electron emission property is reduced. Concurrently, a popping phenomenon does not occur during electron emission, and electrons can stably be emitted at high electron emission efficiency.

In Embodiment 10, the first semiconductor layer 23b and the second semiconductor layer 23a form a field-moderating member that reduces the field intensity in the vicinity of the boundary to the isolating portion 6b to be lower than the field intensity in the central portion of the drift portion 6a. That is, since the field-moderating member is formed of the high-resistance first semiconductor layer 23b, which is interposed between the aforementioned vicinity of the boundary and the electroconductive layer 8, and the low-resistance second semiconductor layer 23a, which is interposed between the central portion of the drift portion 6a and the electroconductive layer 8, restrictions for patterns of the individual surface electrode 7 and electroconductive layer 8 can be eliminated.

Embodiment 11

Hereinbelow, Embodiment 11 of the present invention will be described. The basic configuration of an electron source 10 according to Embodiment 11 is substantially the same as that of the conventional electron source 10" shown in FIG. 46. However, the following aspects are different.

Figure 11:
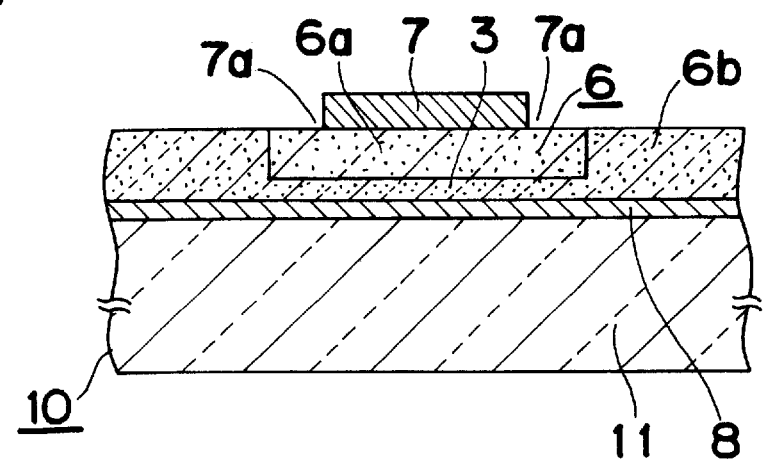
FIG. 11 is a schematic cross-sectional view of an electron source according to Embodiment 11 of the present invention.

In specific, as shown in FIG. 11, an electroconductive layer 8 made of a thin metal film (such as a thin tungsten film) is formed on one surface of a dielectric substrate 11, and a drift layer 6 is formed on the electroconductive layer 8, in which the drift layer 6 includes a drift portion 6a formed of an oxidized porous polycrystalline silicon layer, and isolating portion 6b that is formed of a polycrystalline silicon layer and that is formed around the drift portions 6a. A surface electrode 7 made of a thin metal film (such as a gold film) is formed on the drift layer 6. The drift layer 6 is formed such that after an undoped polycrystalline silicon layer is overlaid on the side of the surface of the dielectric substrate 11 on which the electroconductive layer 8 is formed, a portion of the polycrystalline silicon layer which corresponds to the drift portion 6a is formed porous according to an anodic oxidation treatment to thereby form a porous polycrystalline silicon layer; and the porous polycrystalline silicon layer is oxidized by using, for example, a rapid thermal technique. The thickness of the electroconductive layer 8 is set to 200 nm, the thickness of the drift layer 6 is set to 1.5 μm, the thickness of the drift portion 6a is set to 1.0 μm, and the film thickness of the surface electrode 7 is set to 15 nm. However, these numerical values are examples; that is, the thicknesses are not limited thereto. In Embodiment 11, the dielectric substrate 11 forms the substrate.

In the drift layer 6 of the electron source 10 according to Embodiment 11, when forming the drift portion 6a, the undoped polycrystalline silicon layer is made porous from the side of the surface in the depth direction, and the porous formation is terminated on a way so that the porous portion does not reach the electroconductive layer 8. As such, a semiconductor layer 3 formed of a portion of the polycrystalline silicon layer is interposed between the drift portion 6a and the electroconductive layer 8. However, the undoped polycrystalline silicon layer may be formed porous from the side of the surface thereof in the depth direction up to a portion reaching the electroconductive layer 8, and the drift portion 6a may be formed on the electroconductive layer 8 without the semiconductor layer 3 being interposed.

The basic performance of the electron source 10 according to Embodiment 11 is substantially the same as that of the conventional electron source 10" shown in FIGS. 46 and 47; hence, a detailed description thereof is omitted herefrom. In addition, the electron emission process is substantially the same as in the cases of the conventional electron sources 10' and 10" (refer to FIG. 45); hence, a detailed description thereof is omitted herefrom.

In Embodiment 11, the drift portion 6a is formed of the oxidized porous polycrystalline silicon layer. However, the drift portion 6a may be formed of a nitrided porous polycrystalline silicon layer. Alternatively, the drift portion 6a may be formed of an oxidized or nitrided porous semiconductor layer, which is different from the porous polycrystalline silicon layer. When the drift portion 6a is formed of a nitrided porous polycrystalline silicon layer, a silicon nitride film is formed for either the silicon oxide film 52 or 64 shown in the FIG. 45.

The electron source 10 of Embodiment 11 is characterized in that, cutout portions 7a are each formed in the surface electrode 7 in a region of the drift portion 6a which overlaps with the vicinity of the boundary to the isolating portion 6b. That is, in the drift portion 6a, while the surface electrode 7 is overlaid in a central portion, the surface electrode 7 does not exist in the aforementioned vicinity of the boundary. Specifically, in the left-right direction in FIG. 11, the width of the surface electrode 7 is smaller than the width of the drift portion 6a, and two ends of the surface electrode 7 are positioned more inwardly than two ends of the drift portion 6a.

As above, in the electron source 10 of Embodiment 11, the cutout portion 7a is formed in the surface electrode 7 in the region overlapping with the vicinity of the boundary to the isolating portion 6b. Accordingly, the field intensity in the aforementioned vicinity of the boundary becomes sufficiently lower than the field intensity in the central portion of the drift portion 6a. Because of this arrangement, most electrons drifting in the drift portion 6a are led to pass through the central portion of the drift portion 6a. Consequently, excessive electrons can be prevented from being emitted through the aforementioned vicinity of the boundary. Moreover, since the field intensity in the aforementioned vicinity of the boundary becomes lower than the field intensity in the central portion, dielectric breakdown that can occur in the aforementioned vicinity of the boundary can be prevented, and an overcurrent can be prevented from locally flowing between the electroconductive layer 8 and the surface electrode 7. In the electron source 10 of Embodiment 11, as in the conventional electron source 10' shown in FIG. 43, the dependency to the degree of vacuum as an electron emission property is reduced. Concurrently, a popping phenomenon does not occur during electron emission, and electrons can stably be emitted at high electron emission efficiency.

In Embodiment 11, the cutout portion 7a in the surface electrode 7 forms a field-moderating member that reduces the field intensity in the vicinity of the boundary to the isolating portion 6b to be lower than the field intensity in the central portion of the drift portion 6a. Consequently, excessive electrons can be prevented from being emitted only by changing the pattern of the surface electrode 7 (i.e., only by changing a mask for patterning the surface electrode 7).

Embodiment 12

Hereinbelow, Embodiment 12 of the present invention will be described. The basic configuration of an electron source 10 according to Embodiment 12 is substantially the same as that of the conventional electron source 10" shown in FIG. 46. However, the following aspects are different.

Figure 12:
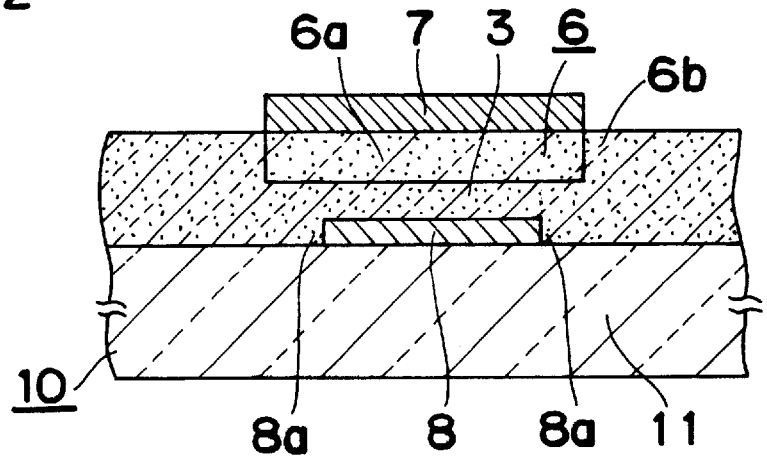
FIG. 12 is a schematic cross-sectional view of an electron source according to Embodiment 12 of the present invention.

In specific, as shown in FIG. 12, an electroconductive layer 8 made of a thin metal film (such as a thin tungsten film) is formed on one surface of a dielectric substrate 11, and a drift layer 6 is formed on the electroconductive layer 8, in which the drift layer 6 includes a drift portion 6a formed of an oxidized porous polycrystalline silicon layer, and isolating portion 6b that is formed of a polycrystalline silicon layer and that is formed around the drift portions 6a. A surface electrode 7 made of a thin metal film (such as a gold film) and patterned to have a predetermined shape is formed on the drift layer 6. The drift layer 6 is formed such that after an undoped polycrystalline silicon layer is overlaid on the side of the surface of the dielectric substrate 11 on which the electroconductive layer 8 is formed, a portion of the polycrystalline silicon layer which corresponds to the drift portion 6a is formed porous according to an anodic oxidation treatment to thereby form a porous polycrystalline silicon layer; and the porous polycrystalline silicon layer is oxidized by using, for example, a rapid thermal technique. The thickness of the electroconductive layer 8 is set to 200 nm, the thickness of the drift layer 6 is set to 1.5 μm, the thickness of the drift portion 6a is set to 1.0 μm, and the film thickness of the surface electrode 7 is set to 15 nm. However, these numerical values are examples; that is, the thicknesses are not limited thereto. In Embodiment 12, the dielectric substrate 11 forms the substrate.

In the drift layer 6 of the electron source 10 according to Embodiment 12, when forming the drift portion 6a, the undoped polycrystalline silicon layer is made porous from the side of the surface in the depth direction, and the porous formation is terminated on a way so that the porous portion does not reach the electroconductive layer 8. As such, a semiconductor layer 3 formed of a portion of the polycrystalline silicon layer is interposed between the drift portion 6a and the electroconductive layer 8. However, the undoped polycrystalline silicon layer may be formed porous from the side of the surface thereof in the depth direction up to a portion reaching the electroconductive layer 8, and the drift portion 6a may be formed on the electroconductive layer 8 without the semiconductor layer 3 being interposed.

The basic performance of the electron source 10 according to Embodiment 12 is substantially the same as that of the conventional electron source 10" shown in FIGS. 46 and 47; hence, a detailed description thereof is omitted herefrom. In addition, the electron emission process is substantially the same as in the cases of the conventional electron sources 10' and 10" (refer to FIG. 45); hence, a detailed description thereof is omitted herefrom.

In Embodiment 12, the drift portion 6a is formed of the oxidized porous polycrystalline silicon layer. However, the drift portion 6a may be formed of a nitrided porous polycrystalline silicon layer. Alternatively, the drift portion 6a may be formed of an oxidized or nitrided porous semiconductor layer, which is different from the porous polycrystalline silicon layer. When the drift portion 6a is formed of a nitrided porous polycrystalline silicon layer, a silicon nitride film is formed for either the silicon oxide film 52 or 64 shown in the FIG. 45.

The electron source 10 of Embodiment 12 is characterized in that, cutout portions 8c are each formed in the surface electrode 8 in a region of the drift portion 6a which overlaps with the vicinity of the boundary to the isolating portion 6b. That is, while the electroconductive layer 8 is formed in a portion overlapping with a central portion of the drift portion 6a, the electroconductive layer 8 does not exist in the aforementioned vicinity of the boundary. Specifically, in the left-right direction in FIG. 12, the width of the surface electrode 7 is smaller than the width of the electroconductive layer 8. Concurrently, two ends of the electroconductive layer 8 are positioned more inwardly than two ends of the drift portion 6a.

As above, in the electron source 10 of Embodiment 12, the cutout portion 8c is each formed in the electroconductive layer 8 in the region overlapping with the vicinity of the boundary to the isolating portion 6b. Accordingly, the field intensity in the aforementioned vicinity of the boundary becomes sufficiently lower than the field intensity in the central portion of the drift portion 6a. Because of this arrangement, most electrons drifting in the drift portion 6a are led to pass through the central portion of the drift portion 6a. Consequently, excessive electrons can be prevented from being emitted through the aforementioned vicinity of the boundary. Moreover, since the field intensity in the aforementioned vicinity of the boundary becomes lower than the field intensity in the central portion, dielectric breakdown that can occur in the aforementioned vicinity of the boundary can be prevented, and an overcurrent can be prevented from locally flowing between the electroconductive layer 8 and the surface electrode 7. In the electron source 10 of Embodiment 12, as in the conventional electron source 10' shown in FIG. 43, the dependency to the degree of vacuum as an electron emission property is reduced. Concurrently, a popping phenomenon does not occur during electron emission, and electrons can stably be emitted at high electron emission efficiency.

In Embodiment 12, the cutout portion 8c in the electroconductive layer 8 forms a field-moderating member that reduces the field intensity in the vicinity of the boundary to the isolating portion 6b to be lower than the field intensity in the central portion of the drift portion 6a. Consequently, in Embodiment 12, excessive electrons can be prevented from being emitted only by changing the pattern of the electroconductive layer 8 (i.e., only by changing a mask for patterning the electroconductive layer 8).

Embodiment 13

Hereinbelow, Embodiment 13 of the present invention will be described. The basic configuration of an electron source 10 according to Embodiment 13 is substantially the same as that of the conventional electron source 10" shown in FIG. 48. However, the following aspects are different.

Figure 13:
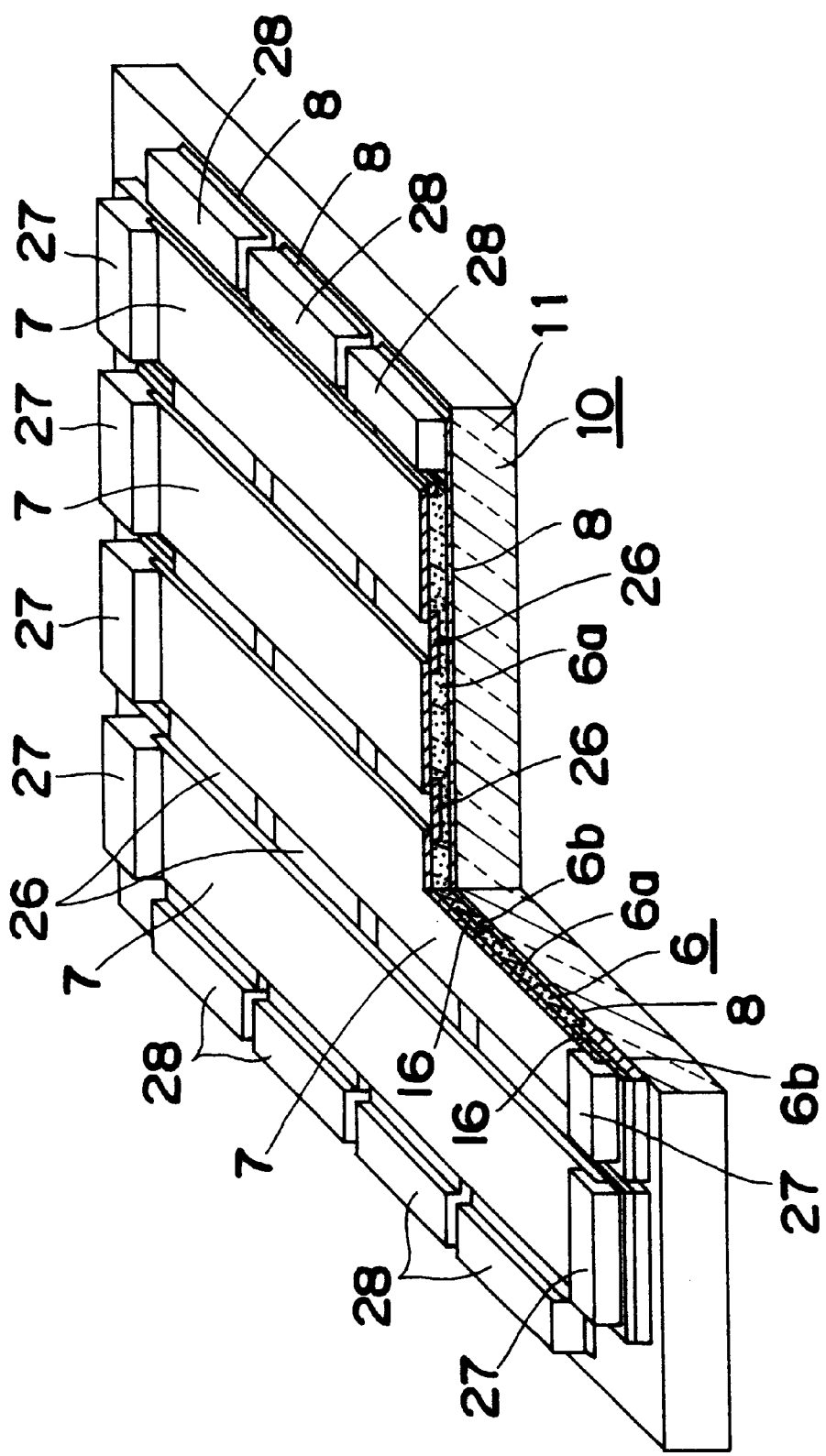
FIG. 13 is a schematic cross-sectional view of an electron source according to Embodiment 13 of the present invention.

In specific, as shown in FIG. 13, the configuration includes a dielectric substrate 11 made of glass substrate; a plurality of lower electrodes 8 that are formed of an electroconductive layer and that are arranged on one surface of the dielectric substrate 11; a drift layer 6 including a plurality of drift portions 6a that are formed of an oxidized porous polycrystalline silicon layer and that are individually formed in such a manner as to overlap with the lower electrodes 8, and a plurality of isolating portions 6b that are formed of a polycrystalline silicon layer and that each fill up a space between the drift portions 6a; and a plurality of surface electrodes 7 arranged in directions intersecting with (perpendicular to) each other in such a manner as to cross the drift portions 6a and the isolating portions 6b on the drift layer 6. The lower electrodes 8 are formed of a thin tungsten film. The surface electrodes 7 are formed of an electroconductive thin film made of a gold film. The thickness of the lower electrode 8 is set to 200 nm, and the thickness of the surface electrode 7 is set to 15 nm. However, these thicknesses are not limited to the above numerical values. The thickness of the drift layer 6 is set to 1.5 μm; and the thickness of the drift portion 6a is set to 1.5 μm. The thicknesses of the drift layer 6 and the drift portion 6a are not limited to the above numerical values. In Embodiment 13, the dielectric substrate 11 forms the substrate.

In substantially the same manner as that in the conventional electron source 10" shown in FIG. 48, in the electron source 10 of Embodiment 13, the drift portions 6a of the drift layer 6 are sandwiched between the plurality of lower electrodes 8 and the plurality of surface electrodes 7. As such, when an associated set of the surface electrode 7 and the lower electrode 8 is appropriately selected, and voltage is applied into the selected set, a strong field is applied only to the drift portion 6a in the position corresponding to the intersection of the selected surface electrode 7 and lower electrode 8, and electrons are thereby emitted. Specifically, as in a case where electron sources are individually disposed at intersections in a check pattern formed of the surface electrodes 7 and the lower electrodes 8, when an associated set of the surface electrode 7 and the lower electrode 8 is selected, electrons can be emitted from a desired intersection. The voltage to be applied between the surface electrode 7 and the lower electrode 8 is set to a range of from 10 to 20 V. Each of the surface electrodes 7 is formed as a stripe having two end portions in a longitudinal direction on which pads 27 are individually formed. Similarly, each of the lower electrodes 8 is formed as a stripe having two end portions in a longitudinal direction on which pads 28 are individually formed.

The basic performance of the electron source 10 according to Embodiment 13 is substantially the same as that of the conventional electron source 10" shown in FIGS. 46 and 47; hence, a detailed description thereof is omitted herefrom. In addition, the electron emission process and a microstructure of the drift layer 6 (drift portion 6a) are substantially the same as in the cases of the conventional electron sources 10' and 10" (refer to FIG. 45); hence, a detailed description thereof is omitted herefrom.

In Embodiment 13, the drift portion 6a is formed of the oxidized porous polycrystalline silicon layer. However, the drift portion 6a may be formed of a nitrided porous polycrystalline silicon layer. Alternatively, the drift portion 6a may be formed of an oxidized or nitrided porous semiconductor layer, which is different from the porous polycrystalline silicon layer. When the drift portion 6a is formed of a nitrided porous polycrystalline silicon layer, a silicon nitride film is formed for either the silicon oxide film 52 or 64 shown in the FIG. 45.

The electron source 10 of Embodiment 13 is characterized in that insulator films 16 are each interposed between a vicinity of the boundary to the isolating portion 6b in the drift portion 6a and the surface electrode 7. Specifically, in the drift portion 6a, while the surface electrode 7 is overlaid in a central portion thereof, the insulator films 16 each formed in the aforementioned vicinity of the boundary. In addition, insulator films 26 formed of a silicon oxide film are each formed on the side of the surface of the drift portion 6a in such a manner as to overlap with the adjacent surface electrodes 7. In the insulator film 26, two end portions in the longitudinal direction of the drift portion 6a overlap with an end portion in the width direction of each of the surface electrodes 7.

In Embodiment 13, the individual insulator films 16 and 26 are formed of a silicon oxide film. However, the material is not limited to the silicon oxide films, and the films may be formed of, for example, a silicon nitride film.

As above, in the electron source 10 of Embodiment 13, since the insulator film 16 is interposed between the vicinity of the boundary to the isolating portion 6b in the drift portion 6a and the surface electrode 7, the field intensity in the aforementioned vicinity of the boundary becomes sufficiently lower than the field intensity in the central portion of the drift portion 6a. As such, most electrons drifting in the drift portion 6a are led to pass through the central portion of the drift portion 6a. Thereby, excessive electrons can be prevented from being emitted through the aforementioned vicinity of the boundary. In addition, an individual space between the surface electrodes 7 can be insulated by the insulator film 16. Moreover, since the insulator films 26 made of the silicon oxide film are each formed on the side of the surface of the drift layer 6 in such a manner as to overlap with the adjacent surface electrodes 7, electrons can be prevented from being emitted through portions between individual pairs of the adjacent surface electrodes 7; and concurrently, crosstalk can be prevented. Furthermore, since the field intensity in the aforementioned vicinity of the boundary becomes lower than the field intensity in the central portion, dielectric breakdown that can occur in the aforementioned vicinity of the boundary can be prevented, and an overcurrent can be prevented from locally flowing between the lower electrode 8 and the surface electrode 7. In the electron source 10 of Embodiment 13, as in the conventional electron source 10' shown in FIG. 43, the dependency to the degree of vacuum as an electron emission property is reduced. Concurrently, a popping phenomenon does not occur during electron emission, and electrons can stably be emitted at high electron emission efficiency.

In Embodiment 13, the insulator film 16 forms a field-moderating member that reduces the field intensity in the vicinity of the boundary to the isolating portion 6b to be lower than the field intensity in the central portion of the drift portion 6a.

Embodiment 14

Hereinbelow, Embodiment 14 of the present invention will be described. The basic configuration of an electron source 10 according to Embodiment 14 is substantially the same as that of the conventional electron source 10" shown in FIG. 48. However, the following aspects are different.

Figure 14:
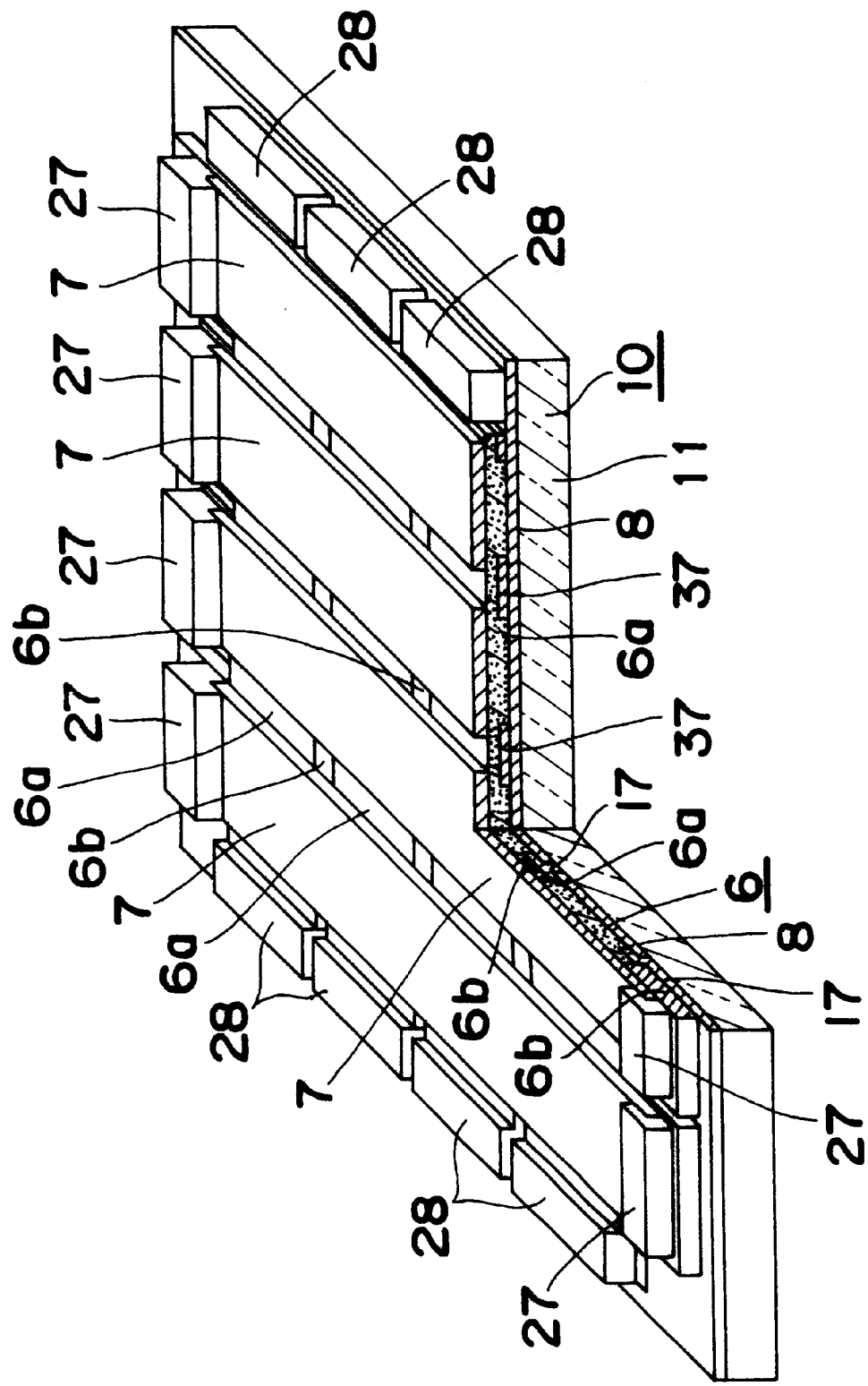
FIG. 14 is a partially-cutaway schematic perspective view of an electron source according to Embodiment 14 of the present invention.

In specific, as shown in FIG. 14, the configuration includes a dielectric substrate 11 made of glass substrate; a plurality of lower electrodes 8 that are formed of an electroconductive layer and that are arranged on one surface of the dielectric substrate 11; a drift layer 6 including a plurality of drift portions 6a that are formed of an oxidized porous polycrystalline silicon layer and that are individually formed in such a manner as to overlap with the lower electrodes 8, and a plurality of isolating portions 6b that are formed of a polycrystalline silicon layer and that each fill up a space between the drift portions 6a; and a plurality of surface electrodes 7 arranged in directions intersecting with (perpendicular to) the lower electrodes 8 in such a manner as to cross the drift portions 6a and the isolating portions 6b on the drift layer 6. The lower electrodes 8 are formed of a thin tungsten film. The surface electrodes 7 are formed of an electroconductive thin film made of a gold film. The thickness of the lower electrode 8 is set to 200 nm, and the thickness of the surface electrode 7 is set to 15 nm. However, these thicknesses are not limited to the above numerical values. The thickness of the drift layer 6 is set to 1.5 µm, and the thickness of the drift portion 6a is set to 1.0 µm. The thicknesses of the drift layer 6 and the drift portion 6a are not limited to the above numerical values. In Embodiment 14, the dielectric substrate 11 forms the substrate.

As in the conventional electron source 10" shown in FIG. 48, in the electron source 10 of Embodiment 14, the drift portions 6a of the drift layer 6 are sandwiched between the plurality of lower electrodes 8 and the plurality of surface electrodes 7. As such, when an associated set of the surface electrode 7 and the lower electrode 8 is appropriately selected, and voltage is applied into the selected set, a strong field is applied only to the drift portion 6a in the position corresponding to the intersection of the selected surface electrode 7 and lower electrode 8, and electrons are thereby emitted. Specifically, as in a case where electron sources are individually disposed at intersections in a check pattern formed of the surface electrodes 7 and the lower electrodes 8, when an associated set of the surface electrode 7 and the lower electrode 8 is selected, electrons can be emitted from a desired intersection. The voltage to be applied between the surface electrode 7 and the lower electrode 8 is set to a range of from 10 to 20 V. Each of the surface electrodes 7 is formed as a stripe having two end portions in a longitudinal direction on which pads 27 are individually formed. Similarly, each of the lower electrodes 8 is formed as a stripe having two end portions in a longitudinal direction on which pads 28 are individually formed.

The basic performance of the electron source 10 according to Embodiment 14 is substantially the same as that of the conventional electron source 10" shown in FIGS. 46 and 47; hence, a detailed description thereof is omitted herefrom. In addition, the electron emission process and a microstructure of the drift layer 6 (drift portion 6a) are substantially the same as in the cases of the conventional electron sources 10' and 10" (refer to FIG. 45); hence, a detailed description thereof is omitted herefrom.

In Embodiment 14, the drift portion 6a is formed of the oxidized porous polycrystalline silicon layer. However, the drift portion 6a may be formed of a nitrided porous polycrystalline silicon layer. Alternatively, the drift portion 6a may be formed of an oxidized or nitrided porous semiconductor layer, which is different from the porous polycrystalline silicon layer. When the drift portion 6a is formed of a nitrided porous polycrystalline silicon layer, a silicon nitride film is formed for either the silicon oxide film 52 or 64 shown in the FIG. 45.

The electron source 10 of Embodiment 14 is characterized in that the insulator films 17 are each formed on the lower electrode 8 in the portion between the vicinity of the boundary to the isolating portion 6b and the electroconductive layer 8. That is, while the central portion of the drift portion 6a is overlaid on the electroconductive layer 8, the insulator film 17 is formed in the aforementioned vicinity of the boundary. In addition, insulator films 37 made of a silicon oxide film is each formed on the drift portion 6a on the side of the wiring 8a in such a manner as to overlap with the adjacent surface electrodes 7. In the insulator film 37, two end portions in the longitudinal direction of the drift portion 6a overlap with an end portion of the surface electrodes 7 in the width direction.

In Embodiment 14, the individual insulator films 17 and 37 are formed of a silicon oxide film. However, the material is not limited to the silicon oxide films, and the films may be formed of, for example, a silicon nitride film.

As above, in the electron source 10 of Embodiment 14, since the insulator film 16 is interposed between the vicinity of the boundary to the isolating portion 6b in the drift portion 6a and the electroconductive layer 8, the field intensity in the aforementioned vicinity of the boundary becomes sufficiently lower than the field intensity in the central portion of the drift portion 6a. As such, most electrons drifting in the drift portion 6a are led to pass through the central portion of the drift portion 6a. Thereby, excessive electrons can be prevented from being emitted through the aforementioned vicinity of the boundary. Moreover, since the insulator films 37 made of the silicon oxide film are each formed on the side of the surface of the drift layer 6 in such a manner as to overlap with the adjacent surface electrodes 7, electrons can be prevented from being emitted through portions between individual pairs of the adjacent surface electrodes 7; and concurrently, crosstalk can be prevented. Furthermore, since the field intensity in the aforementioned vicinity of the boundary becomes lower than the field intensity in the central portion, dielectric breakdown that can occur in the aforementioned vicinity of the boundary can be prevented, and an overcurrent can be prevented from locally flowing between the lower electrode 8 and the surface electrode 7. Furthermore, in the electron source 10 of Embodiment 14, as in the conventional electron source 10' shown in FIG. 43, the dependency to the degree of vacuum as an electron emission property is reduced. Concurrently, a popping phenomenon does not occur during electron emission, and hence electrons can stably be emitted at high electron emission efficiency.

In Embodiment 14, the insulator film 17 forms a field-moderating member that reduces the field intensity in the vicinity of the boundary to the isolating portion 6b to be lower than the field intensity in the central portion of the drift portion 6a.

Embodiment 15

Hereinbelow, Embodiment 15 of the present invention will be described. The basic configuration of an electron source 10 according to Embodiment 15 is substantially the same as that of the conventional electron source 10" shown in FIG. 48. However, the following aspects are different.

Figure 15:
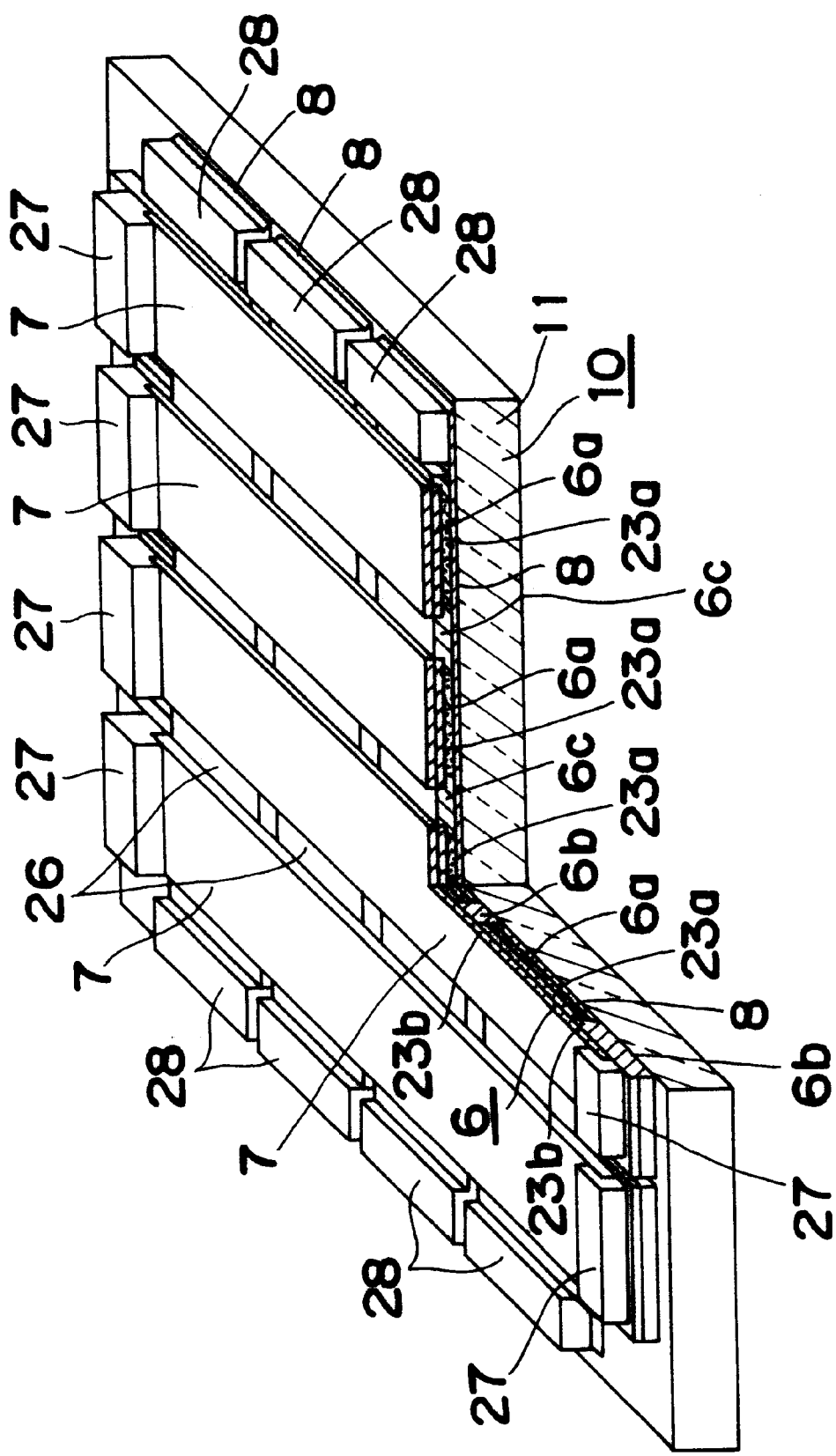
FIG. 15 is a partially-cutaway schematic perspective view of an electron source according to Embodiment 15 of the present invention.

In specific, as shown in FIG. 15, the configuration includes a dielectric substrate 11 made of glass substrate; a plurality of lower electrodes 8 that are formed of an electroconductive layer and that are arranged on one surface of the dielectric substrate 11; a drift layer 6 including a plurality of drift portions 6a that are formed of an oxidized porous polycrystalline silicon layer and that are individually formed in such a manner as to overlap with the lower electrodes 8, and a plurality of isolating portions 6b that are formed of a polycrystalline silicon layer and that each fill up a space between the drift portions 6a; and a plurality of surface electrodes 7 arranged in directions intersecting with (perpendicular to) the lower electrodes 8 on the drift layer 6. The drift layer 6 includes drift portions 6a that are made of an oxidized porous polycrystalline silicon layer and that are each formed of on the side of the surface electrodes 7 in a region where the surface electrode 7 and the lower electrode 8 overlap with each other; isolating portions 6b that are made of an undoped polycrystalline silicon layer and that are each formed between the adjacent drift portions 6a in the longitudinal direction of the surface electrode 7; high-resistance first semiconductor layers 23b each interposed between the vicinity of a boundary to the isolating portion 6a in the drift portion 6a and the lower electrode 8; low-resistance second semiconductor layers 23b each formed between the drift portion 6a and the lower electrode 8; and isolating portions 6c each formed between the adjacent drift portions 6a in the longitudinal direction of the lower electrode 8.

The lower electrodes 8 are formed of a thin tungsten film. The surface electrodes 7 are formed of an electroconductive thin film made of a gold film. The thickness of the lower electrode 8 is set to 200 nm, and the thickness of the surface electrode 7 is set to 15 nm. However, these thicknesses are not limited to the above numerical values. The thickness of the drift layer 6 is set to 1.5 µm, and the thickness of the drift portion 6a is set to 1.0 µm. The thicknesses of the drift layer 6 and the drift portion 6a are not limited to the above numerical values. The dielectric substrate 11 forms the substrate.

As in the conventional electron source 10" shown in FIG. 48, in the electron source 10 of Embodiment 15, the drift portions 6a of the drift layer 6 are sandwiched between the plurality of lower electrodes 8 and the plurality of surface electrodes 7. As such, when an associated set of the surface electrode 7 and the lower electrode 8 is appropriately selected, and voltage is applied into the selected set, a strong field is applied only to the drift portion 6a in the position corresponding to the intersection of the selected surface electrode 7 and lower electrode 8, and electrons are thereby emitted. Specifically, as in a case where electron sources are individually disposed at intersections in a check pattern formed of the surface electrodes 7 and the lower electrodes 8, when an associated set of the surface electrode 7 and the lower electrode 8 is selected, electrons can be emitted from a desired intersection. The voltage to be applied between the surface electrode 7 and the lower electrode 8 is set to a range of from 10 to 20 V. Each of the surface electrodes 7 is formed as a stripe having two end portions in a longitudinal direction on which pads 27 are individually formed. Similarly, each of the lower electrodes 8 is formed as a stripe having two end portions in a longitudinal direction on which pads 28 are individually formed.

The basic performance of the electron source 10 according to Embodiment 15 is substantially the same as that of the conventional electron source 10" shown in FIGS. 46 and 47; hence, a detailed description thereof is omitted herefrom. In addition, the electron emission process and a microstructure of the drift layer 6 (drift portion 6a) are substantially the same as in the cases of the conventional electron sources 10' and 10" (refer to FIG. 45); hence, a detailed description thereof is omitted herefrom.

In Embodiment 15, the drift portion 6a is formed of the oxidized porous polycrystalline silicon layer. However, the drift portion 6a may be formed of a nitrided porous polycrystalline silicon layer. Alternatively, the drift portion 6a may be formed of an oxidized or nitrided porous semiconductor layer, which is different from the porous polycrystalline silicon layer. When the drift portion 6a is formed of a nitrided porous polycrystalline silicon layer, a silicon nitride film is formed for either the silicon oxide film 52 or 64 shown in the FIG. 45.

The electron source 10 of Embodiment 15 is characterized in that the high-resistance first semiconductor layers 23b are each formed between the vicinity of the boundary to the isolating portion 6b in the drift portion 6a and the electroconductive layer 8, and the second semiconductor layers 23a having a resistance that is sufficiently lower than that of the first semiconductor layer 23b are each interposed between the central portion of the drift portion 6a and the lower electrode 8.

As above, in the electron source 10 of Embodiment 15, the high-resistance first semiconductor layers 23b are each formed between the vicinity of the boundary to the isolating portion 6b and the electroconductive layer 8, and the second semiconductor layers 23a having a resistance that is sufficiently lower than that of the first semiconductor layer 23b are each interposed between the central portion of the drift portion 6a and the lower electrode 8. Accordingly, the field intensity in the aforementioned vicinity of the boundary becomes sufficiently lower than the field intensity in the central portion of the drift portion 6a. As such, most electrons drifting in the drift portion 6a are led to pass through the central portion of the drift portion 6a. Thereby, excessive electrons can be prevented from being emitted through the aforementioned vicinity of the boundary. Moreover, since portions between the adjacent drift portions 6a are insulated by the isolating portions 6b or the isolating portions 6c, electrons can be prevented from being emitted through portions between individual pairs of the adjacent surface electrodes 7; and concurrently, crosstalk can be prevented. Furthermore, since the field intensity in the aforementioned vicinity of the boundary becomes lower than the field intensity in the central portion, dielectric breakdown that can occur in the aforementioned vicinity of the boundary can be prevented, and an overcurrent can be prevented from locally flowing between the lower electrode 8 and the surface electrode 7. Furthermore, in the electron source 10 of Embodiment 15, as in the conventional electron source 10' shown in FIG. 43, the dependency to the degree of vacuum as an electron emission property is reduced. Concurrently, a popping phenomenon does not occur during electron emission, and hence electrons can stably be emitted at high electron emission efficiency.

In Embodiment 15, the first semiconductor layer 23b and the second semiconductor layer 23a form a field-moderating member that reduces the field intensity in the vicinity of the boundary to the isolating portion 6b to be lower than the field intensity in the central portion of the drift portion 6a. That is, since the field-moderating member is formed of the high-resistance first semiconductor layer 23b, which is interposed between the aforementioned vicinity of the boundary and the lower electrode 8, and low-resistance second semiconductor layer 23a, which is interposed between the central portion of the drift portion 6a, restrictions for patterns of the individual surface electrode 7 and electroconductive layer 8 can be eliminated.

In Embodiments 8 to 15, the gold film is used for the electroconductive thin film for forming the surface electrodes 7. However, the material for the surface electrode 7 is not limited to gold. As described in Embodiment 1, the material having a small work function, such as aluminum, chrome, tungsten, nickel, or platinum, may be used. The important matters and advantages in using these materials are as described in Embodiment 1.

In Embodiments 8 to 15, the thin tungsten film is used for the lower electrodes 8 (electroconductive layers). However, the material is not limited to tungsten. Instead of tungsten, any one of aluminum, nickel, cobalt, chrome, hafnium, molybdenum, palladium, platinum, rhodium, tantalum, titanium, and zirconium. Moreover, materials that may be used include an oxide of one of the aforementioned metal materials, an alloy composed of a plurality of materials selected from the aforementioned metal materials, or an alloy composed of Si and selected materials from the aforementioned materials (for example, an aluminum-based Ai—Si alloy)

The lower electrodes 8 may be formed of an electroconductive layer composed of a plurality of electroconductive layers laminated in the thickness direction. In this case, aluminum is preferably used for an electroconductive film formed as the top layer; and copper, which has a low resistance in comparison to aluminum, is preferably used for an electroconductive film as the bottom layer.

Embodiment 16

Hereinbelow, Embodiment 16 of the present invention will be described.

Figure 16A:
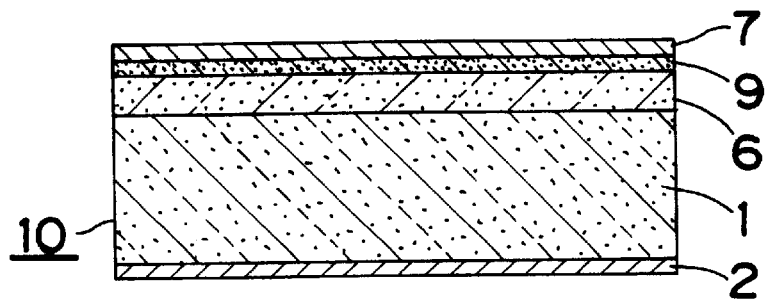
FIG. 16A is a schematic cross-sectional view of an electron source according to Embodiment 16 of the present invention.
Figure 16B:
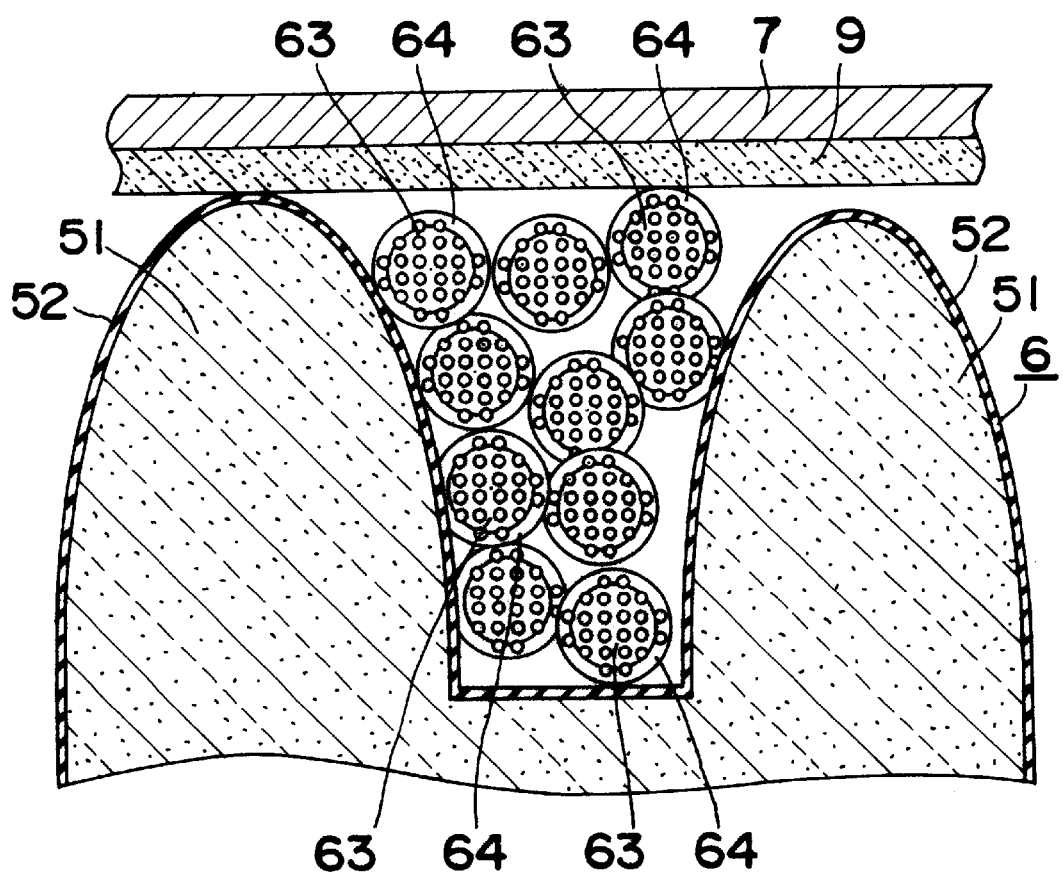
FIG. 16B is an enlarged schematic cross-sectional view of an essential portion of the electron source shown in FIG. 16A.

FIGS. 16A and 16B are schematic cross-sectional views each showing an electron source 10 according to Embodiment 16 of the present invention. FIGS. 17A to 17D each show a cross section of an electron source 10 in a primary step of manufacturing the electron source 10, or an intermediate product thereof during the manufacture thereof. For an electroconductive substrate, Embodiment 16 uses a monocrystalline n-type silicon substrate 1 that has a resistivity that is relatively close to a conductor resistivity (for example, a (100) substrate of which resistivity is about 0.01 Ωcm to 0.02 Ωcm).

Figure 43:
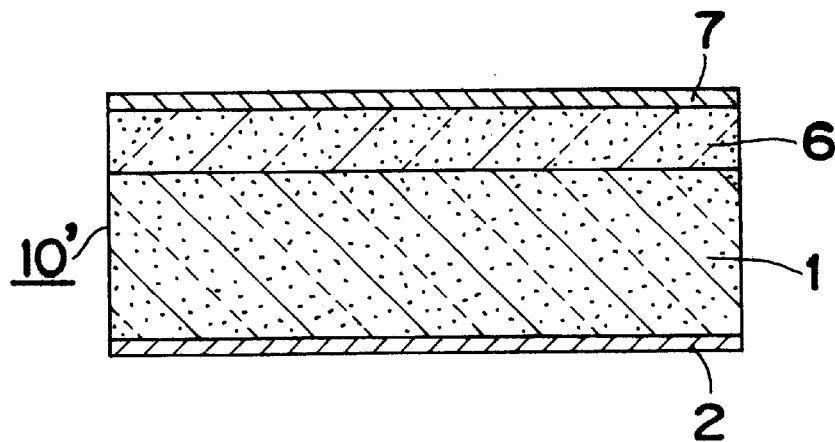
FIG. 43 is a schematic cross-sectional view of a conventional electron source.

A basic configuration of the electron source 10 according to Embodiment 16 is substantially the same as that of the conventional electron source 10' shown in FIG. 43. Specifically, as shown in FIG. 16A, a drift layer 6 made of an oxidized porous polycrystalline silicon layer is formed on a main surface of the n-type silicon substrate 1. A field moderating layer 9 made of a silicon nitride film is formed on the drift layer 6. A surface electrode 7 made of an electroconductive thin film (for example, a gold film) is formed on the field moderating layer 9. An ohmic electrode 2 is formed on a reverse surface of the n-type silicon substrate 1. As described above, in Embodiment 16, the drift layer 6 is formed on the main surface of the n-type silicon substrate 1. However, an undoped polycrystalline silicon layer may be formed between the main surface of the n-type silicon substrate 1 and the drift layer 6.

Figure 18:
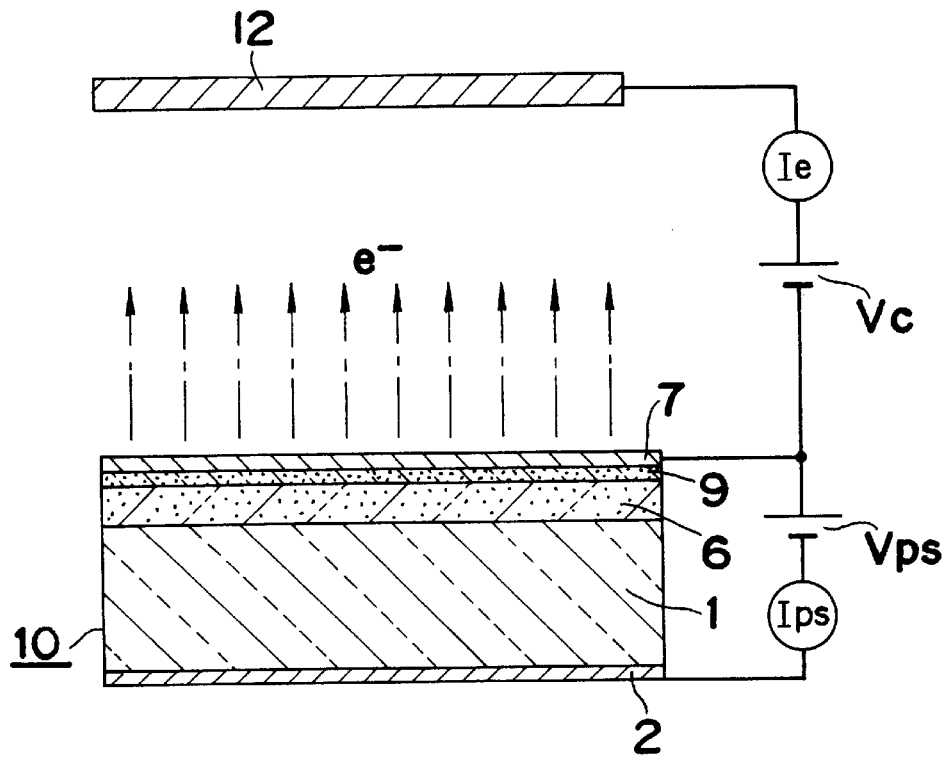
FIG. 18 is a view for explaining the principles of an electron emission mechanism in the electron source according to Embodiment 16 of the present invention.
Figure 44:
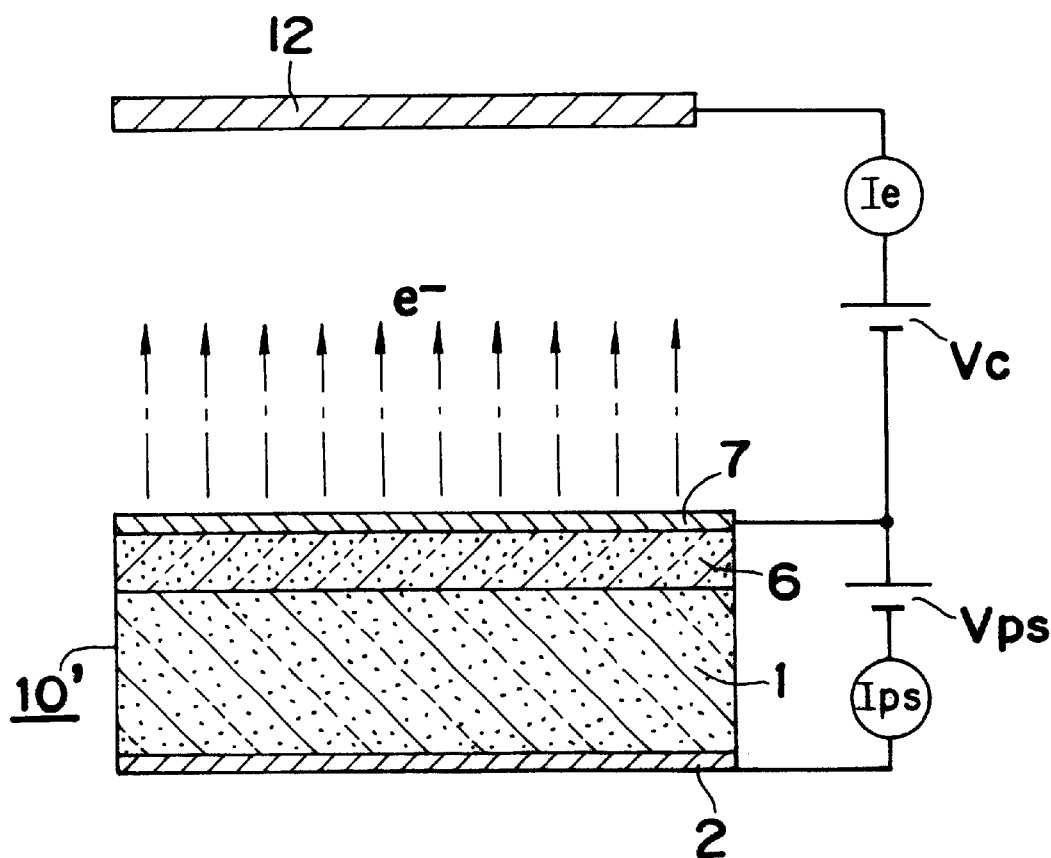
FIG. 44 is a view for explaining the principles of an electron emission mechanism in the conventional electron source shown in FIG. 43.

Also in the electron source 10 of Embodiment 16, electrons can be emitted according to operational principles similar to those for the conventional electron source 10' shown in FIGS. 43 and 44. In specific, as shown in FIG. 18, similarly to the conventional case, a direct-current voltage Vps is applied between the surface electrode 7 and the n-type silicon substrate 1; and concurrently, a direct-current voltage Vc is applied between a collector electrode 12 and the surface electrode 7. With the individual direct-current voltages Vps and Vc being appropriately set, electrons injected from the n-type silicon substrate 1 are led to drift through a drift layer 6, and are led to be emitted through the field moderating layer 9 and the surface electrode 7 (Single dotted lines in FIG. 16 each represent the flow of electrons e⁻ emitted through the surface electrode 7). A material having a small work function is used for the surface electrode 7, and the film thickness of the surface electrode 7 is set to about 1 to 15 nm.

In specific, as shown in FIG. 16B, as in the conventional electron source 10' shown in FIG. 45, a drift portion 6a includes grain 51 made of columner polycrystalline silicon; a thin silicon oxide film 52 formed on one surface of the grain 51; fine silicon crystal 63 on the order of nanometer that is interposed between items of the grain 51; and a silicon oxide film 64 that is formed on one surface of the fine silicon crystal 63 and that has a film thickness smaller than a crystal grain diameter of the fine silicon crystal 63. It is considered that, in the drift layer 6, the surface of grain included in a polycrystalline silicon layer 3 (refer to FIGS. 17A to 17D) prior to an anodic oxidation treatment described below becomes porous, and the crystal condition is maintained with the residual grain 51. As such, a most part of the field applied to the drift layer 6 is caused to intensively pass through the silicon oxide film 64 accelerated by a strong field applied on the silicon oxide film 64, the injected electrons e⁻ are accelerated by the strong field between the items of grain 51, and are thereby caused to drift upward as viewed in FIG. 16B. Electrons that have reached the surface of the drift layer 6 are hot electrons that easily pass through the surface electrode 7 and that are emitted into a vacuum.

In the electron source 10, the higher the ratio (Ie/Ips) of an emitted electron current Ie with respect to a diode current Ips, the higher the electron emission efficiency. In the electron source 10, electrons can be emitted even when the direct-current voltage Vps to be applied between the surface electrode 7 and the ohmic electrode 2 is in a low range of from 10 to 20 V. In the electron source 10, the dependency to degree of vacuum as an electron emission property is reduced. Moreover, no popping phenomenon occurs, hence electrons can be stably emitted at a high electron emission efficiency.

The electron source 10 of Embodiment 16 is characterized in that the field moderating layer 9 is provided between the drift layer 6 and the surface electrode 7 for moderating the field intensity of the drift layer 6 in a state where the direct-current voltage Vps (driving voltage) is applied. Since the field moderating layer 9 is interposed between the drift layer 6 and the surface electrode 7, the field moderating layer 9 is preferably formed of a material not allowing easy diffusion of electrons, and the film thickness thereof is preferably small sufficient to cause electrons drifted through the drift layer 6 to reach the surface electrode 7 without substantially being diffused. When the resistance value of the field moderating layer 9 is one digit or smaller than the resistance value of the drift layer 6, effects of moderating the field intensity of the drift layer 6 decrease. When the resistance value of the field moderating layer 9 is greater than the resistance value of the drift layer 6, the driving voltage needs to be increased. As such, the resistance value of the field moderating layer 9 is preferably on the same order as the resistance value of the drift layer 6. In the Embodiment 16, the thickness of the drift layer 6 is set to 1.5 μm, and the film thickness of the field moderating layer 9 is set to 50 nm. However, the film thickness of the field moderating layer 9 is not limited to 50 nm, and the film thickness may be appropriately set within a range of from 10 nm to 100 nm corresponding to the resistance value of the drift layer 6. While the resistance value of the drift layer 6 varies depending on the thickness of the drift layer 6 and the driving voltage, the values are ranged from several tens kΩ to several tens MΩ.

In the electron source 10 of Embodiment 16, since the field moderating layer 9 for moderating the field intensity of the drift layer 6 is provided between the drift layer 6 and the surface electrode 7, a reduction can be implemented for the field intensity in a portion where dielectric breakdown tends to occur in either the silicon oxide film 52 or 64, dielectric breakdown in the aforementioned portion can be prevented, and ageing variations in the diode current Ips and the emitted electron current Ie can be minimized. Consequently, the ageing stability in the electron emission properties such as electron emission efficiency can be improved; and when the above is applied to, for example, a display, a gradual reduction in the screen luminance can be prevented. With the field moderating layer 9 being provided, the intensity of a field to be applied to the drift layer 6 is reduced. For this reason, when the driving voltage (direct-current voltage Vps) to be applied between the surface electrode 7 and the n-type silicon substrate 1 (ohmic electrode 2) formed of the electroconductive substrate is controlled to be the same as that in the conventional electron source 10' not including the field moderating layer 9, the emitted electron current Ie is reduced smaller than that in the case where the field moderating layer 9 is not provided. However, by increasing the driving voltage, the level of the emitted electron current Ie can be increased to become equivalent to that in the conventional electron source 10'.

In the electron source 10 of Embodiment 16, the field moderating layer 9 is formed of the silicon nitride film.

Since the silicon nitride film a high resistivity, the film thickness of the field moderating layer 9 may be reduced. In addition, since the silicon nitride film has a high electron transmittance, and it does not allow easy diffusion of electrons that has drifted through the drift layer 6, the reduction in electron emission efficiency according to the provision of the field moderating layer 9 can be inhibited.

In Embodiment 16, the n-type silicon substrate 1 is used for the electroconductive substrate. The electroconductive substrate is provided to form the cathode of the electron source 10, to support the drift layer 6 in the vacuum, and to inject electrons into the drift layer 6. As such, the electroconductive substrate may be only to be appropriate to form the cathode of the electron source 10 and to support the drift layer 6. As such, the electroconductive substrate is not limited to the n-type silicon substrate, and it may instead be a metal substrate made of, for example, a chrome material. Alternatively, as shown in FIG. 46, the electroconductive substrate may be a substrate having the lower electrode 8 formed on the side of one surface (the side of the main surface) of the dielectric substrate 11 formed of, for example, glass. With the glass substrate having one surface on which the lower electrode 8 is formed, area-enlargement and cost reduction can be implemented for the electron source in comparison to a configuration using a semiconductor substrate.

In Embodiment 16, a gold film is used as the electroconductive thin film that forms the surface electrodes 7. However, the material of the surface electrode 7 is not limited to the gold material. As described in Embodiment 1, a different material having a small work function, such as aluminum, chrome, tungsten, nickel, or platinum, may be used. Matters to be noted and advantages in using the materials are as described in Embodiment 1.

In Embodiment 16, the drift layer 6 is formed of the oxidized porous polycrystalline silicon layer. However, the drift portion 6 may instead be formed of a nitrided porous polycrystalline silicon layer. Alternatively, the drift portion 6 may be formed of an oxidized or nitrided porous semiconductor layer, which is different from the porous polycrystalline silicon layer. When the drift portion 6 is formed of a nitrided porous polycrystalline silicon layer, a silicon nitride film is formed for either the silicon oxide film 52 or 64 shown in the FIG. 16B. In addition, in Embodiment 16, the field moderating layer 9 is formed of the silicon nitride film. However, the field moderating layer 9 may instead be formed of, for example, an oxidized silicon film, amolphous silicon, amolphous carbonized silicon, a metal oxide film, or a metal nitride film, which has a low electron diffusion property and a high resistivity.

Hereinbelow, referring to FIGS. 17A to 17D, a manufacturing method for the electron source 10 shown in FIGS. 16A and 16B will be described.

Figure 17A:
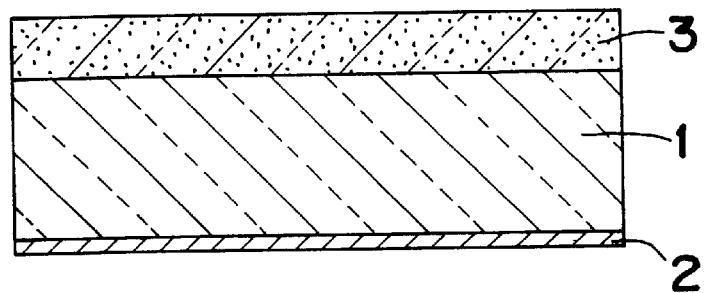
FIGS. 17A to 17D are schematic cross-sectional views showing an electron source of Embodiment 16 of the present invention or intermediate products during the manufacture thereof, and a manufacturing method for the electron source.

First, the ohmic electrode 2 is formed on a reverse surface of the n-type silicon substrate 1. Then, the undoped polycrystalline silicon layer (polycrystalline silicon thin film) 3 having a predetermined film thickness (for example, 1.5 µm) is deposited (overlaid) on the main surface of the n-type silicon substrate 1 according to, for example, an LPCVD method. Thereby, an intermediate product having a structure shown in FIG. 17A is obtained.

Figure 17B:
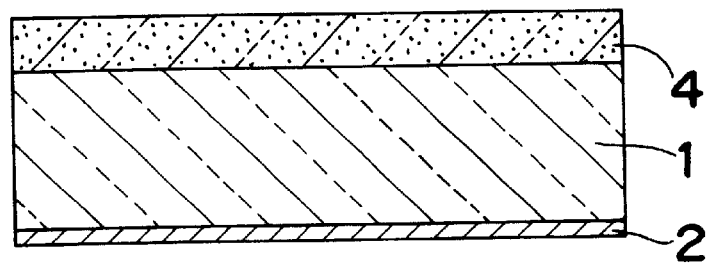

Subsequently, an anodic oxidation treatment is performed at predetermined conditions such that an anodic oxidation process tank that contains an electrolytic solution composed of a mixed liquid in which a 55-wt % hydrogen fluoride aqueous solution and ethanol are mixed at a ratio of about 1:1 is used, and light is emitted onto the polycrystalline silicon layer 3 with a platinum electrode (not shown) being set to be cathodic and the n-type silicon substrate 1 (ohmic electrode 2) being set to be anodic. Thereby, a porous polycrystalline silicon layer 4 is formed, and an intermediate product having a structure shown in FIG. 17B is obtained. Conditions of the anodic oxidation treatment are as follows. A surface of the polycrystalline silicon layer 3 is set to be in contact with the electrolytic solution, the current density is fixed at 30 mA/cm$^2$, and the electroconduction time is set to 10 seconds. For an optical source of emitting light onto the polycrystalline silicon layer 3, a 500W tungsten lamp is used. In Embodiment 16, the polycrystalline silicon layer 3 is formed porous to reach the n-type silicon substrate 1 in the depth direction. However, it may be formed porous up to a midway point in the depth direction. In this case, a portion of the polycrystalline silicon layer 3 remains between the n-type silicon substrate 1 and the porous polycrystalline silicon layer 4.

Figure 17C:
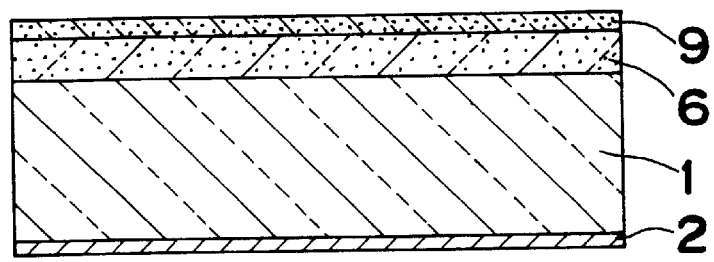
Figure 17D:
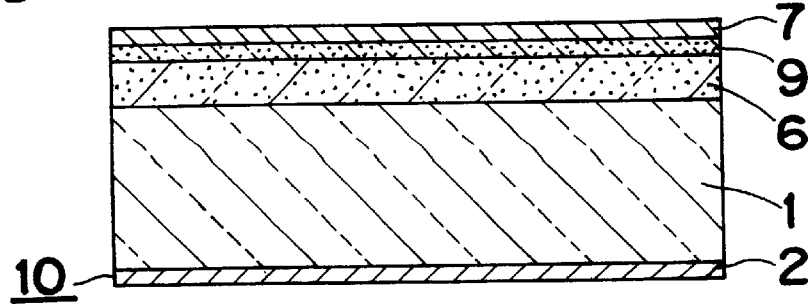

After completion of the anodic oxidation treatment, a rapid thermal oxidation technique using a rapid thermal technique is used to perform rapid thermal oxidation for the porous polycrystalline silicon layer 4. This forms the drift layer 6 made of the oxidized porous polycrystalline silicon layer. Thereafter, the field moderating layer 9 having a predetermined film thickness (for example, 50 nm) is formed on the drift layer 6 according to a sputtering method; and thereby, an intermediate product having a structure shown in FIG. 17C is obtained. The rapid thermal oxidation is performed using a lamp annealing device. The flow rate of oxygen gas is set to 0.3 L/min (300 sccm) in a standard condition. In Embodiment 16, since oxidation is performed for the porous polycrystalline silicon layer 4 according to the rapid thermal oxidation, the temperature can be raised up to an oxidation temperature within several seconds, thereby enabling the inhibition of entailed oxidation that can occur as a problem with an ordinary oxidizing device of a furnace core pipe type when materials are fed into the furnace.

The field moderating layer 9 is formed according to the sputtering method in the following steps. Nitride silicon is used as a target, and a chamber is evacuated up to a level of $1 \times 10^{-4}$ Pa or lower in a standard condition. Then, an Ar gas is introduced into the chamber at a flow rate of 0.03 L/min (30 sccm) in a standard condition, and the pressure in the chamber is thereby adjusted to $5 \times 10^{-1}$ Pa. Thereafter, a high frequency power of 1 W/cm$^2$ is fed between electrodes arranged in the chamber, and a silicon nitride film is formed.

After the field moderating layer 9 has been formed, a gold film used as the surface electrode 7 is formed according to, for example, a vapor deposition method; and thereby, the electron source 10, as shown in FIG. 17B, is obtained.

In the manufacture employing the above-described manufacturing method, the electron source 10 having a high ageing stability can be obtained only by adding a step of overlaying the field moderating layer 9 on the drift layer 6 to the manufacturing method for the conventional electron source 10'.

The electron source 10 manufactured according to the above-described manufacturing method has a less dependency to the degree of vacuum as an electron emission property. Concurrently, since no popping phenomenon occurs, electrons can be stably emitted. Moreover, for the semiconductor substrate, such as a polycrystalline silicon substrate, used for the electroconductive substrate, since a substrate formed of, for example, a glass substrate on which an electroconductive layer (such as an ITO film) is formed, can be used; as such, in comparison to the Spindt-type electrode, electron source area can be enlarged and costs can be reduced.

When the electroconductive substrate is formed of a semiconductor substrate, the polycrystalline silicon layer 3 may be formed according to a sputtering method instead of the LPCVD method. Alternatively, the film deposition may be performed such that amoiphous silicon is deposited according to a plasma CVD method, and thereafter, the film is crystallized. When the electroconductive substrate is formed of a glass substrate on which an electroconductive layer is formed, the polycrystalline silicon layer 3 may be formed such that amolphous silicon is deposited on the electroconductive layer according to a CVD method, and the silicon layer is annealed. The method for forming the polycrystalline silicon layer 3 on the electroconductive layer is not limited to the CVD method. For example, a CGS (continuous grain silicon) method or a catalytic CVD method process may instead be employed.

For an oxidation method for the porous polycrystalline silicon layer 4, electrochemical oxidation using acid (for example, dilute sulfuric acid, dilute nitric acid, or aqua regia) may be employed instead of the thermal oxidation method. Before the porous polycrystalline silicon layer 4 is electrochemically oxidized with acid, a treatment may be performed such that the layer is immersed in an oxidant solution (such as nitric acid, sulfuric acid, hydrochloric acid, or hydrogen peroxide water) for a time necessary to allow a polar surface of the porous polycrystalline silicon layer 4 to be oxidized; and thereby, hydrogen atoms terminating silicon atoms are substituted with oxygen atoms. Alternatively, oxidation may be performed such that ultraviolet rays are emitted onto the layer in a gas phenomenon containing at least one of oxygen and ozone. Still alternatively, oxidation may be performed such that the layer is exposed to plasma in a gas phenomenon containing at least one of oxygen and ozone. Still alternatively, oxidation may be performed such that the layer is heated in a gas phenomenon containing at least one of oxygen and ozone (the heat temperature may be appropriately set within a temperature range of from 100° C. to 600° C.). Still alternatively, oxidation may be performed such that ultraviolet rays are emitted onto the layer, and the layer is heated (the heat temperature may be appropriately set within a temperature range of from 100° C. to 600° C.). Still alternatively, oxidation may be performed such that, in a gas phenomenon containing at least one of oxygen and ozone, ultraviolet rays are emitted onto the layer, and the layer is heated (the heat temperature may be appropriately set within a temperature range of from 100° C. to 600° C.). Further alternatively, oxidation may be performed employing combined methods of the above. Yet alternatively, oxidation may be performed employing methods that are different from the above oxidation methods. In consequence, the diffusion amount of impurities into either the silicon oxide film 52 or 64 is reduced, and the dielectric strength is improved. The porous polycrystalline silicon layer 4 is thus oxidized, but it may instead be nitrided.

The method of forming the field moderating layer 9 is not limited to the sputtering method, and a different method such as a vapor deposition method or an ion plating method may instead be employed. Moreover, the method of forming the surface electrode 7 is not limited to the vapor deposition method; and a method such as a sputtering method may instead be used.

Hereinbelow, a display using the electron source 10 of Embodiment 16 will be described with reference to FIG. 19.

Figure 19:
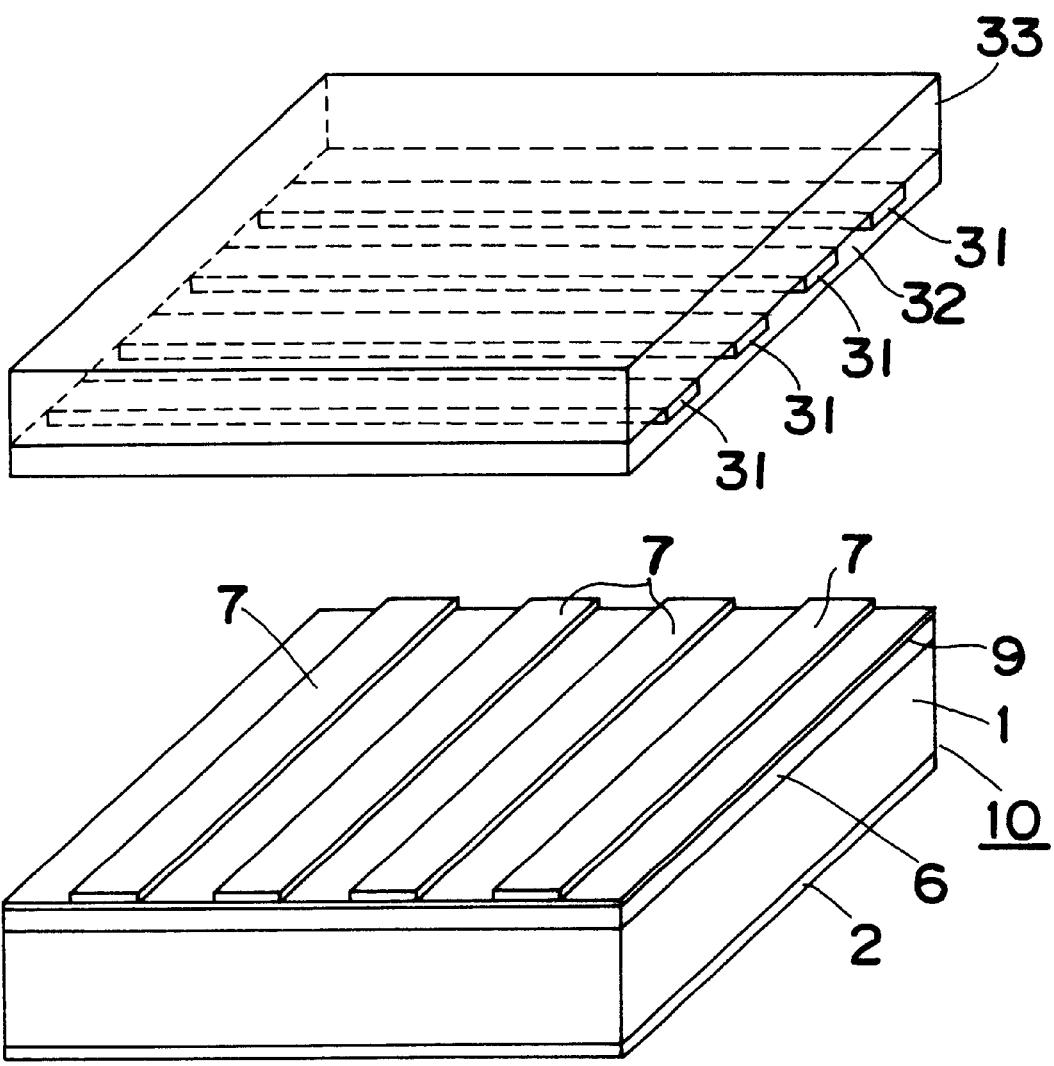
FIG. 19 is a perspective view of a display using the electron source according to Embodiment 16 of the present invention.

As shown in FIG. 19, the display includes a glass substrate 33 disposed opposite to the surface electrodes 7 of the electron source 10. Collector electrodes 31 are arranged in a striped state on a surface of the glass substrate 33, which opposes the electron source 10. A phosphor layer 32 that emits visible light according to electron beams emitted through the surface electrodes 7 is disposed in such a manner as to cover the collector electrodes 31. The surface electrodes 7 are formed in a striped state. A spacing between the electron source 10 and the glass substrate 33 is maintained in a vacuum state.

In the display, the surface electrode 7 is formed as a stripe, and the collector electrodes 31 also is formed as a stripe to extend perpendicular to the surface electrode 7. When one of the collector electrodes 31 and one of the surface electrodes 17 are selected, and voltage (field) is applied thereto, electrons are emitted only from the surface electrode 7 to which the voltage is applied. In the surface electrode 7 from which the electrons have been emitted, only electrons emitted from a region thereof through which the voltage has been applied to the corresponding collector electrode 31 are accelerated, and the accelerated electrons cause the phosphor layer 32 covering the collector electrode 31 to emit light.

In short, in the display shown in FIG. 19, when voltage is applied to specific one of the surface electrodes 7 and specific one of the collector electrodes 31, a portion corresponding to a region where the two electrodes 7 and 31 mutually intersect can be caused to emit light. As such, by optionally changing the surface electrodes 7 and the collector electrodes 31 to which voltage is to be applied, images or characters can be displayed on the display. In the display, a high voltage needs to be applied to the collector electrode 31 and to thereby accelerate electrons in order to cause phosphors of the phosphor layer 32 according to electrons emitted from the electron source 10. To achieve the above, a high voltage of hundreds of V or several kV may be applied to the collector electrode 31.

Embodiment 17

Hereinbelow, Embodiment 17 of the present invention will be described.

Figure 20:
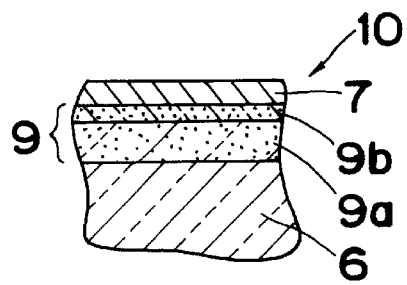
FIG. 20 is a schematic cross-sectional view of an essential portion of an electron source according to Embodiment 17 of the present invention.

As shown in FIG. 20, while the basic configuration of an electron source 10 according to Embodiment 17 is substantially the same as that of the electron source 10 according to Embodiment 16, it is characterized in that the field moderating layer 9 is configured to include a silicon nitride film 9a formed on the drift layer 6, and a silicon oxide film 9b formed on the silicon nitride film 9a. Essentially, in Embodiment 16, the field moderating layer 9 is formed of a multilayer film including the silicon nitride film 9a, and the surface electrode 7 is overlaid on the silicon oxide film 9b. Either the silicon nitride film 9a or the silicon oxide film 9b is formed according to a sputtering method.

As described above, also in Embodiment 17, basically, the same advantages as those in Embodiment 16 can be obtained. However, in Embodiment 17, since the resistivity of each of the silicon nitride film 9a and the silicon oxide film 9b is high, the film thickness of the field moderating layer 9 can be reduced. In addition, electrons drifted through the drift layer 6 are not allowed to easily diffuse in the silicon nitride film 9a, a reduction in electron emission efficiency according to the provision of the field moderating layer 9 can be inhibited. Moreover, in Embodiment 17, since the surface electrode 7 is formed on the oxide nitride film 9a, in comparison to a case as in Embodiment 16 where the surface electrode 7 is formed on the field moderating layer 9 made of the silicon nitride film, the electron movement to the surface electrode 7 easily occurs, thereby enabling the electron emission efficiency to increase.

The film thickness of the silicon nitride film 9a is set to 40 nm, and the film thickness of the silicon oxide film 9b is set to 10 nm. These film thicknesses are not limited to the aforementioned numerical values, and the film thicknesses may be appropriately set corresponding to, for example, the thickness and the resistance value of the drift layer 6. However, since electrons less diffuse in the silicon nitride film 9a than in the silicon oxide film 9b, the film thickness of the silicon nitride film 9a is preferably set larger than that of the silicon oxide film 9b.

Embodiment 18

Hereinbelow, Embodiment 18 of the present invention will be described.

Figure 21:
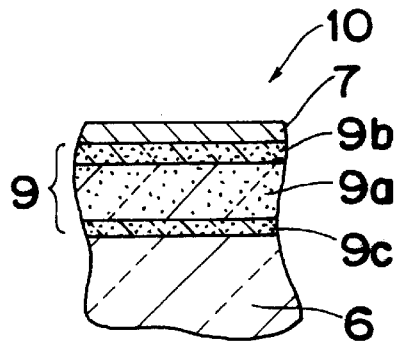
FIG. 21 is a schematic cross-sectional view of an essential portion of an electron source according to Embodiment 18 of the present invention.

As shown in FIG. 21, while the basic configuration of an electron source 10 according to Embodiment 18 is substantially the same as that of the electron source 10 according to Embodiment 16, it is characterized in that the field moderating layer 9 is configured to include a first silicon oxide film 9c formed on the drift layer 6, a silicon nitride film 9a formed on the silicon oxide film 9c, and a second silicon oxide film 9b formed on the silicon nitride film 9a. Essentially, in Embodiment 18, the field moderating layer 9 is formed of a multilayer film including the silicon nitride film 9a, and the surface electrode 7 is overlaid on the silicon oxide film 9b. Each of the silicon nitride film 9a and the silicon oxide films 9c and 9b is formed according to a sputtering method.

As described above, also in Embodiment 18, basically, effects similar to those in Embodiment 16 can be obtained. However, in Embodiment 18, since the resistivity of each of the silicon nitride film 9a and the silicon oxide films 9c and 9b is high, the film thickness of the field moderating layer 9 can be reduced. In addition, electrons drifted through the drift layer 6 are not allowed to easily diffuse in the silicon nitride film 9a, a reduction in electron emission efficiency according to the provision of the field moderating layer 9 can be inhibited. Moreover, in Embodiment 18, since the surface electrode 7 is formed on the second silicon oxide film 9a, in comparison to a case as in Embodiment 16 where the surface electrode 7 is formed on the field moderating layer 9 made of the silicon nitride film, the electron movement to the surface electrode 7 easily occurs, thereby enabling the electron emission efficiency to increase.

The film thickness of the first silicon oxide film 9c is set to 10 nm, and the film thickness of the second silicon oxide film 9b is set to 40 nm. These film thicknesses are not limited to the aforementioned numerical values, and the film thicknesses may be appropriately set corresponding to, for example, the thickness and the resistance value of the drift layer 6. However, since electrons less diffuse in the silicon nitride film 9a than in each of the silicon oxide films 9c and 9b, the film thickness of the silicon nitride film 9a is preferably set larger than that of each of the silicon oxide films 9c and 9b.

Embodiment 19

Hereinbelow, Embodiment 19 of the present invention will be described. Basically, the basic configuration of an electron source 10 according to Embodiment 19 is substantially the same as that of the electron source 10 according to Embodiment 16, it is characterized in that the field moderating layer 9 of the electron source 10 according to Embodiment 16 shown in FIGS. 16A and 16B is configured of to include a chrome oxide film. Since chrome oxide film is a material that has a high property of adhesion to the surface electrode 7 at least to an extent not causing the surface electrode 7 to be isolated, it can inhibit ageing deterioration that can because of isolation of the surface electrode 7 from the field moderating layer 9 and ageing variations in electron emission property. In addition, since the chrome oxide film has a high transmittance property, it can inhibit a reduction in electron emission efficiency, which can occur because of the provision of the field moderating layer 9. Consequently, also in the electron source 10 of Embodiment 19, the same advantages as those in Embodiment 16 can be obtained.

Hereinbelow, a manufacturing method for the electron source 10 of Embodiment 19 will be described with reference to FIGS. 22A to 22D. The manufacturing method is substantially the same as the manufacturing method for the electron source 10 of Embodiment 16. As such, hereinbelow, descriptions of aspects common to those given in Embodiment 16 will be simplified to avoid repetitive description.

Figure 22A:
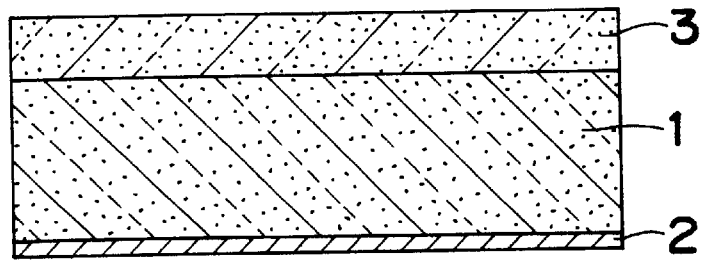
FIGS. 22A to 22D are schematic cross-sectional views showing an electron source of Embodiment 19 of the present invention or intermediate products during the manufacture thereof, and a manufacturing method for the electron source.
Figure 22B:
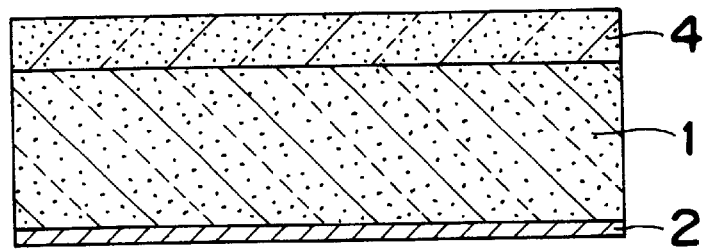

In Embodiment 19, after the ohmic electrode 2 has been formed on a reverse surface of the n-type silicon substrate 1, that is, the electroconductive substrate, the undoped polycrystalline silicon layer 3 is formed on one surface of the n-type silicon substrate 1 according to an LPCVD method, and an intermediate product having a structure shown in FIG. 22B is obtained. Subsequently, the polycrystalline silicon layer 3 is formed porous according to an anodic oxidation treatment, the porous polycrystalline silicon layer 4 is thereby formed, and an intermediate product having a structure shown in FIG. 22B is obtained.

Figure 22C:
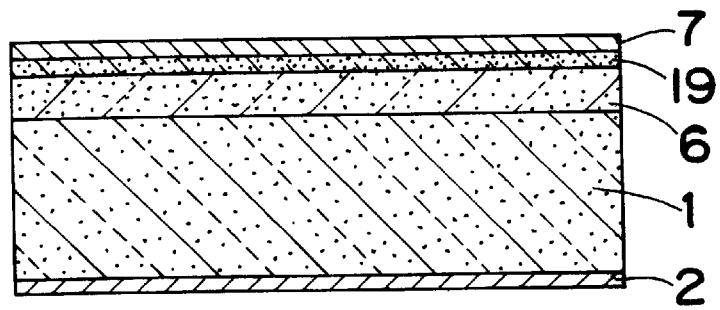

In addition, the porous polycrystalline silicon layer 4 is thermally oxidized, and the drift layer 6 made of the oxidized porous polycrystalline silicon layer is thereby formed. Then, an oxidized layer 19 made of a chrome layer is formed on the drift layer 6 according to an electron beam vapor deposition method. Moreover, the surface electrode 7 made of a gold metal is formed on the oxidized layer 19, and an intermediate product having a structure shown in FIG. 22C is obtained. In Embodiment 19, the film thickness of the oxidized layer 19 is set to 20 nm, and the film thickness of the surface electrode 7 is set to 15 nm. However, these film thicknesses are not limited to the aforementioned numerical values.

Figure 22D:
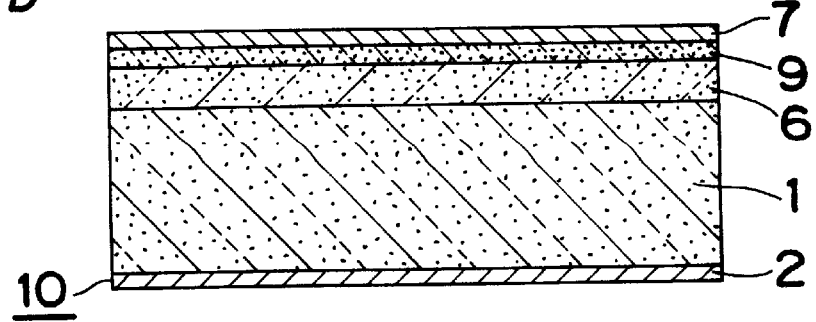

After the surface electrode 7 has been formed, the oxidized layer 19 is oxidized according to an oxidation process, the field moderating layer 9 formed of an chrome oxide film, and an electron source 10 as shown in FIG. 22D is obtained. The oxidation process may be carried out by introducing, for example, ozone generated using an ozone generator into an oxidizing treatment chamber. In Embodiment 19, an oxygen gas is introduced into an ozone generator at a flow rate of 5 L/min in a standard condition, electric discharge is performed to thereby generate 5%-concentration ozone, and the ozone is introduced into an oxidizing treatment chamber. In the treatment, the n-type silicon substrate 1 used for the electroconductive substrate is heated at 150° C. In Embodiment 19, a chrome oxide film is used to form an oxide layer.

The manufacturing method includes a step of forming the oxidized layer 19 by using chrome on the drift layer 6 formed on the side of the main surface of the n-type silicon substrate 1 used for the electroconductive substrate, in which the chrome is a composition element from which oxygen is excluded from composition elements of the field moderating layer 9; a step of forming the surface electrode 7 on the oxidized layer 19; and a step of forming the field moderating layer 9 by oxidizing the oxidized layer 19 according to the oxidation process after the surface electrode 7 has been formed. As such, the electron source 10 having a high ageing stability can be provided. In addition, since the field moderating layer 9 is formed by oxidizing the oxidized layer 19 according to the oxidation process after the surface electrode 7 has been performed, the field moderating layer 9 can be prevented from being contaminated and damaged during the oxidation process. Moreover, in the oxidation process, since the oxidized layer 19 is oxidized with ozone diffusing through the surface electrode 7, the oxidized layer 19 can be oxidized at a temperature that is lower than that in the thermal oxidation. As such, the method enables the prevention of damage causing electrical disconnection and layer isolation attributable to coagulation of gold, which is a composition element of the surface electrode 7.

In the Embodiment 19, while the oxidized layer 19 is oxidized using ozone in the oxidation process, the oxidized layer 19 may be oxidized using oxygen plasma. Also in this case, the oxidized layer 19 can be oxidized at a lower temperature than that in the thermal oxidation, thereby enabling damage causing electrical disconnection and layer isolation attributable to coagulation of composition elements of the surface electrode.

Embodiment 20

Hereinbelow, Embodiment 20 of the present invention will be described.

Figure 23:
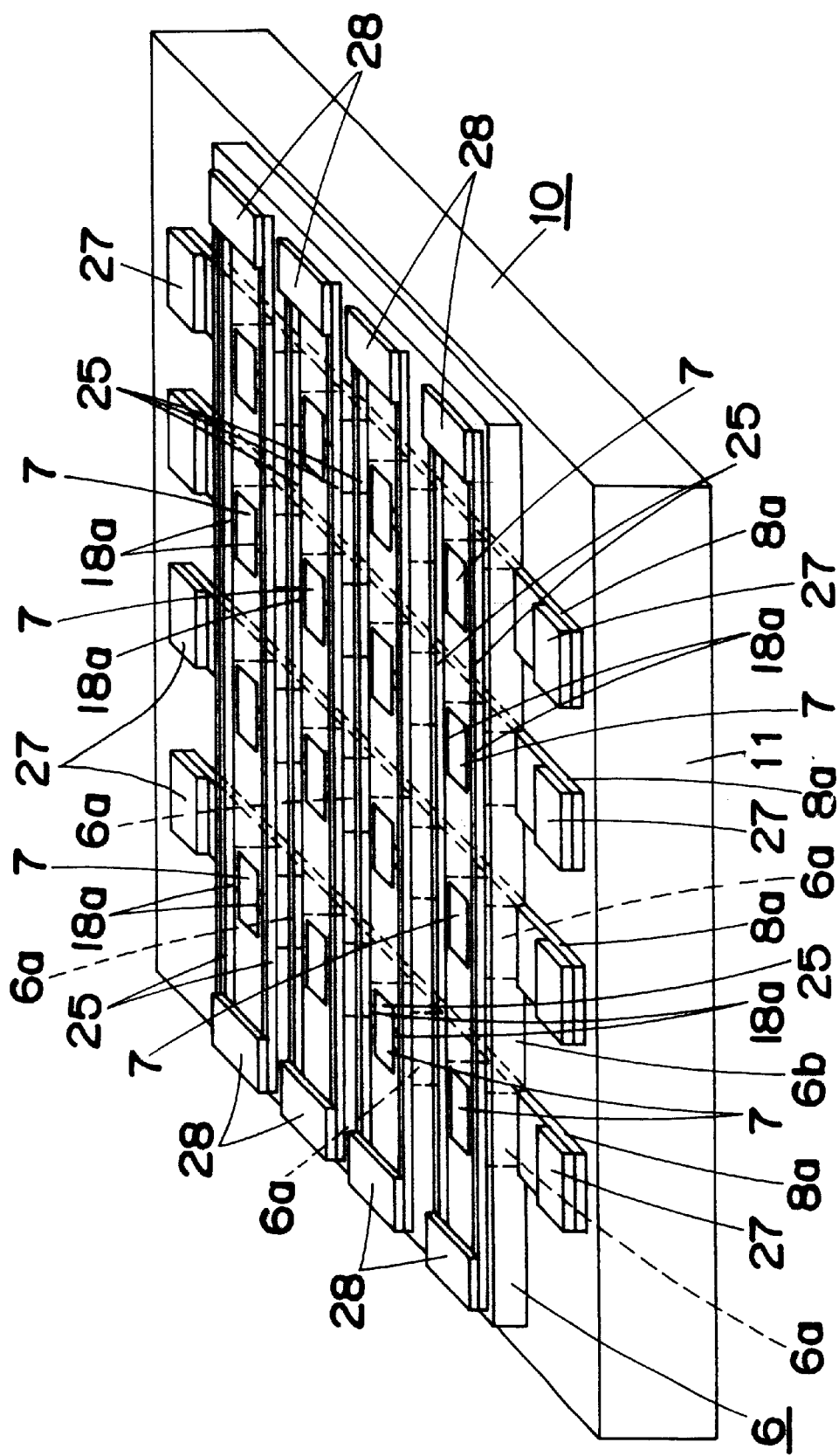
FIG. 23 is a schematic perspective view of an electron source according to Embodiment 20 of the present invention.
Figure 54:
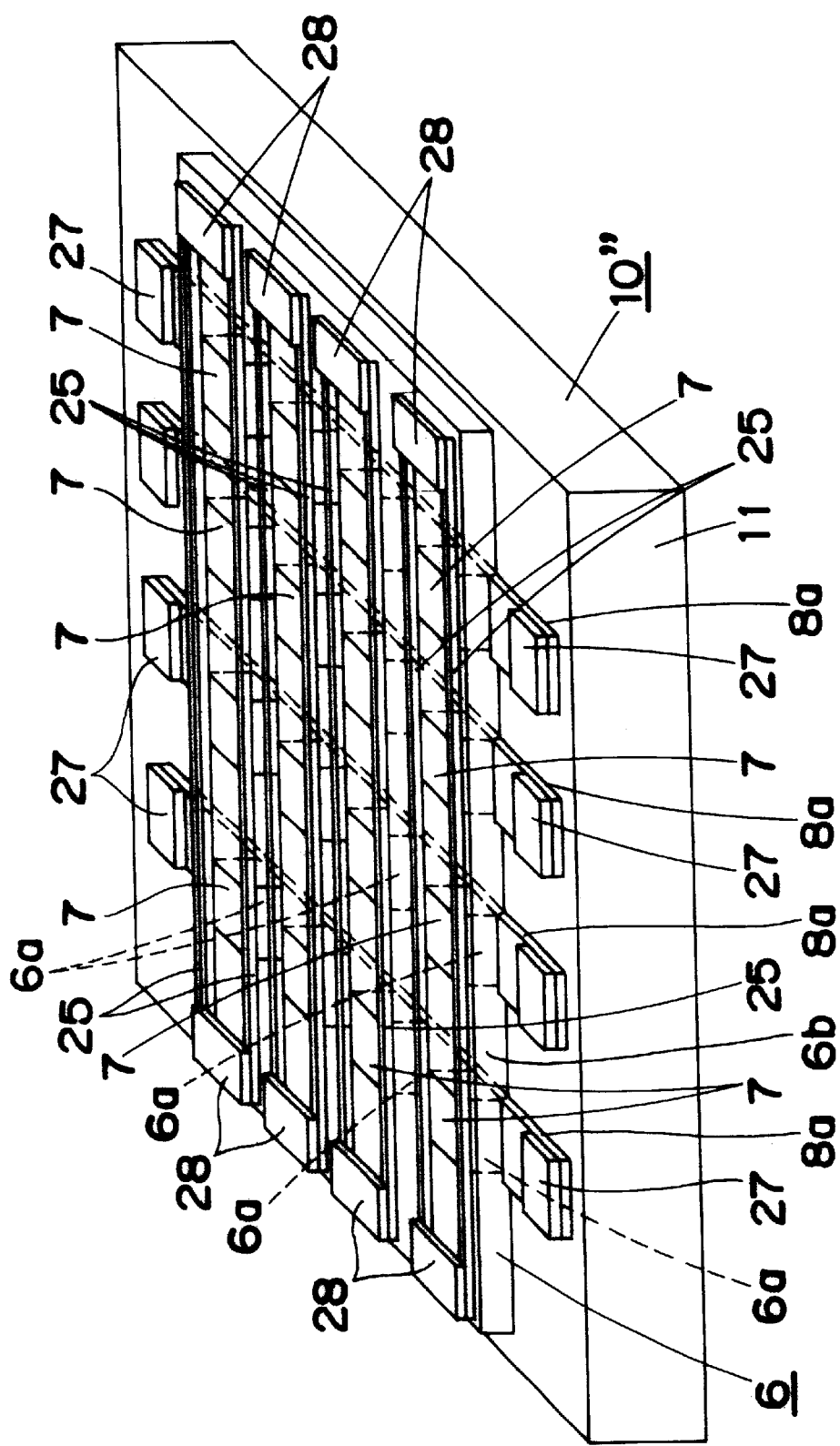
FIG. 54 is a schematic perspective view of still another electron source.
Figure 56:
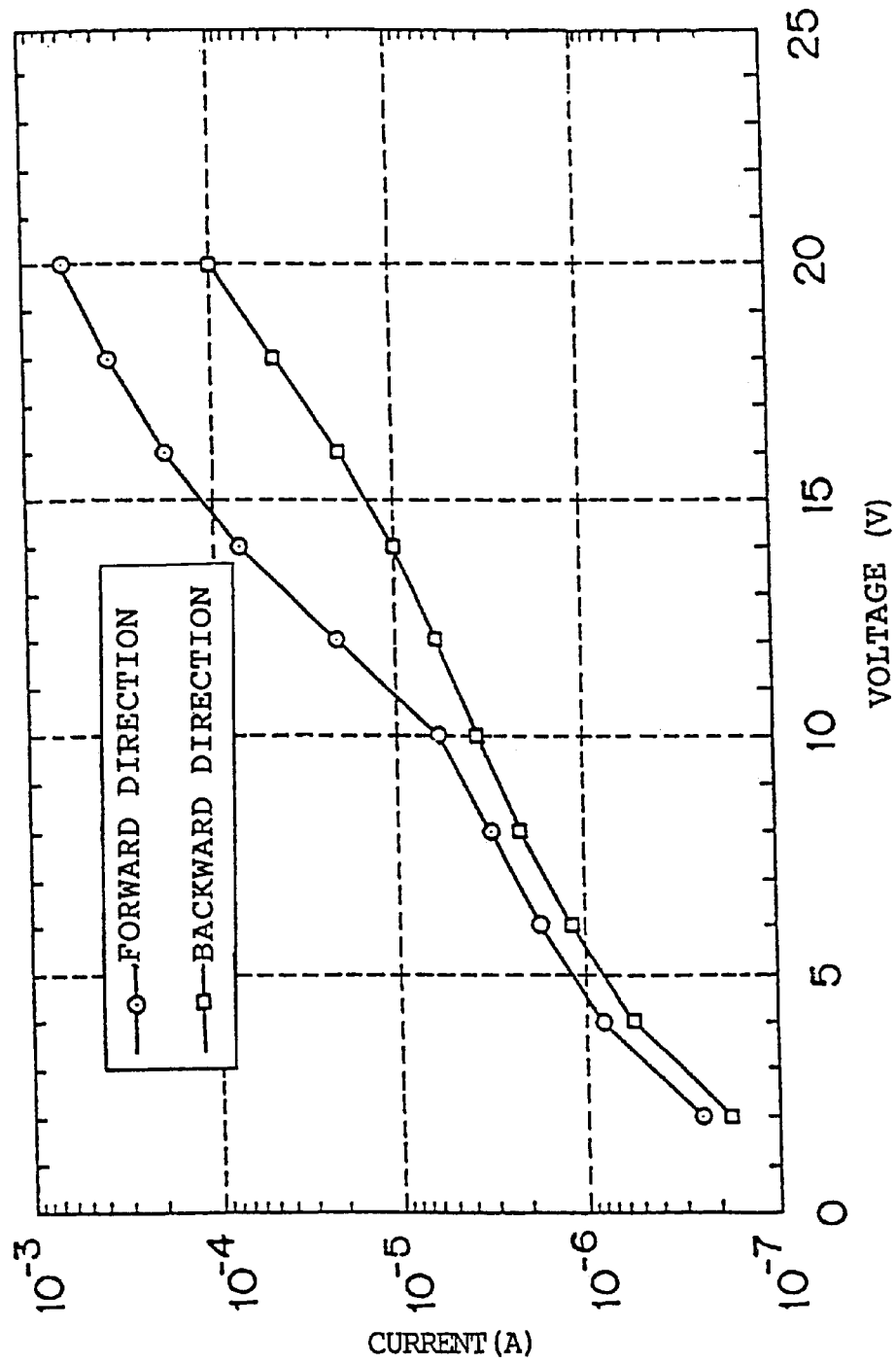
FIG. 56 is a graph showing the relationship between voltage and current when a forward voltage and a backward voltage are applied in the conventional electron source.

As shown in FIG. 23, the basic configuration of an electron source 10 according to Embodiment 20 is substantially the same as that of the conventional electron source 10" shown in FIG. 54. Specifically, it includes a dielectric substrate 11 made of a glass substrate; a plurality of wirings 8a (lower electrodes 8) that are made of an electroconductive layer (for example, a metal film, such as a chrome, or an ITO film) and that are arranged on a main surface of the dielectric substrate 11; a drift layer 6 composed of a plurality of drift portions 6a formed of an oxidized porous polycrystalline silicon layer in such a manner as to overlap with the wirings 8a, and isolating portions 6b that are formed of a polycrystalline silicon layer and that individually fill up spaces between the drift portions 6a; a plurality of surface electrodes 7 that individually oppose the wirings 8a via the drift portions 6a; and a plurality of bus electrodes 25 commonly coupling the plurality of surface electrode 7, which are arranged in the direction intersecting with the wirings 8a, in units of each row on the drift layer 6. The bus electrodes 25 are arranged in such a manner as to cross the drift portions 6a and the isolating portions 6b in the direction intersecting with the wirings 8a. For the surface electrodes 7, a material (such as gold) having a small work function is employed; and the film thickness of the surface electrode 7 is set to a range of from 15 to 15 nm. For the bus electrodes 25, a material (such as aluminum or copper) that has a low resistance and a high processability is employed. Since the bus electrode 25 does not need to transmit electrons, the film thickness thereof can be increased in comparison to that of the surface electrode 7, thereby enabling the resistance to be reduced. In Embodiment 20, the dielectric substrate 11 forms the substrate.

Figure 24:
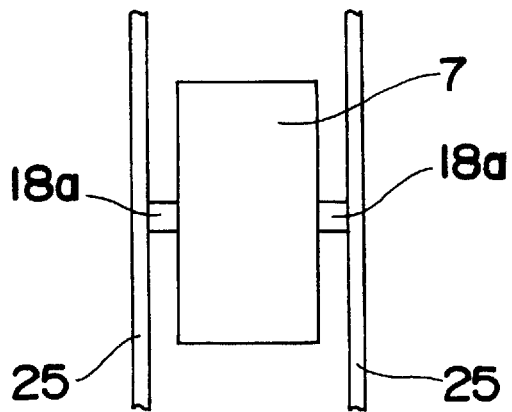
FIG. 24 is a schematic plan view of an essential portion of the electron source according to Embodiment 20 of the present invention.

As shown in FIGS. 23 and 24, the electron source 10 of Embodiment 20 is characterized in that narrow portions 18a made of an electroconductive are each interposed to narrow a current passageway (to reduce the current passage area) between the surface electrode 7 and the bus electrode 25.

Figure 25:
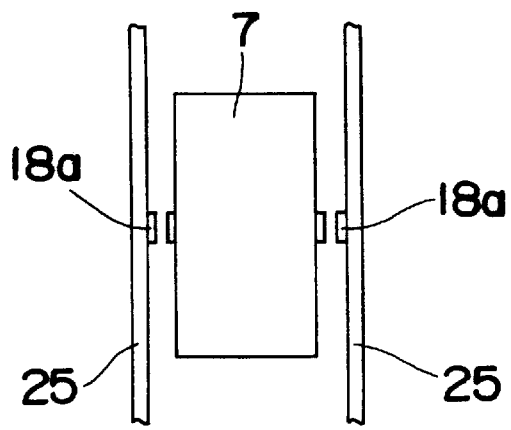
FIG. 25 is a schematic plan view of an essential portion of the electron source according to Embodiment 20 of the present invention.

As shown in FIG. 25, the narrow portion 18a causes disconnection when an overcurrent flows. Specifically, in the narrow portion 18a, the thermal capacity is formed to have a small thermal capacity to cause disconnection when an overcurrent flows. In the electron source 10, each of the surface electrodes 7 is sandwiched between two of the bus electrodes 25 commonly coupled to identical pads 28. Each of the narrow portions 18a is interposed between the surface electrode 7 and the bus electrodes 25 and 25 on two sides thereof. The narrow portion 18a is thus interposed between the surface electrode 7 and the bus electrode 25, and forms an overcurrent protection element for limiting the current flowing to the surface electrode 7.

In the electron source 10 of Embodiment 20, as in the conventional electron source 10" shown in FIG. 54, the drift portions 6a of the drift layer 6 are sandwiched between the plurality of wirings 8a and the plurality of the surface electrodes 7. As such, when an associated set of the bus electrode 25 and the wiring 8a is appropriately selected, and voltage is applied to the selected set, a strong field is applied only to the drift portion 6a positioned below the surface electrode 7 that is proximate to a portion corresponding to an intersection with the wiring 8a in the selected bus electrode 25, and electrons are thereby emitted. That is, when an associated set of the bus electrode 25 and the wiring 8a to which voltage is applied, electrons can thereby be emitted from a desired cross point. The voltage to be applied between the bus electrode 25 and the lower electrode 8 is set to a range of from 10 to 20 V. Each of the wirings 8a is formed as a stripe having two end portions in a longitudinal direction on which pads 27 are individually formed. The bus electrode 25 is coupled to the individual pads 28 at two ends in the longitudinal direction thereof.

The basic performance of the electron source 10 according to Embodiment 20 is substantially the same as that of the conventional electron source 10" shown in FIGS. 46 and 47; hence, a detailed description thereof is omitted herefrom. In addition, the set and a microstructure of the drift layer 6 (drift portion 6a) are substantially the same as in the cases of the conventional electron sources 10' and 10" (refer to FIG. 45); hence, a detailed description thereof is omitted herefrom.

In the electron source 10 of Embodiment 20, since the narrow portions 18a are each interposed between the surface electrode 7 and the bus electrode 25, when an overcurrent flows to a specific one of the surface electrodes 7, the narrow portion 18a interposed between the surface electrode 7 and the bus electrode 25 causes disconnection. Consequently, an overcurrent can be prevented from continually flowing to a specific one of the surface electrodes 7, a deterioration range can be prevented from being increased because of heat generation, and the reliability can be improved. Essentially, since the overcurrent protection element for limiting current flowing to the surface electrode 7 is interposed between the surface electrode 7 and the bus electrode 25, an overcurrent flowing between the bus electrode 25 and the surface electrode 7 can be limited. Thereby, an overcurrent flowing to the surface electrode 7, the drift portion 6a, and the wiring 8a can be limited, and the temperatures thereof can be inhibited from being increased. Consequently, the deterioration range can be prevented from being increased, and the reliability can thereby be improved. In other words, disconnection can be caused only in the narrow portion 18a interposed between an overcurrent-flowed surface electrode 7 and a bus electrode 25, in which the surface electrode 7 is one of those corresponding to individual pixels. Thereby, influence on the surface electrodes 7 corresponding to other pixels can be inhibited, and the reliability as an electron source used with a display can be improved. In the electron source 10 of Embodiment 20, the isolating portion 6b insulates a portion between the adjacent drift portions 6a, thereby enabling crosstalk in which, for example, electrons are emitted through the portion between the adjacent drift portions 6a, to be prevented. Moreover, in the electron source 10 of Embodiment 20, as in the conventional electron source 10', the dependency to the degree of vacuum as an electron emission property is reduced. Concurrently, no popping phenomenon occurs during electron emission, and hence electrons can stably be emitted at high electron emission efficiency.

Embodiment 21

Hereinbelow, Embodiment 21 of the present invention will be described.

Figure 27:
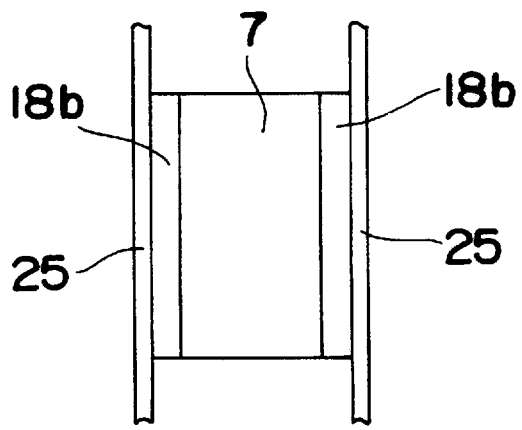
FIG. 27 is a schematic plan view of an essential portion of the electron source according to Embodiment 21 of the present invention.
Figure 26:
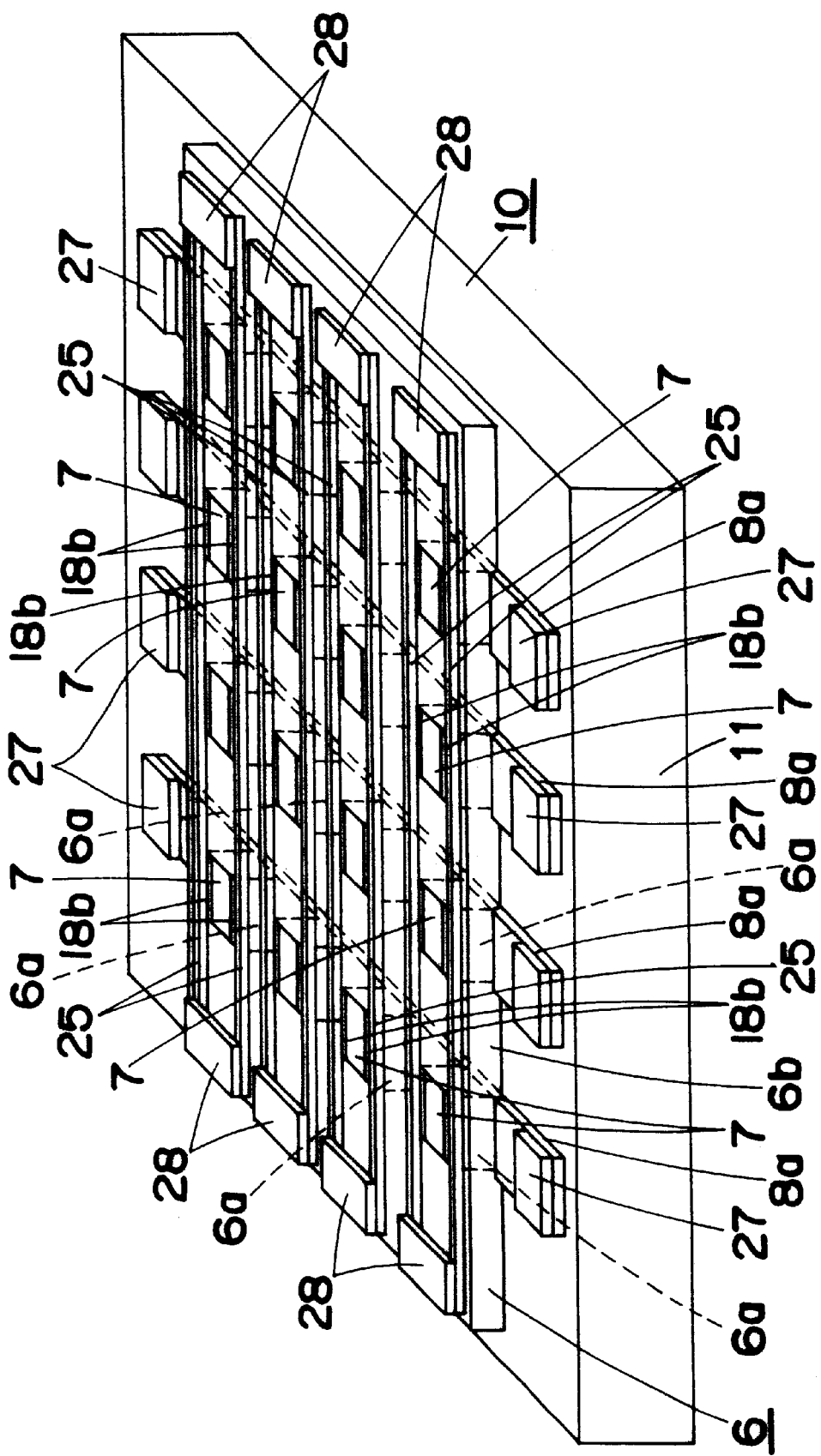
FIG. 26 is a schematic perspective view of an electron source according to Embodiment 21 of the present invention.

As shown in FIGS. 26 and 27, the basic configuration of an electron source 10 according to Embodiment 21 is substantially the same as that of the electron source 10 according to Embodiment 20; however it is different in that high resistance layers 18b are each interposed between the surface electrode 7 and the bus electrode 25. Each of the narrow portions 18a is interposed between the surface electrode 7 and the bus electrodes 25, and forms an overcurrent protection element for limiting the current flowing to the surface electrode 7.

Thus, in comparison to the conventional electron source 10" shown in FIG. 54 in which the individual surface electrodes 7 and bus electrodes 25 are directly coupled, in the electron source 10 of Embodiment 21, an overcurrent can be prevented from flowing to the surface electrode 7, a deterioration range can be prevented from being increased because of heat generation, and the reliability can be improved.

Embodiment 22

Hereinbelow, Embodiment 22 of the present invention will be described.

Figure 28:
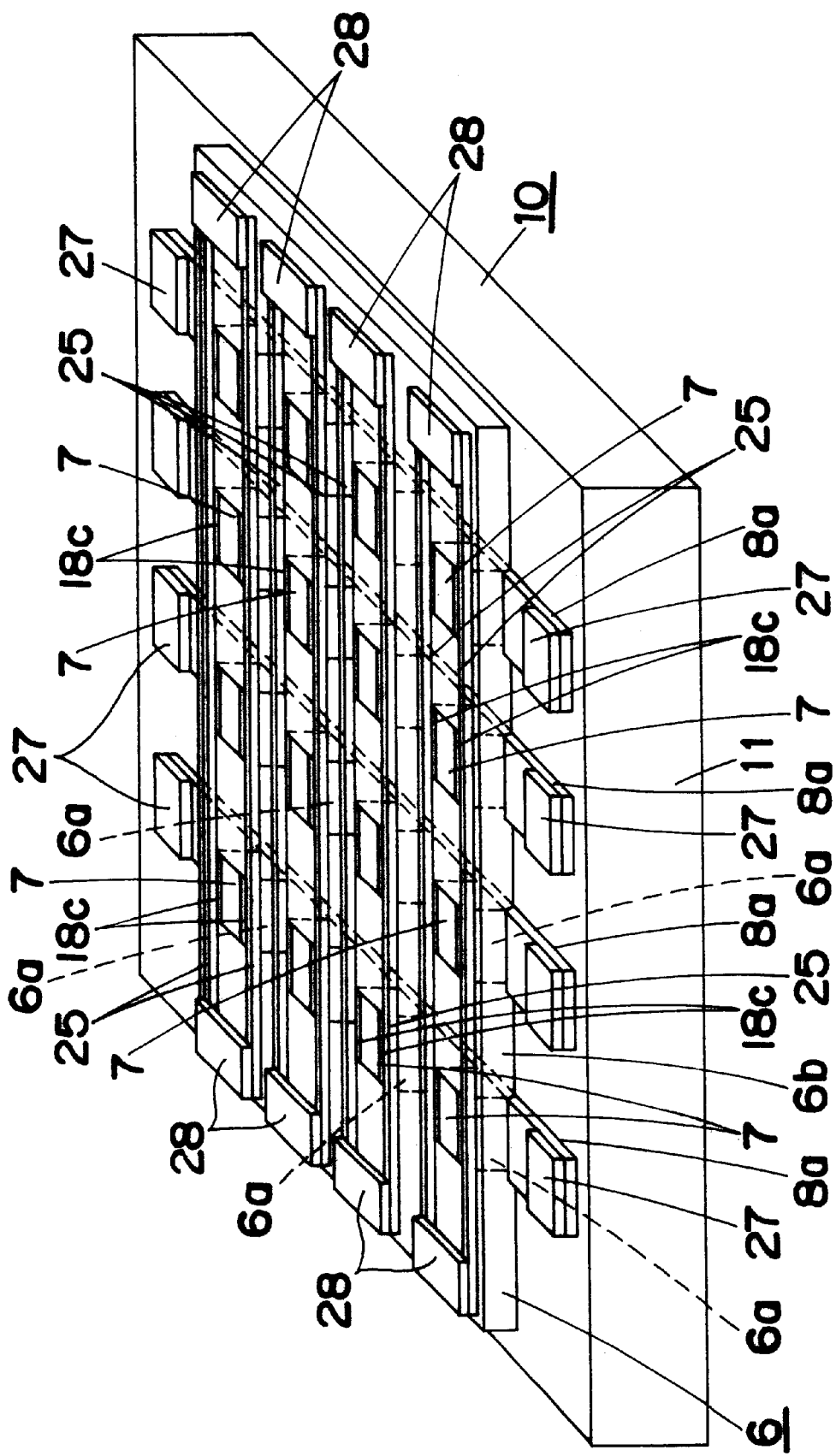
FIG. 28 is a schematic perspective view of an electron source according to Embodiment 22 of the present invention.
Figure 29:
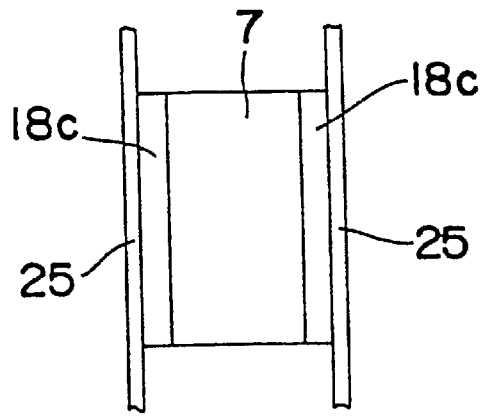
FIG. 29 is a schematic plan view of an essential portion of the electron source according to Embodiment 22 of the present invention.
Figure 30:
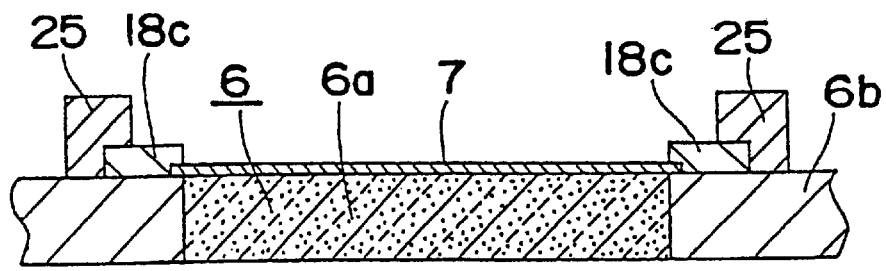
FIG. 30 is a schematic cross-sectional view of an essential portion of the electron source according to Embodiment 22 of the present invention.

As shown in FIGS. 28 to 30, the basic configuration of an electron source 10 according to Embodiment 22 is substantially the same as that of that in Embodiment 20; however, it is different in that thermo-sensitive layers 18c having a positive resistance temperature coefficient are each interposed between the surface electrode 7 and the bus electrode 25.

Figure 31:
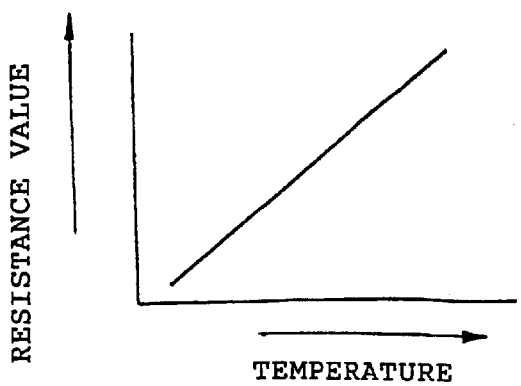
FIG. 31 is a graph showing the relationship between the temperature and resistance values in an electron source according to Embodiment 22 of the present invention.

As shown in FIG. 31, in the thermo-sensitive layer 18c, the resistance value increases according to the increase in temperature. As a material of the thermo-sensitive layer 18c, for example, a $BaTiO_3$-based material used for a PTC thermistor may be used. The thermo-sensitive layer 18c forms an overcurrent protection element for limiting the current flowing to the surface electrode 7. Other portions are the same as those in Embodiment 20.

Thus, in the electron source 10 of Embodiment 22, when an overcurrent flows to the surface electrode 7, and the temperature increases, the resistance of the thermo-sensitive layer 18c interposed between the surface electrode 7 and the bus electrode 25 increases. Thereby, in comparison to the conventional electron source 10" shown in FIG. 54, an overcurrent can be prevented from flowing to the surface electrode 7. Consequently, a deterioration range can be prevented from being increased because of heat generation, and the reliability can be improved.

Embodiment 23

Hereinbelow, Embodiment 23 of the present invention will be described.

Figure 32:
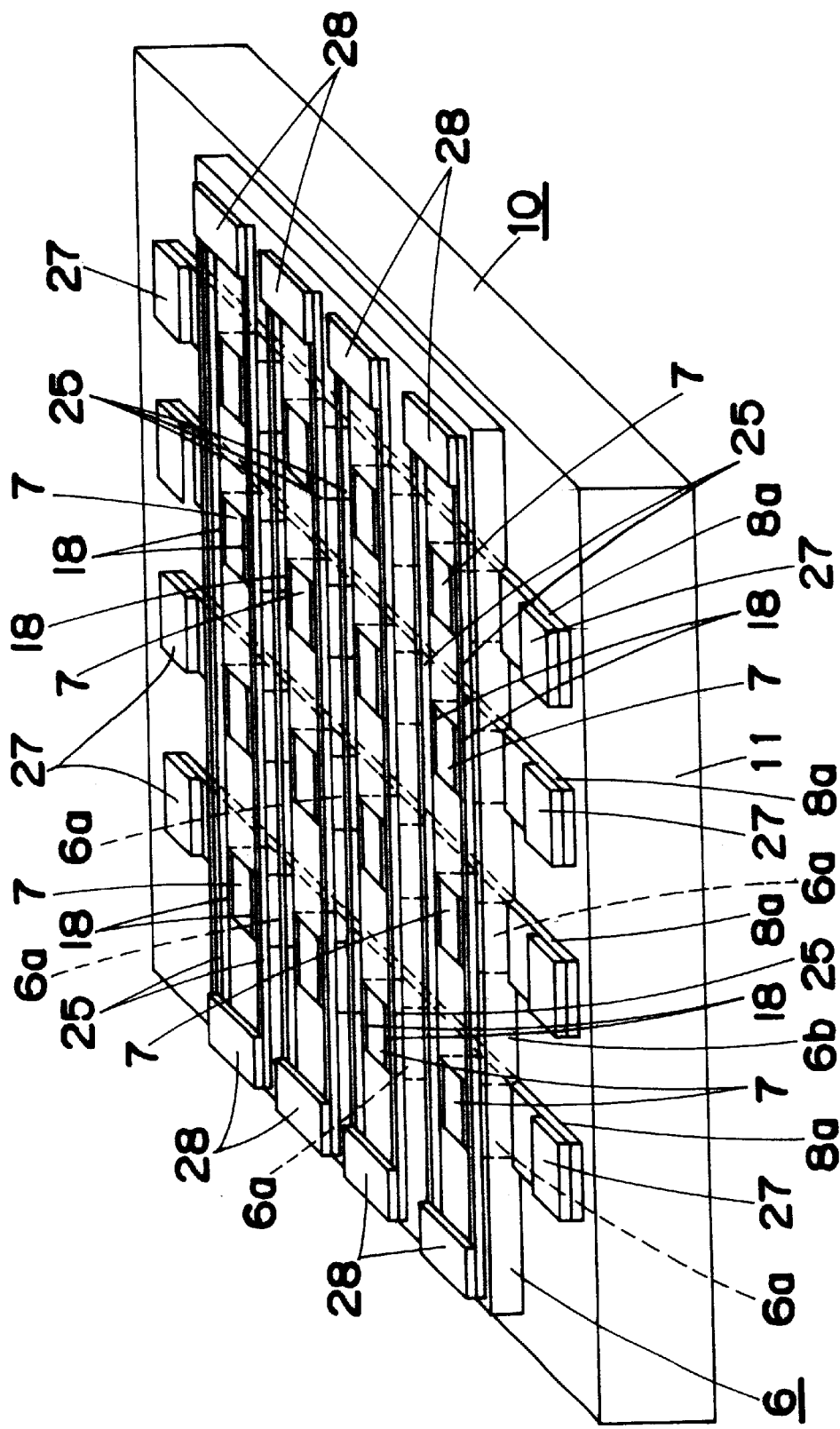
FIG. 32 is a schematic perspective view of an electron source according to Embodiment 23 of the present invention.
Figure 33:
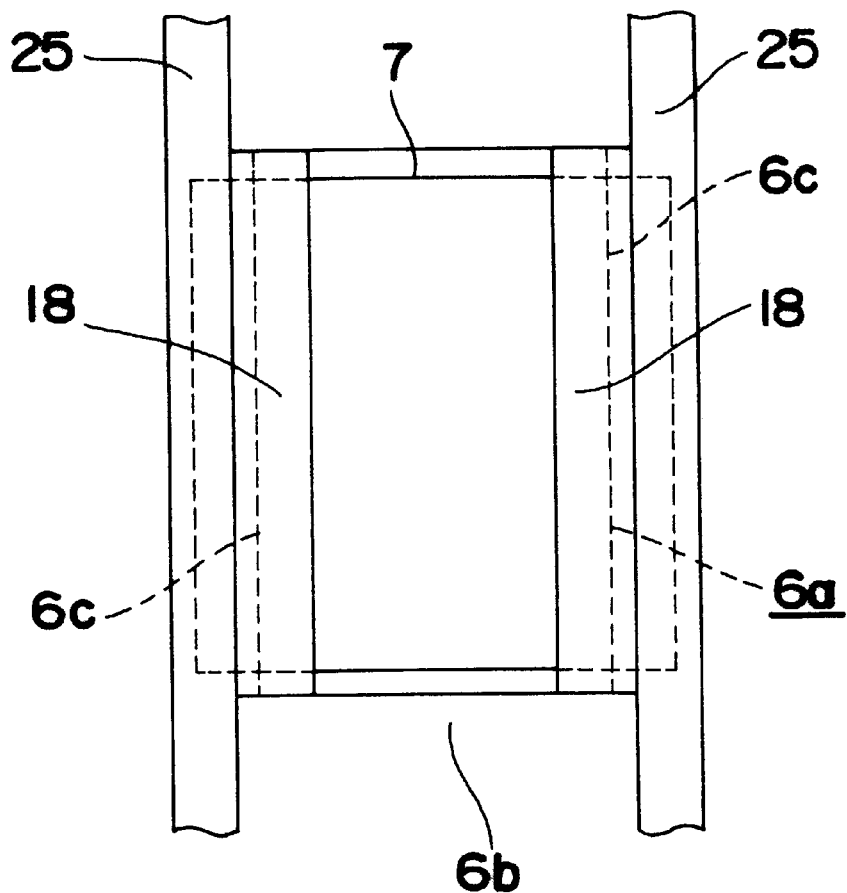
FIG. 33 is a schematic plan view of an essential portion of the electron source according to Embodiment 23 of the present invention.

As shown in FIG. 32, the basic configuration of an electron source 10 according to Embodiment 23 is substantially the same as that of the conventional electron source 10" shown in FIG. 54. Specifically, it includes a dielectric substrate 11 made of a glass substrate; a plurality of wirings 8a (lower electrodes 8) that are made of an electroconductive layer (for example, a metal film, such as a chrome, or an ITO film) and that are arranged on a main surface of the dielectric substrate 11; a drift layer 6 composed of a plurality of drift portions 6a formed of an oxidized porous polycrystalline silicon layer in such a manner as to overlap with the wirings 8a, and isolating portions 6b that are formed of a polycrystalline silicon layer and that individually fill up spaces between the drift portions 6a; a plurality of surface electrodes 7 that individually oppose the wirings 8a via the drift portions 6a; and a plurality of bus electrodes 25 commonly coupling the plurality of surface electrode 7, which are arranged in the direction intersecting with the wirings 8a, in units of each row on the drift layer 6. The bus electrodes 25 are arranged in such a manner as to cross the drift portions 6a and the isolating portions 6b in the direction intersecting with the wirings 8a. For the surface electrodes 7, a material (such as gold) having a small work function is employed; and the film thickness of the surface electrode 7 is set to a range of from 15 to 15 nm. For the bus electrodes 25, a material (such as aluminum or copper) that has a low resistance and a high processability is employed. In Embodiment 23, the dielectric substrate 11 forms the substrate.

Figure 34:
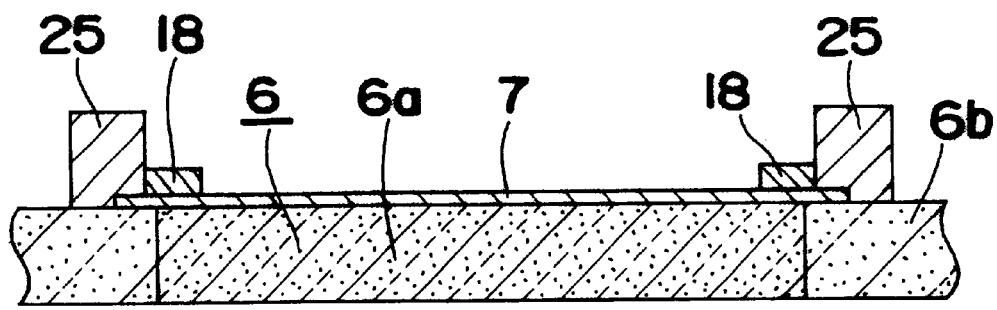
FIG. 34 is a schematic cross-sectional view of an essential portion of the electron source according to Embodiment 23 of the present invention.

As shown in FIGS. 32 and 34, the electron source 10 is characterized in that the drift portions 6a are each formed in a rectangular-parallelepiped shape, and metal layers 18 each covering a vicinity of a side 6c along the longitudinal direction of the bus electrode 25 (side 6c that is parallel to the bus electrode 25) are provided.

In Embodiment 23, passage of electrons can be prevented by setting the thickness of the metal layer 7 to be larger than the mean free path of the electrons drifting through the drift portion 6a. For a material of the metal layer 18, for example, gold may be used. With the gold being used, the resistance of the metal layer 18 can be reduced, and concurrently, a high property of adhesion between the surface electrode 7 and the bus electrode 25 can be implemented. The metal layer 18 forms an electron-emission restraining portion that restrains electrons from being emitted through a peripheral portion of the drift portion 6a on the drift layer 6. In this particular case, while the gold is used for the material of the metal layer 18, the material of the metal layer 18 is not limited to the gold.

In the electron source 10 of Embodiment 23, as in the conventional electron source 10" shown in FIG. 54, the drift portions 6a of the drift layer 6 are sandwiched between the plurality of wirings 8a and the plurality of the surface electrodes 7. As such, when an associated set of the bus electrode 25 and the wiring 8a is appropriately selected, and voltage is applied to the selected set, a strong field is applied only to the drift portion 6a positioned below the surface electrode 7 that is proximate to a portion corresponding to an intersection with the wiring 8a in the selected bus electrode 25, and electrons are thereby emitted. That is, when an associated set of the bus electrode 25 and the wiring 8a to which voltage is applied, electrons can thereby be emitted from a desired cross point. The voltage to be applied between the bus electrode 25 and the lower electrode 8 is set to a range of from 10 to 20 V. Each of the wirings 8a is formed as a stripe having two end portions in a longitudinal direction on which pads 27 are individually formed. The bus electrode 25 is coupled to the individual pads 28 at two ends in the longitudinal direction thereof.

The basic performance of the electron source 10 according to Embodiment 23 is substantially the same as that of the conventional electron source 10" shown in FIGS. 46 and 47; hence, a detailed description thereof is omitted herefrom. In addition, the set and a microstructure of the drift layer 6 (drift portion 6*a*) are substantially the same as in the cases of the conventional electron sources 10' and 10" (refer to FIG. 45); hence, a detailed description thereof is omitted herefrom.

In the electron source 10 of Embodiment 23, since the metal layers 18 each covering a vicinity of a side 6*c* along the longitudinal direction of the bus electrode 25 are provided, by setting the thickness of the metal layer 18 to be larger than the mean free path of the electrons, electrons can be prevented from being emitted through a portion positioned below the metal layer 18 in a peripheral portion of the drift portion 6*a*. Consequently, when the electron source is adapted in a display, occurrence of bleeding can be prevented, and a high-precision display can be implemented. In addition, the electron source enables occurrence of crosstalk in which, for example, electrons is emitted through a portion between the adjacent drift portions 6*a*, to be prevented. In the electron source 10 of Embodiment 23, as in the conventional electron source 10', the dependency to the degree of vacuum as an electron emission property is reduced. Concurrently, no popping phenomenon occurs during electron emission, and hence electrons can stably be emitted at high electron emission efficiency.

Embodiment 24

Hereinbelow, Embodiment 24 of the present invention will be described.

Figure 35:
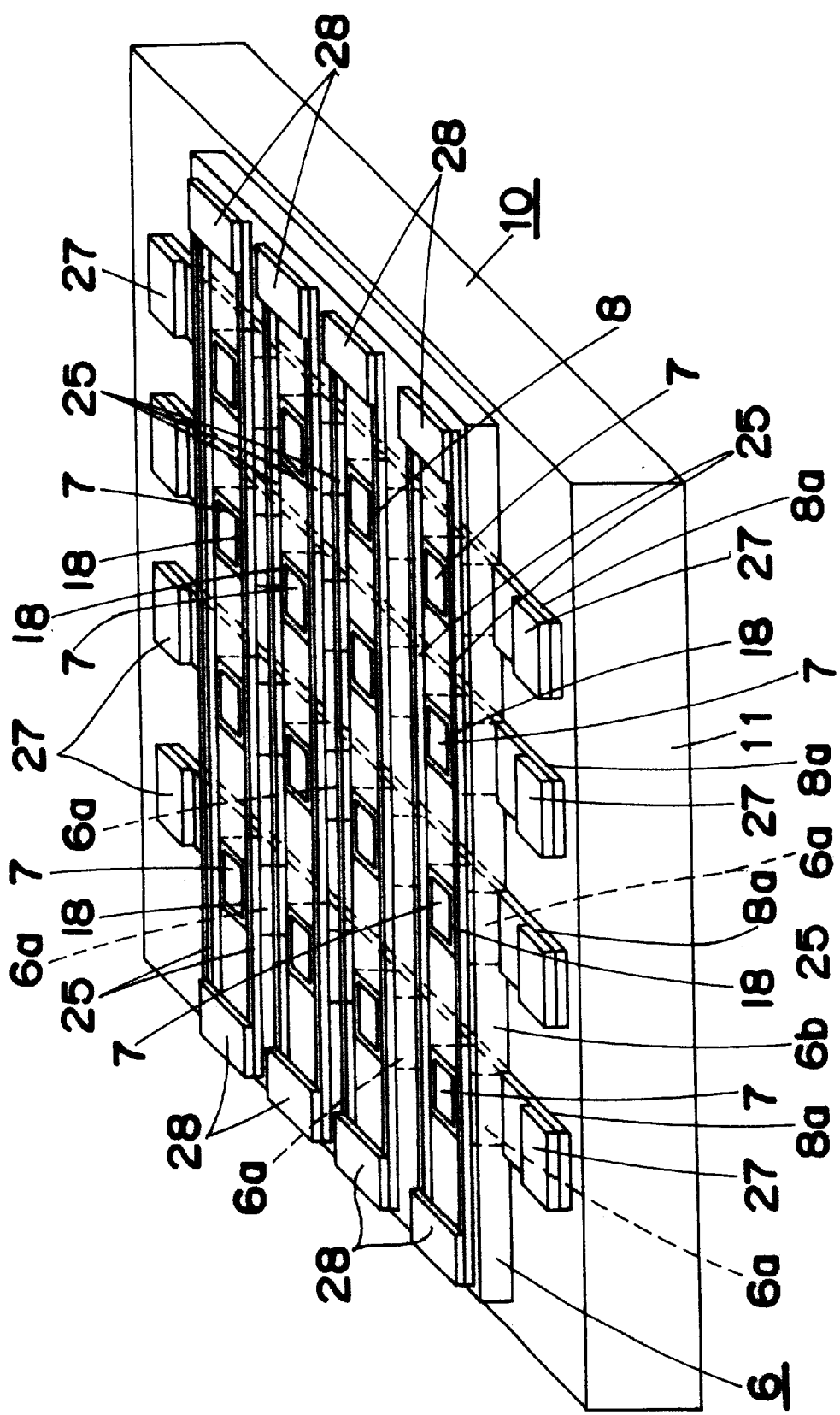
FIG. 35 is a schematic perspective view of an electron source according to Embodiment 24 of the present invention.
Figure 36:
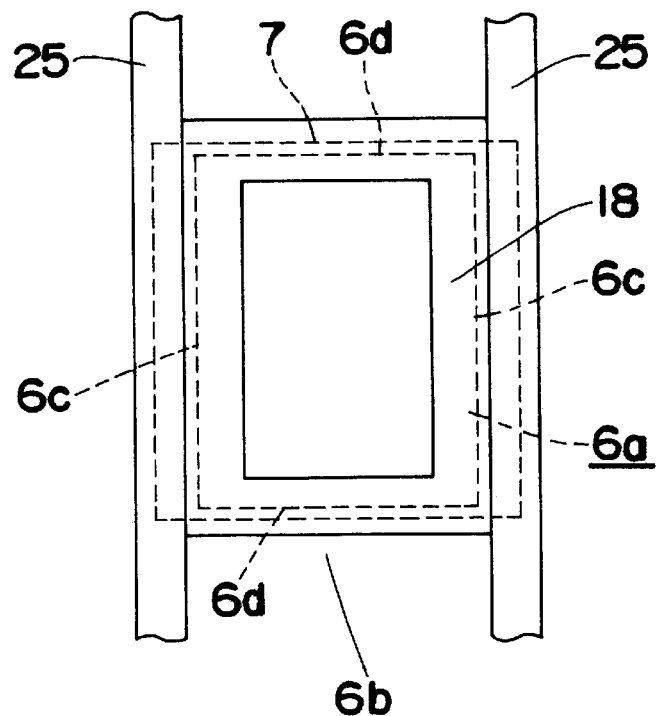
FIG. 36 is a schematic plan view of an essential portion of the electron source according to Embodiment 24 of the present invention.

As shown in FIGS. 35 and 36, while the basic configuration of an electron source 10 according to Embodiment 24 is substantially the same as that of the electron source 10 shown in FIG. 23, it is different in that a metal layer 18 covers the entire peripheral portion of the drift portion 6*a*. Specifically, in Embodiment 24, the metal layer 18 is formed as a rectangular frame in such a manner as to cover all the vicinities of sides 6*c* and 6*c*, which each extend parallel to the bus electrode 25, and sides 6*d* and 6*d*, which each extend perpendicular to the bus electrode 25. The metal layer 18 forms an electron-emission restraining portion that restrains electrons from being emitted through a peripheral portion of the drift portion 6*a* on the drift layer 6. Other portions are the same as those in Embodiment 23; hence, descriptions thereof are omitted herefrom.

Thus, as in the electron source 10 of Embodiment 23, in the electron source 10 of Embodiment 24, by setting the thickness of the metal layer 18 to be larger than the mean free path of the electrons, electrons can be prevented from being emitted through a portion positioned below the metal layer 18 in a peripheral portion of the drift portion 6*a*. Consequently, when the electron source is used in a display, occurrence of bleeding can be prevented, and a high-precision display can be implemented. In the electron source 10 of Embodiment 24, since field emission can be prevented in the overall peripheral portion of the drift portion 6*a*, in comparison to Embodiment 23, a higher-precision display can be implemented. In a display using the electron source 10 of Embodiment 23, when the pixel size is reduced to further improve the precision, because of influences of electrons emitted from two sides of the drift portion 6*a* in the direction along which the wirings 8*a* are arranged, bleeding develops to an extent that cannot be ignored. However, in the electron source 10 of Embodiment 24, since the metal layer 18 also covers vicinities of the sides 6*d* of the drift portion 6*a*, which each extend along the longitudinal direction of the wiring 8*a*, electrons emission from two end portions of the drift portion 6*a* in the direction along which the wirings 8*a* are arranged can be prevented, and the display precision can be improved even higher.

Embodiment 25

Hereinbelow, Embodiment 25 of the present invention will be described.

Figure 38:
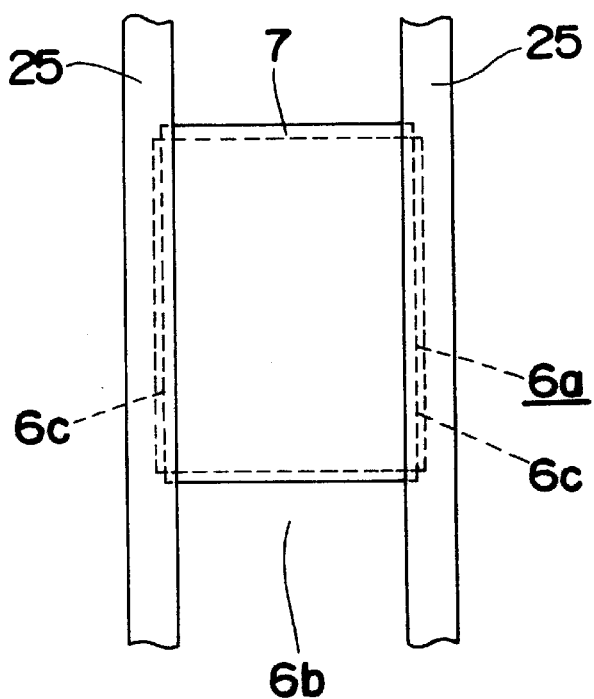
FIG. 38 is a schematic plan view of an essential portion of the electron source according to Embodiment 25 of the present invention.
Figure 37:
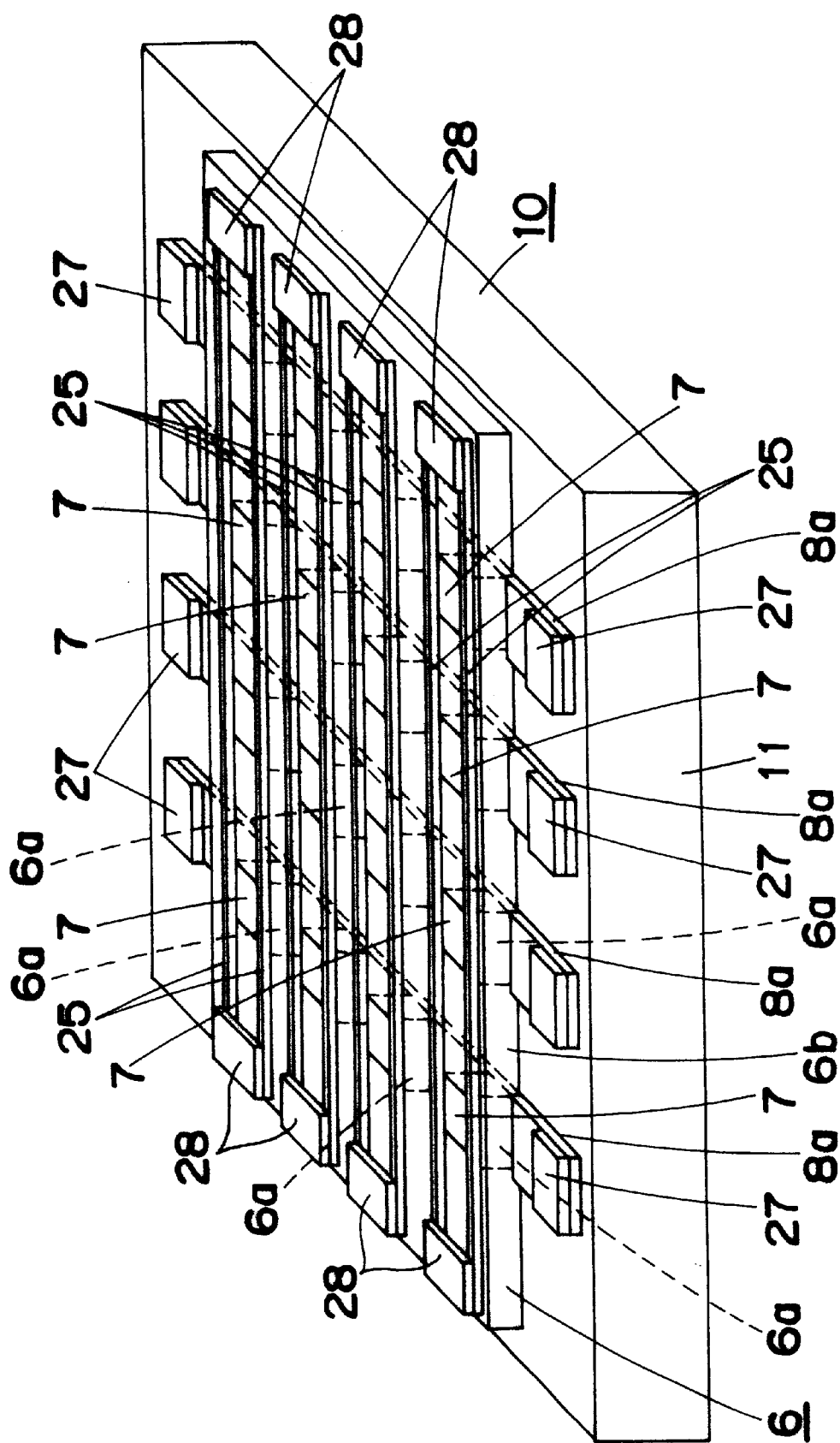
FIG. 37 is a schematic perspective view of an electron source according to Embodiment 25 of the present invention.

As shown in FIGS. 37 and 38, while the basic configuration of an electron source 10 according to Embodiment 25 is substantially the same as that of the electron source 10 shown in FIG. 23, it is different in that the bus electrode 25 is formed to have portions that each overlap with the side 6*c* of the drift portion 6*a*, which extends in the longitudinal direction of the bus electrode 25, and an end portion of the surface electrode 7. In Embodiment 25, while the metal layer 18 in Embodiment 23 (refer to FIG. 32) is not provided, the electron-emission restraining portion in Embodiment 23 is formed of the portion of the bus electrode 25. Since the bus electrode 25 does not need to transmit electrons, the thickness thereof can be set larger than the mean free path of electrons that drift through the drift portion 6*a*. Other portions are the same as those in Embodiment 23; hence, descriptions thereof are omitted herefrom.

Thus, in the electron source 10 of Embodiment 25, since the electron-emission restraining portion is formed of the portion of the bus electrode 25, by setting the thickness of the bus electrode 25 to be larger than the mean free path of the electrons, electrons can be prevented from being emitted because of the bus electrode 25 through a peripheral portion of the drift portion 6*a*. Consequently, when the electron source is used in a display, occurrence of bleeding can be prevented, and a high-precision display can be implemented. In comparison to the electron source 10 of Embodiment 24 in which the lower electrodes 8 are provided, in the electron source 10 of Embodiment 25, no portion overlapping with the metal layer 18 is required. Consequently, the field emission areas of the individual surface electrodes 7 are maintained equal, the dimensions of the surface electrode 7 can be reduced, and the pixel size can thereby be reduced.

Embodiment 26

Hereinbelow, Embodiment 26 of the present invention will be described.

Figure 39:
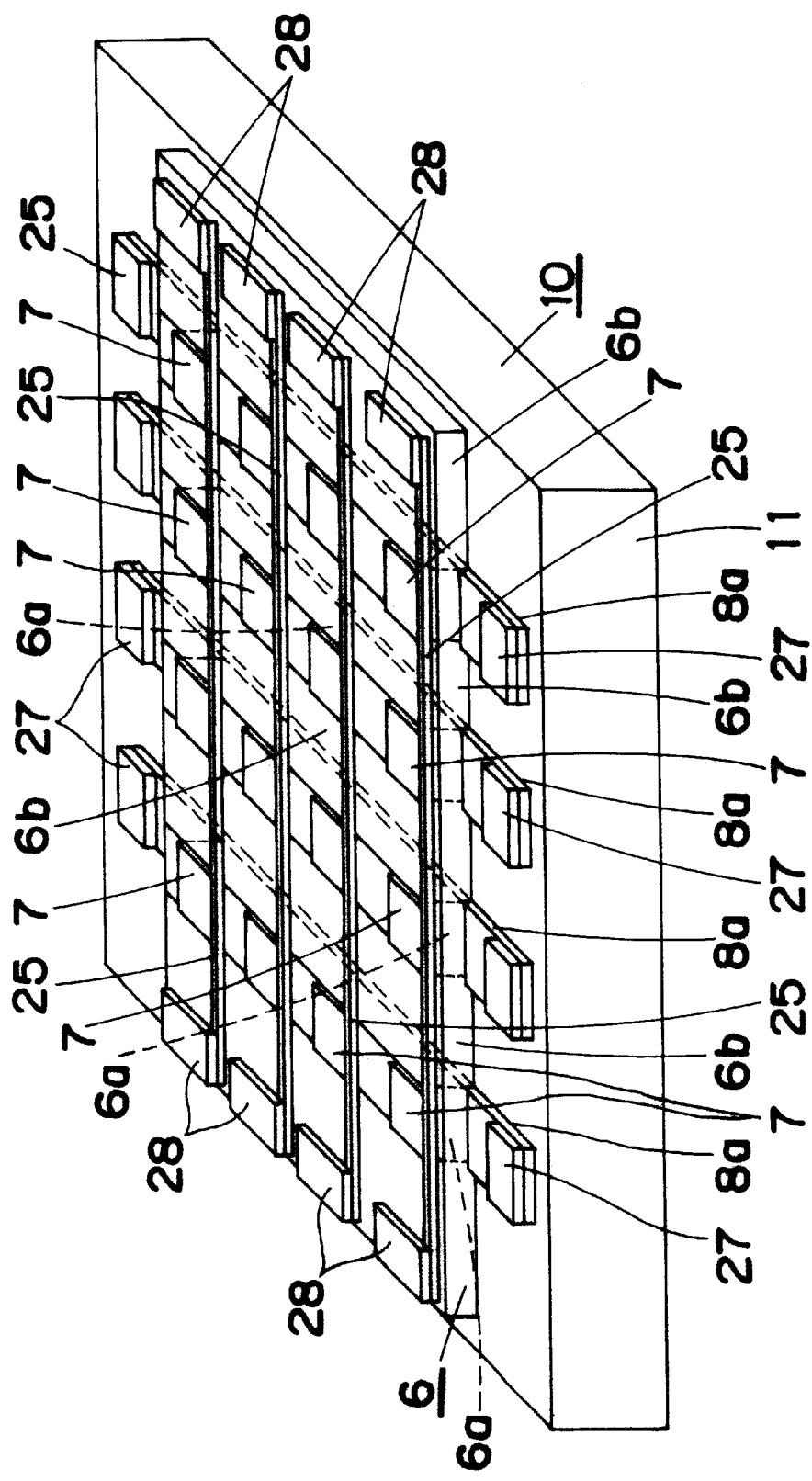
FIG. 39 is a schematic perspective view of an electron source according to Embodiment 26 of the present invention.

As shown in FIG. 39, an electron source 10 according to Embodiment 26 includes a dielectric substrate 11 made of a glass substrate; a plurality of wirings 8*a* that are made of an electroconductive layer (for example, a metal film, such as a chrome, or an ITO film) and that are arranged on a main surface of the dielectric substrate 11; a drift layer 6 composed of a plurality of drift portions 6*a* formed of an oxidized porous polycrystalline silicon layer in such a manner as to overlap with the wirings 8*a*, and isolating portions 6*b* that are formed of a polycrystalline silicon layer and that individually fill up spaces between the drift portions 6*a*; a plurality of surface electrodes 7 arranged to oppose the wirings 8*a* via the drift portions 6*a* in the direction intersecting with the wirings 8*a* and in the direction along which the lower electrodes 8 extend; and a plurality of bus electrodes 25 commonly coupling the plurality of surface electrode 7, which are arranged in the direction intersecting with the wirings 8*a*, in units of each row on the drift layer 6. Each of the wirings 8*a* is formed as a stripe having two end portions in a longitudinal direction on which pads 27 are individually formed. The bus electrode 25 is coupled to the individual pads 28 at two ends in the longitudinal direction thereof.

The surface electrodes 7 are formed of a material (such as gold) having a small work function; and the film thickness of the surface electrode 7 is set to a range of from 15 to 15 nm. The bus electrodes 25 are formed of a material (such as aluminum or copper) that has a low resistance and a high processability is employed. Since the bus electrode 25 does not need to transmit electrons, the film thickness thereof can be increased in comparison to that of the surface electrode 7, thereby enabling the resistance to be reduced. The dielectric substrate 11 forms the substrate.

In the electron source 10 of Embodiment 26, as in the conventional electron source 10" shown in FIG. 54, the drift portions 6a of the drift layer 6 are sandwiched between the plurality of wirings 8a and the plurality of the surface electrodes 7. As such, when an associated set of the bus electrode 25 and the wiring 8a is appropriately selected, and voltage is applied to the selected set, a strong field is applied only to the drift portion 6a positioned below the surface electrode 7 that is proximate to a portion corresponding to an intersection with the wiring 8a in the selected bus electrode 25, and electrons are thereby emitted. That is, when an associated set of the bus electrode 25 and the wiring 8a to which voltage is applied, electrons can thereby be emitted from a desired cross point. The voltage to be applied between the bus electrode 25 and the lower electrode 8 is set to a range of from 10 to 20 V.

The basic performance of the electron source 10 according to Embodiment 26 is substantially the same as that of the conventional electron source 10" shown in FIGS. 46 and 47; hence, a detailed description thereof is omitted herefrom. In addition, the set and a microstructure of the drift layer 6 (drift portion 6a) are substantially the same as in the cases of the conventional electron sources 10' and 10" (refer to FIG. 45); hence, a detailed description thereof is omitted herefrom.

In the conventional electron source 10" shown in FIG. 54, the drift portions 6a are arranged in the direction along which the wirings 8a extend, and the isolating portions 6b are interposed between the adjacent drift portions 6a. In comparison to the above, the electron source 10 of Embodiment 26 is characterized in that the drift portions 6a are continually formed in the direction along which the lower electrodes 8a extend. In specific, the drift portion 6a formed to overlap with the wiring 8a is disposed to extend in the direction along which the wiring 8a extends, and the adjacent wirings 8a the adjacent drift portions 6a are isolated by the isolating portion 6b in the direction intersecting with the wiring 8a.

Figure 40:
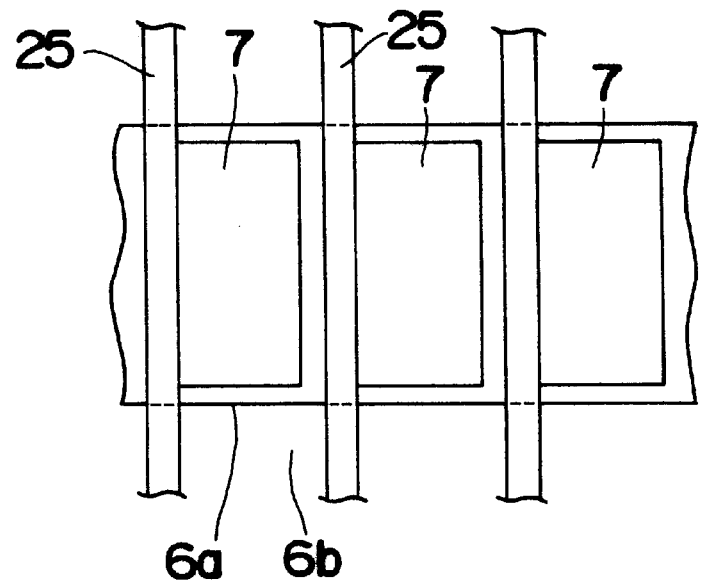
FIG. 40 is a schematic plan view of the electron source according to Embodiment 26 of the present invention.

In Embodiment 26, since the drift portion 6a is continually formed in the direction along which the wiring 8a extends, the distance between the surface electrodes 7 that are arranged adjacent to each other in the direction along which the wiring 8a extends can be reduced, as shown in FIG. 40, in comparison to the case where the drift portions 6a and the isolating portions 6b are alternately formed as in the conventional electron source 10" shown in FIG. 54. As such, in comparison to a case where the conventional electron source 10" is used as an electron source in a display, the interpixel distance on the side of the faceplate can be reduced, and the electron source can be used as an electron source in a high-precision display. In addition, as in the conventional electron source 10', in the electron source 10 of Embodiment 26, the dependency to the degree of vacuum as an electron emission property is reduced. Concurrently, no popping phenomenon occurs during electron emission, and hence electrons can stably be emitted at high electron emission efficiency.

Embodiment 27

Hereinbelow, Embodiment 27 of the present invention will be described.

Figure 41:
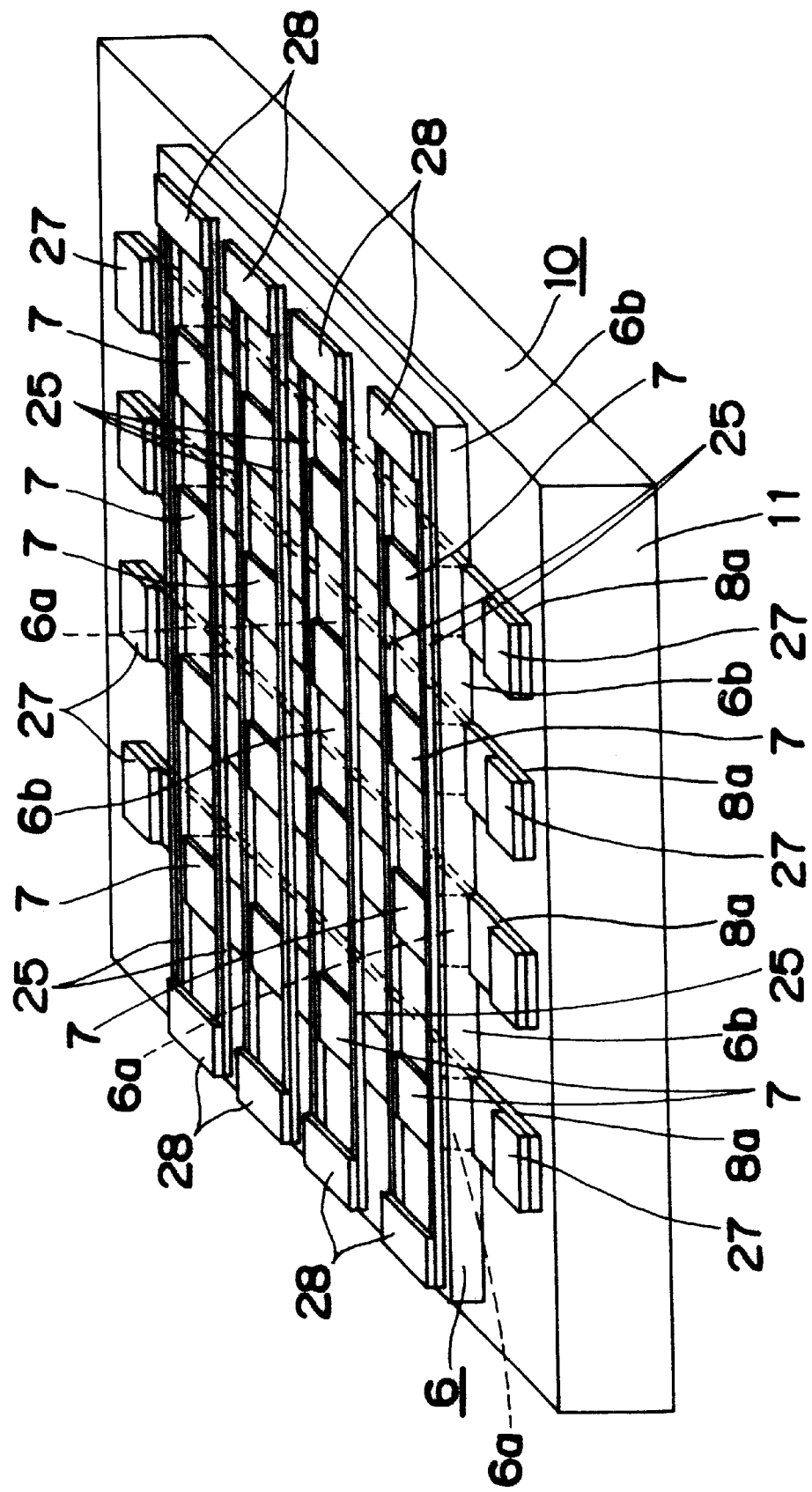
FIG. 41 is a schematic perspective view of an electron source according to Embodiment 27 of the present invention.

As shown in FIG. 41, while the basic configuration of an electron source 10 according to Embodiment 27 is substantially the same as that of the electron source 10 of Embodiment 26, it is different in that each of the surface electrodes 7 is sandwiched between two bus electrodes 25 commonly connected to the identical pads 28. In specific, in Embodiment 27, each of the surface electrodes 7 is coupled to the individual bus electrodes 25 at two ends thereof in the direction (right-left direction in FIG. 42) along which the wiring 8a extends. The thickness of the bus electrode 25 is set larger than the mean free path of electrons. Other aspects are the same as those in Embodiment 26; hence, descriptions thereof are omitted herefrom.

Figure 42:
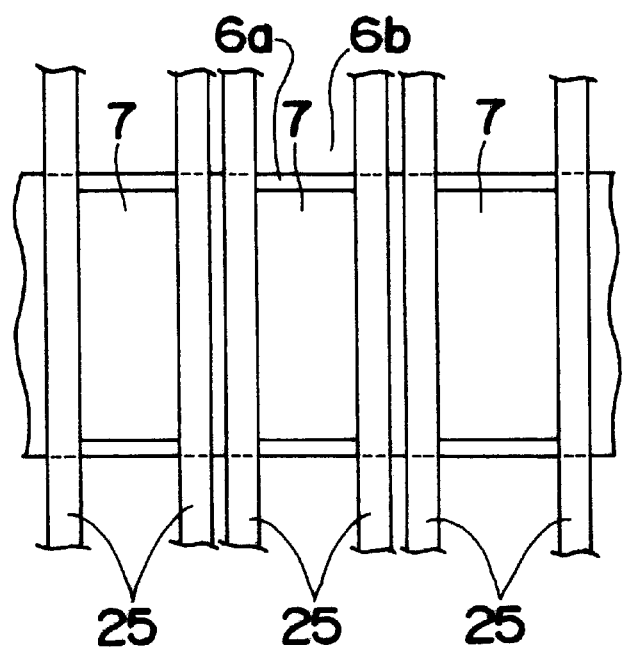
FIG. 42 is a schematic plan view of an essential portion of the electron source according to Embodiment 27 of the present invention.

As in Embodiment 26, in Embodiment 27, the drift portion 6a is continually formed in the direction along which the wiring 8a extends. As such, the distance between the surface electrodes 7 that are arranged adjacent to each other in the direction along which the wiring 8a extends can be reduced, as shown in FIG. 42, in comparison to, for example, the conventional electron source 10" shown in FIG. 54, in which the drift portions 6a and the isolating portions 6b are alternately formed. As such, in comparison to a case where the conventional electron source 10" is used as an electron source in a display, the interpixel distance on the side of the faceplate can be reduced, and the electron source can be used as an electron source in a high-precision display. In addition, electrons can be prevented from being emitted through the drift portion 6a positioned below the bus electrode 25, and the area in a portion through which electrons are emitted can be prevented from being larger than the surface area of the surface electrode 7.

For the electroconductive layer, Embodiments 20 to 27 use the substrate formed such that the lower electrodes 8 are formed on the side of one surface of the dielectric substrate 11 made of the glass substrate. However, a metal substrate made of, for example, chrome, may be used for the electroconductive substrate. Alternatively, a semiconductor substrate (such as an n-type silicon substrate of which the resistivity is relatively close to the conductor resistivity, or a p-type silicon substrate on which an n-type region is formed as an electroconductive layer on the side of one surface) may be used. For the dielectric substrate 11, a ceramic substrate may be used instead of the glass substrate.

In Embodiments 20 to 27, gold is for the material of the surface electrode 7. However, the material of the surface electrode 7 is not limited to gold; and, for example, aluminum, chrome, tungsten, nickel, or platinum, may be used. Moreover, the surface electrode 7 may be formed of at least two thin-film layers laminated in the thickness direction. When forming the surface electrode 7 of two thin-film layers, for example, gold may be used as a material of the upper thin-film layer; and, for example, chrome, nickel, platinum, titanium, or iridium, may be used as an material of the lower thin-film layer (thin-film layer on the side of the strong field drift layer 6).

In Embodiments 20 to 27, the drift portion 6a of the drift layer 6 is formed of an oxidized porous polycrystalline silicon layer. However, the drift portion 6a may be formed of a nitrided or oxidized porous polycrystalline silicon layer. Alternatively, the drift portion 6a may be formed of an oxidized or nitrided porous semiconductor layer, which is different from the porous polycrystalline silicon layer. When the drift portion 6a is formed of a nitrided porous polycrystalline silicon layer, a silicon nitride film is formed for either the silicon oxide film 52 or 64 shown in the FIG. 45. When the drift portion 6a is formed of an oxynitrided porous polycrystalline silicon layer, a silicon oxynitride film is formed for either the silicon oxide film 52 or 64 shown in the FIG. 45.

For the deposition and formation of the p-layer and the n-layer, any one of the above-described embodiments may use a method of, for example, doping in the deposition, ion injection into an i-layer, impurity diffusion into an i-layer, crystallization through heating of p- and n-amolphous-layer, ion injection into an i-amolphous layer and crystallization through heating, or doping of a semiconductor substrate with impurities.

In each of the above-described embodiments, the direct-current voltages Vps and Vc are applied to the electron source 10. However, even with alternating-current voltages being applied thereto, when the collector electrode and the surface electrode are set to be anodic with respect to the lower electrode, electrons can of course be emitted.

As above, while the present invention has been described with reference to the specific embodiments, it should be apparent to those skilled in the art that many other modified examples and corrected examples can be implemented. Hence, it is to be understood that the present invention should not be limited to the above-described embodiments, and should be determined with reference to the appended claims.

INDUSTRIAL APPLICABILITY

As described above, the field emission-type electron source of the present invention is effective for reducing the power consumption without reducing the per-unit-area field emission area, and is suitable for using as an electron source for, for example, a flat optical source, a flat display device, or a solid-state vacuum device.

What is claimed is:

1. A field emission-type electron source comprising a substrate, an electroconductive layer formed on a surface of said substrate, a semiconductor layer formed on said electroconductive layer, a strong field drift layer having a drift portion that is made of an oxidized or nitrided porous semiconductor layer and that is formed on the side of the surface of said semiconductor layer, and a surface electrode formed on said strong field drift layer, wherein when voltage is applied to cause said surface electrode to be anodic with respect to said electroconductive layer, electrons injected from said electroconductive layer to said strong field drift layer drift through said strong field drift layer, and are emitted through said surface electrode; wherein
  a current restraining member for restraining a current which does not contribute for emission of a current flowing through said drift portion, is provided in at least one of said electroconductive layer, said surface electrode, a portion between said electroconductive layer and said drift portion, and a portion between said surface electrode and said drift portion.

2. The field emission-type electron source according to claim 1, wherein said current restraining member is a leakage-current preventing member for preventing a current from leaking into said surface electrode from said electroconductive layer, thereby reducing the amount of power consumption.

3. The field emission-type electron source according to claim 2, wherein said leakage-current preventing member is a semiconductor layer having a pn junction.

4. The field emission-type electron source according to claim 2, wherein said leakage-current preventing member is a semiconductor layer having an n-layer on the side of said electroconductive layer and a p-layer on the side of said surface electrode.

5. The field emission-type electron source according to claim 2, wherein said leakage-current preventing member is a semiconductor layer having an n-layer on the side of said electroconductive layer and a p-layer on the side of said surface electrode, and a low-concentration semiconductor layer is formed between said p-layer and said drift portion.

6. The field emission-type electron source according to claim 2, wherein said substrate is a semiconductor substrate, and said electroconductive layer comprises an n-layer on the side of said substrate and a p-layer on the side of said surface electrode.

7. The field emission-type electron source according to claim 4, wherein an i-layer is provided between said p-layer and said n-layer.

8. The field emission-type electron source according to claim 2, wherein said surface electrode is formed of a material to be coupled with a Schottky junction to said drift portion.

9. The field emission-type electron source according to claim 2, wherein a low-concentration semiconductor layer is provided between said electroconductive layer and said drift portion, and said electroconductive layer is formed of a material to be coupled with a Schottky junction to said low-concentration semiconductor layer.

10. The field emission-type electron source according to claim 1, wherein
  said strong field drift layer is provided with an isolating portion for isolating the drift portions arranged adjacent to each other; and
  said current restraining member is a field moderating member for reducing the field intensity in a vicinity of a boundary to said isolating portion in said drift portion to be lower than the field intensity in a central portion of said drift portion to thereby reduce power consumption.

11. The field emission-type electron source according to claim 10, wherein said field moderating member is an insulator film interposed between said drift portion and said surface electrode in a position corresponding to the vicinity of the boundary.

12. The field emission-type electron source according to claim 10, wherein said field moderating member is an insulator film disposed on said electroconductive layer in a position corresponding to the vicinity of the boundary.

13. The field emission-type electron source according to claim 10, wherein said field moderating member is formed of a high resistance layer in a position corresponding to the vicinity of the boundary, and a low resistance layer interposed between said drift portion and said electroconductive layer in a position corresponding to a central portion of said drift portion.

14. The field emission-type electron source according to claim 10, wherein said field moderating member is a cutout portion formed in said surface electrode in a position corresponding to the vicinity of the boundary.

15. The field emission-type electron source according to claim 10, wherein said field moderating member is a cutout portion formed in said electroconductive layer in a position corresponding to the vicinity of the boundary.

16. The field emission-type electron source according to claim 1, wherein said current restraining member is a field moderating layer that is disposed between said strong field drift layer and said surface electrode and that reduces the field intensity of said strong field drift layer to thereby reduce power consumption.

17. The field emission-type electron source according to claim 16, wherein said field moderating member is one of a silicon nitride film and a multilayer film comprising a silicon nitride film.

18. The field emission-type electron source according to claim 16, wherein said field moderating member is formed of a silicon nitride film and an silicon oxide film disposed on the silicon nitride film.

19. The field emission-type electron source according to claim 16, wherein said field moderating member is formed of a silicon oxide film, a silicon nitride film disposed on the silicon oxide film, and another silicon oxide film formed on the silicon nitride film.

20. The field emission-type electron source according to claim 16, wherein said field moderating member is formed of a material having a high property of adhesion to said surface electrode.

21. The field emission-type electron source according to claim 20, wherein the material having the high property of adhesion is a chrome oxide film.

22. The field emission-type electron source according to claim 16, wherein a resistance value of said field moderating member is on the same order of a resistance value of said strong field drift layer.

23. The field emission-type electron source according to claim 1, further comprising a bus electrode commonly coupling a plurality of the surface electrodes, wherein said current restraining member is an overcurrent protection element for limiting a current flowing between said surface electrode and said bus electrode to thereby reduce power consumption.

24. The field emission-type electron source according to claim 23, wherein said overcurrent protection element is a member that causes disconnection when an overcurrent flows between said surface electrode and said bus electrode.

25. The field emission-type electron source according to claim 23, wherein said overcurrent protection element is a high resistance layer disposed between said surface electrode and said bus electrode.

26. The field emission-type electron source according to claim 23, wherein said overcurrent protection element is a thermo-sensitive layer that is disposed between said surface electrode and said bus electrode and that has a positive resistance temperature coefficient.

27. The field emission-type electron source according to claim 1, wherein said current restraining member is an electron-emission restraining member for restraining electron emission from a peripheral portion of said drift portion to thereby reduce power consumption.

28. The field emission-type electron source according to claim 27, wherein said current restraining member is a metal layer.

29. The field emission-type electron source according to claim 28, wherein said metal layer is disposed around said drift portion.

30. The field emission-type electron source according to claim 28, further comprising a bus electrode commonly connecting a plurality of the surface electrode, wherein a portion of said bus electrode is concurrently used as the metal layer.

31. The field emission-type electron source according to claim 27, further comprising a bus electrode commonly connecting a plurality of the surface electrode, wherein said bus electrode is disposed on two sides of a pixel.

* * * * *

UNITED STATES PATENT AND TRADEMARK OFFICE
CERTIFICATE OF CORRECTION

PATENT NO. : 6,707,061 B2
DATED : March 16, 2004
INVENTOR(S) : T. Komada et al.

It is certified that error appears in the above-identified patent and that said Letters Patent is hereby corrected as shown below:

Title page,
Item [56], References Cited, FOREIGN PATENT DOCUMENTS,
"EP 1026727 8/2000" should be -- EP 1026721 8/2000 --.

Signed and Sealed this

Twelfth Day of October, 2004

JON W. DUDAS
*Director of the United States Patent and Trademark Office*